(12) United States Patent
Ishida

(10) Patent No.: US 6,404,921 B1
(45) Date of Patent: *Jun. 11, 2002

(54) CONTOUR EXTRACTING METHOD AND APPARATUS

(75) Inventor: Yoshihiro Ishida, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/161,082

(22) Filed: Dec. 3, 1993

Related U.S. Application Data

(63) Continuation of application No. 07/779,083, filed on Oct. 18, 1991, now abandoned.

(30) Foreign Application Priority Data

Oct. 22, 1990 (JP) ............................................. 2-281958

(51) Int. Cl.⁷ ................................................ G06K 9/48
(52) U.S. Cl. ....................................... 382/197; 382/199
(58) Field of Search ............................. 382/21, 22, 197, 382/198, 199

(56) References Cited

U.S. PATENT DOCUMENTS

| | | | |
|---|---|---|---|
| 4,368,462 A | 1/1983 | Crawley | 340/723 |
| 4,524,454 A | * 6/1985 | Ejiri | 382/21 |
| 4,777,651 A | * 10/1988 | McCann et al. | 382/21 |
| 4,956,869 A | 9/1990 | Miyatake et al. | 382/22 |
| 4,961,231 A | * 10/1990 | Nakayama et al. | 382/21 |
| 5,091,976 A | * 2/1992 | Murayama | 382/21 |
| 5,228,097 A | * 7/1993 | Kumagai | 382/242 |

FOREIGN PATENT DOCUMENTS

| | | |
|---|---|---|
| GB | 2201562 | 9/1986 |
| JP | 1-277976 | 8/1989 |
| JP | 2-171875 | 7/1990 |

OTHER PUBLICATIONS

"Fast Binary–Image Boundary Extraction", W.H.H.J. Lunscher, et al., Computer Vision Graphics And Image Processing, vol. 38, No. 3, Jun. 1987 pp. 229–257.

"An Improved Algorithm For The Sequential Extraction Of Boundaries From A Raster Scan", David W. Capson, Computer Vision Graphics And Image Processing, vol. 28, No. 1, Oct. 1984, pp. 109–125.

* cited by examiner

Primary Examiner—Jon Chang
(74) Attorney, Agent, or Firm—Fitzpatrick, Cella, Harper & Scinto

(57) ABSTRACT

In a contour extraction apparatus and method, states of target pixels and pixels adjacent to the respective target pixels in image data are stored, the target pixel is extracted in the sequence of raster scanning, and a pixel arranging vector in the horizontal direction and in the vertical direction is detected according to the state of the target pixel and pixels adjacent to the target pixel. A state of connection between the pixel arranging vectors is determined, and a contour of the image data is extracted according to the determined state of connection between the pixel arranging vectors.

15 Claims, 80 Drawing Sheets

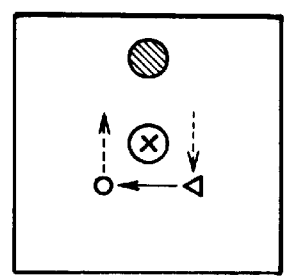
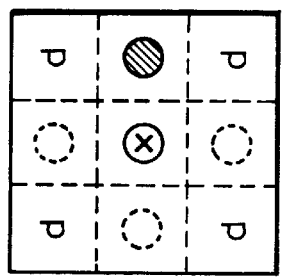
FIG. 8 CASE 2
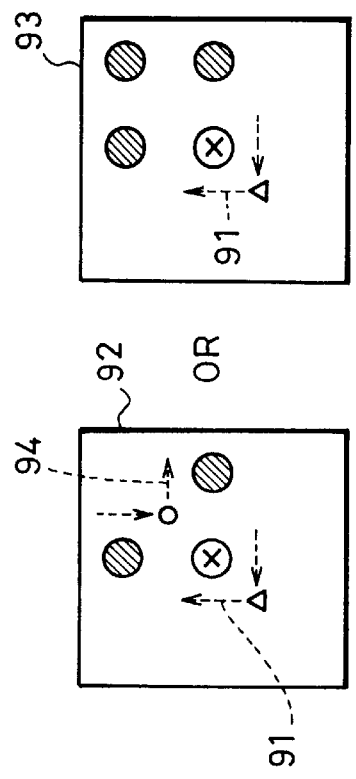
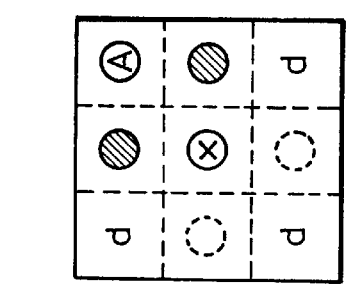
FIG. 9 CASE 3

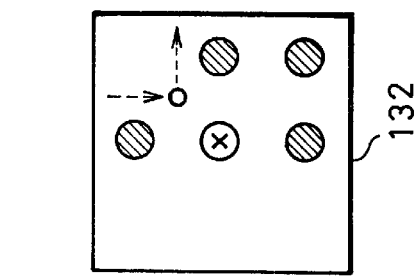
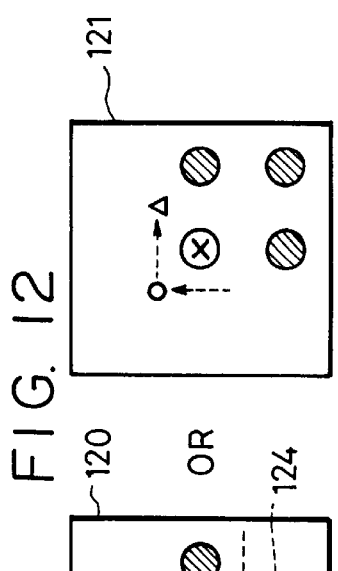
FIG. 12
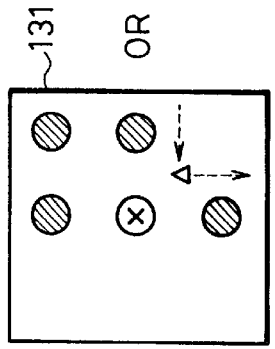
FIG. 13
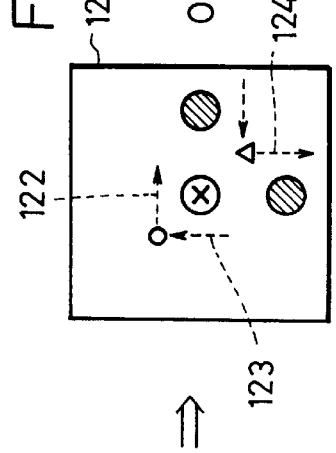
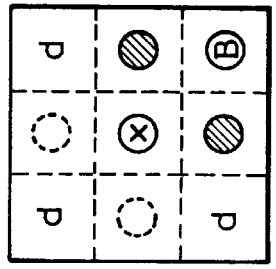
CASE 6
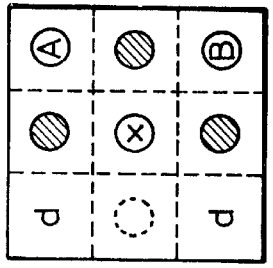
CASE 7

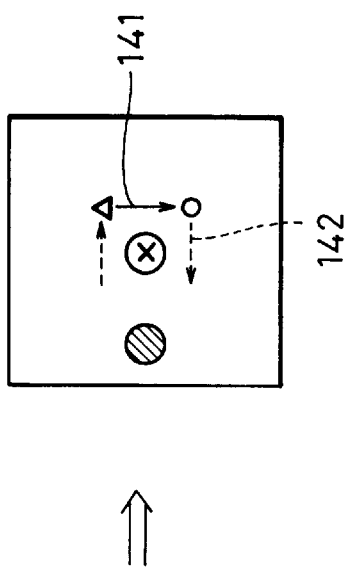
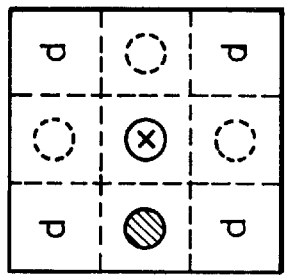
FIG. 14  CASE 8
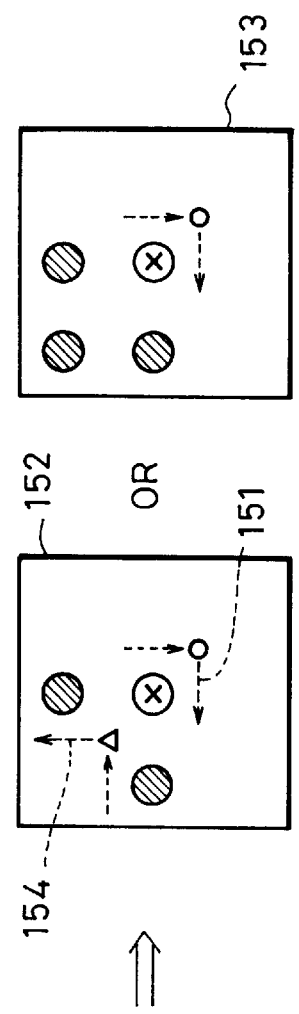
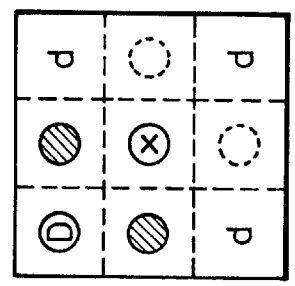
FIG. 15  CASE 9

FIG. 16
FIG. 17
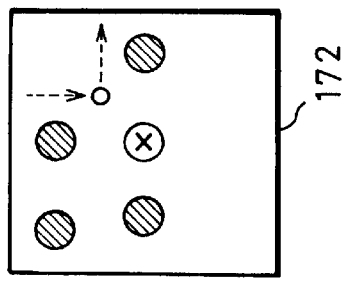
172
OR
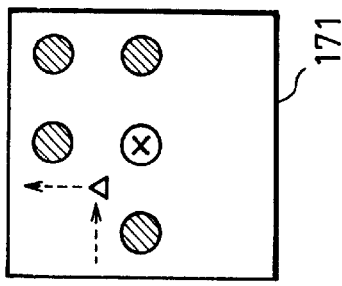
171
OR
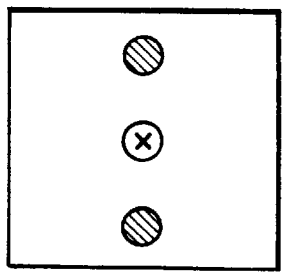
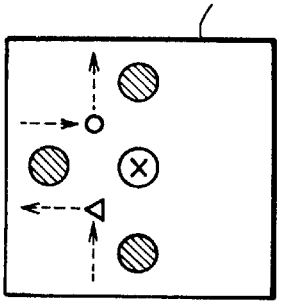
170
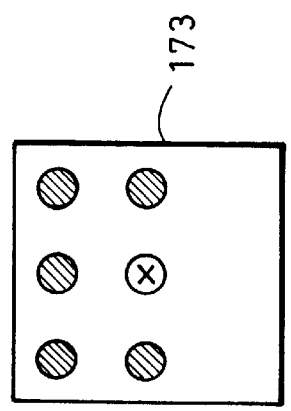
173
⇑
⇑
OR
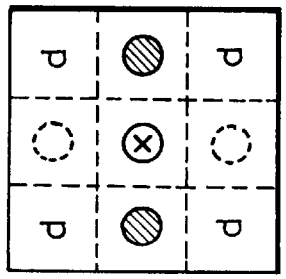
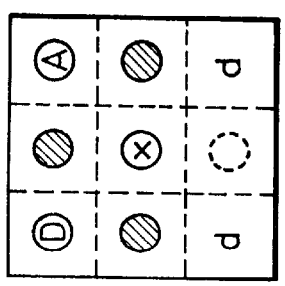
CASE 10
CASE 11

CASE 12

CASE 13

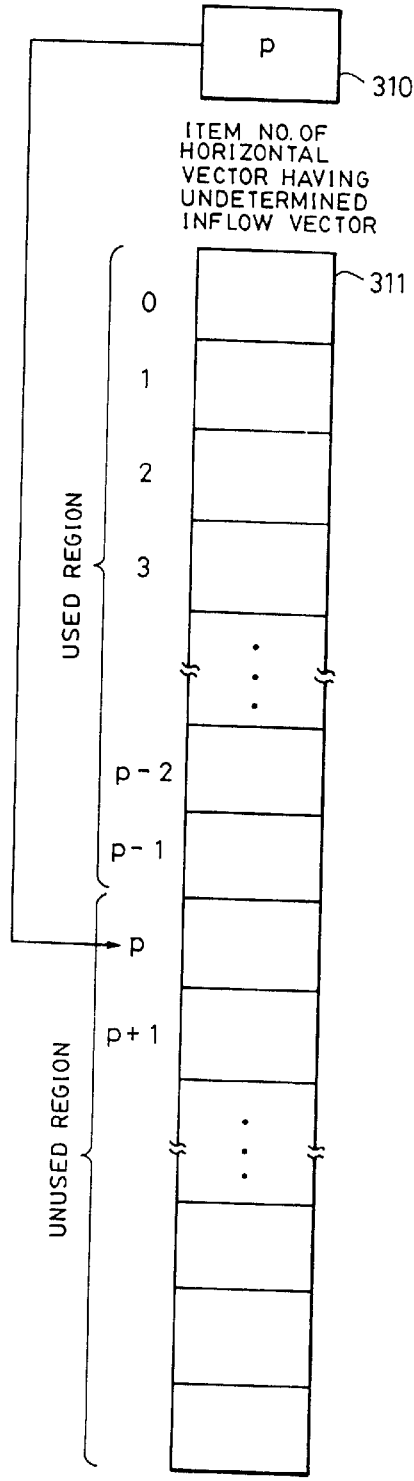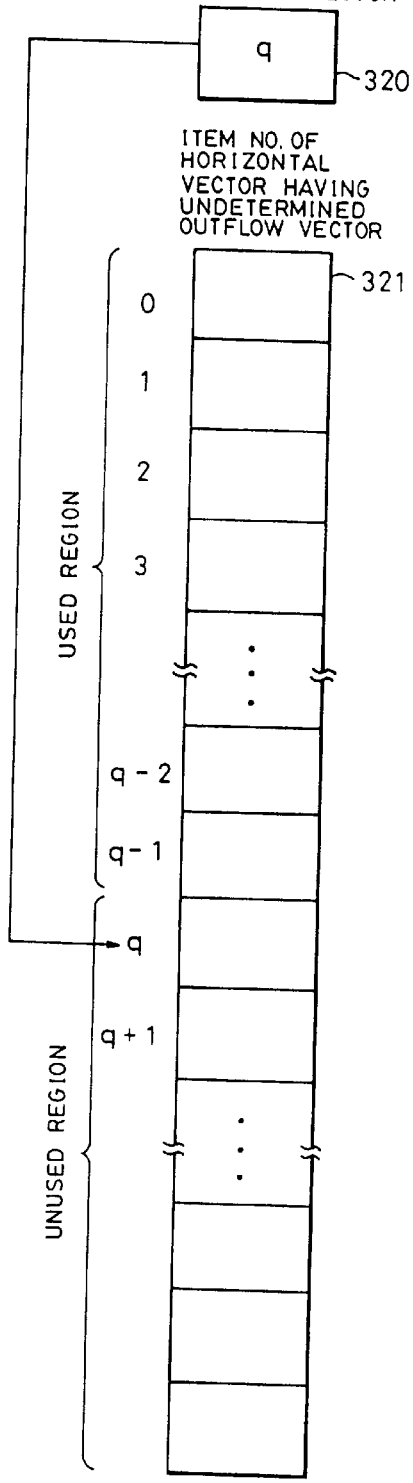

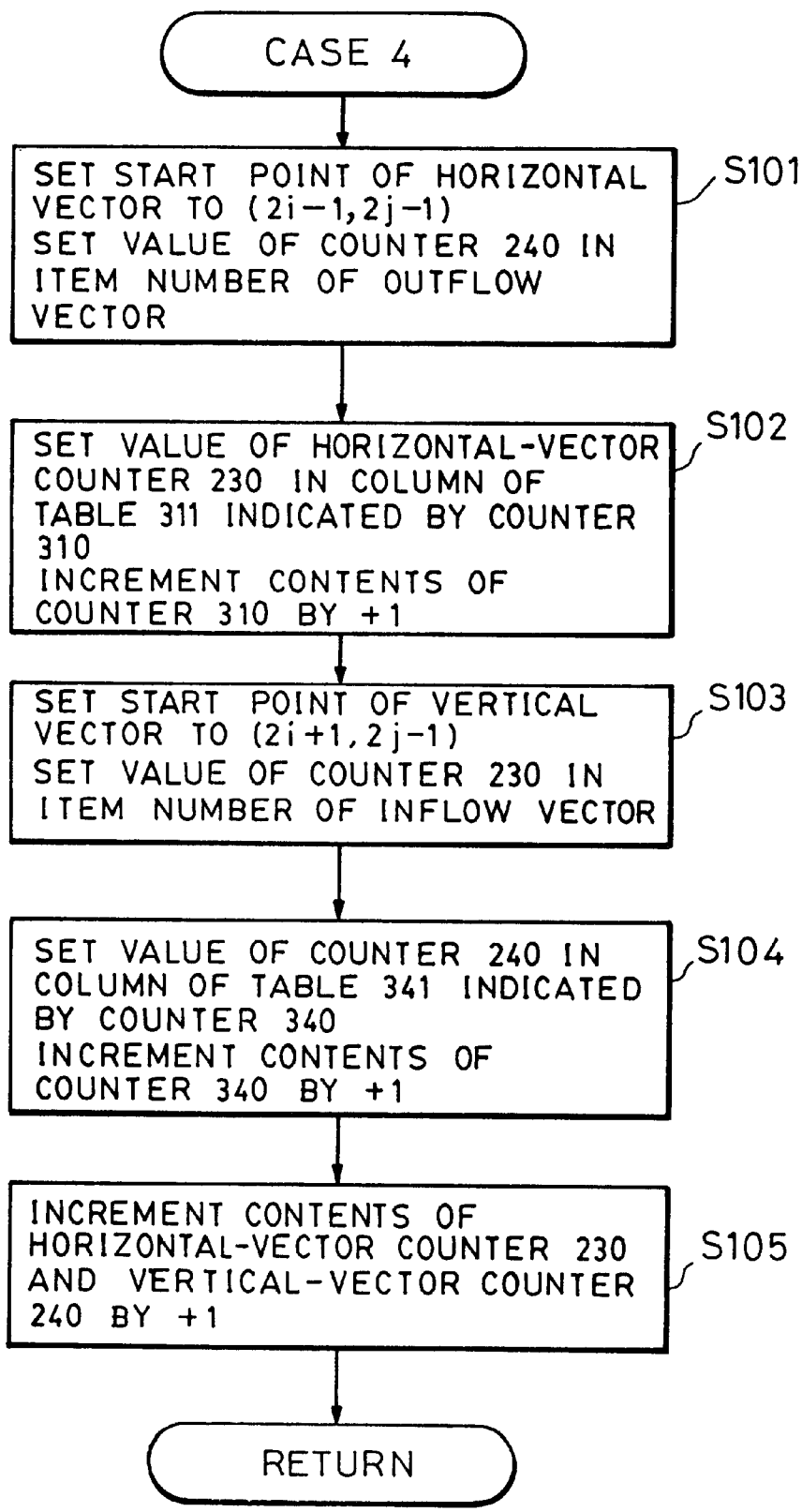

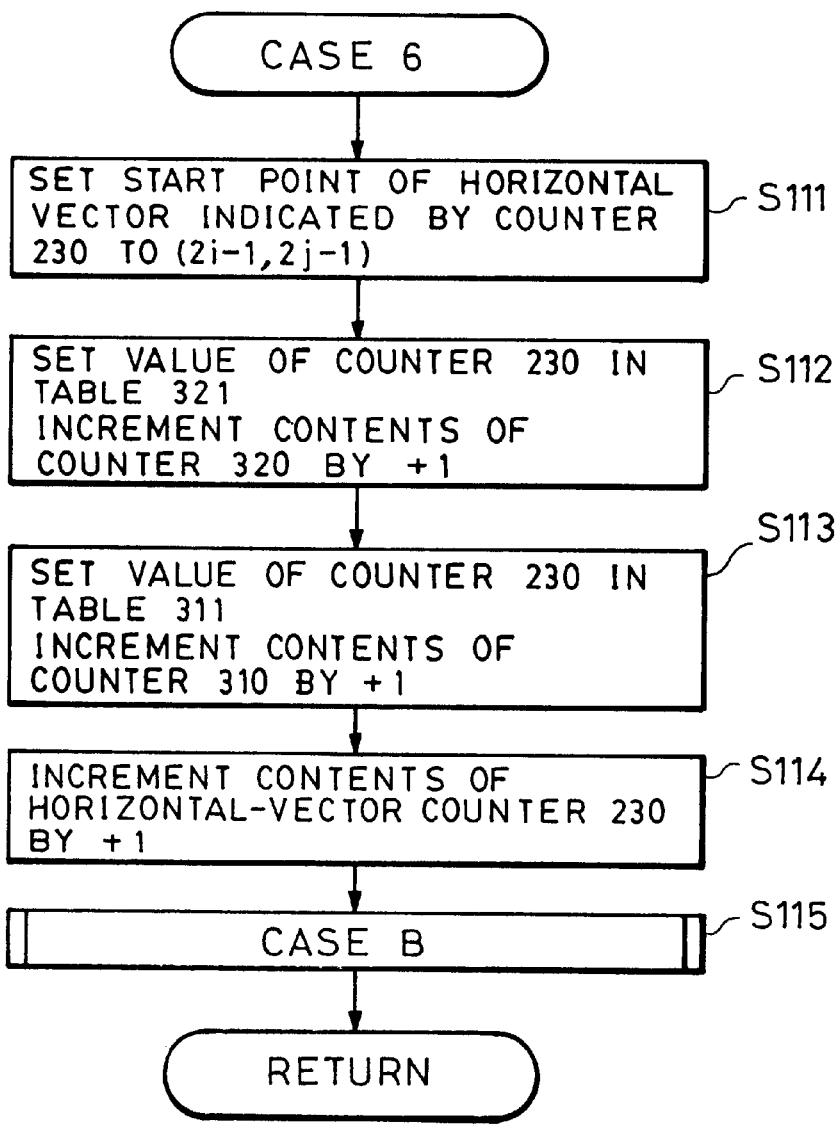

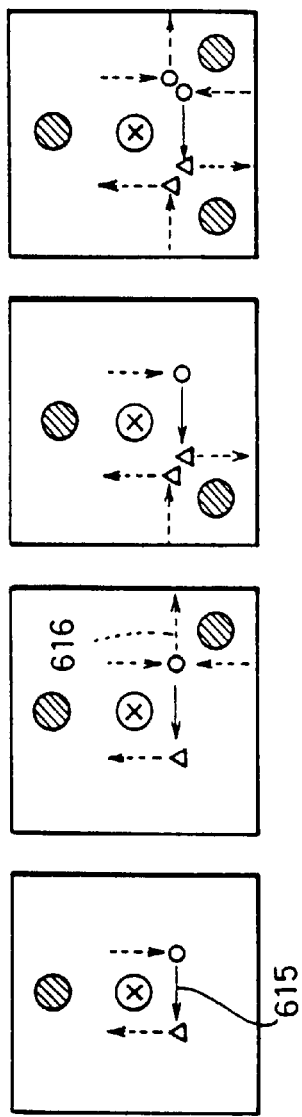
FIG. 61
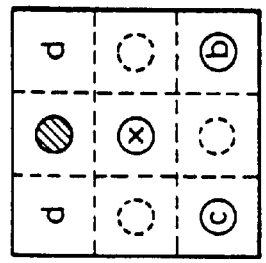
CASE 01
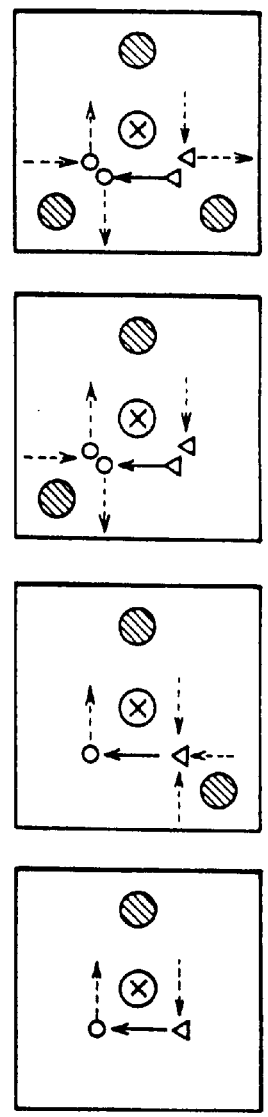
FIG. 62
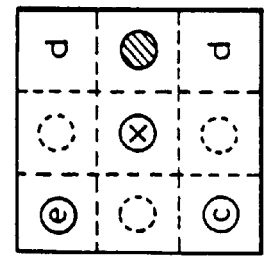
CASE 02

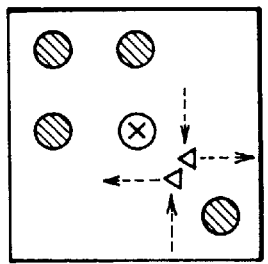
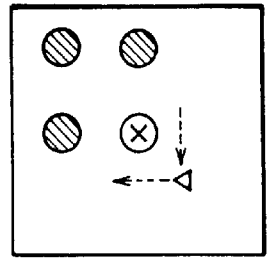
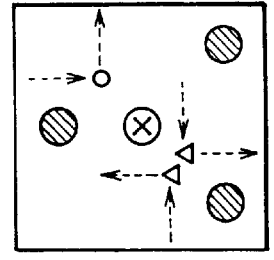
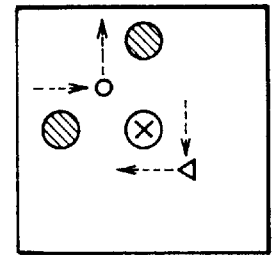
FIG. 63
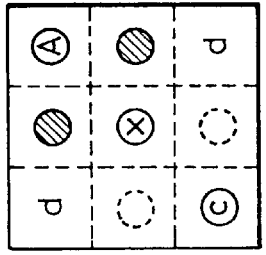
CASE 03
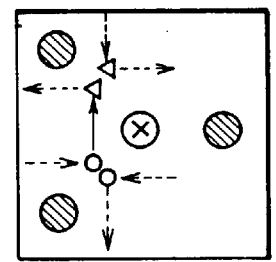
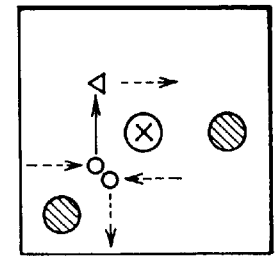
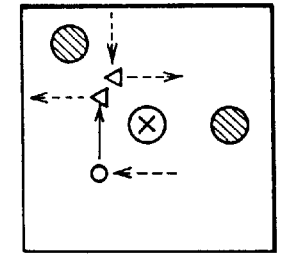
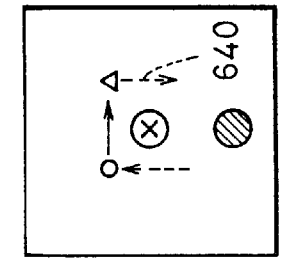
FIG. 64
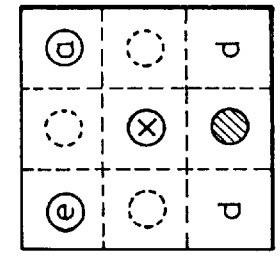
CASE 04

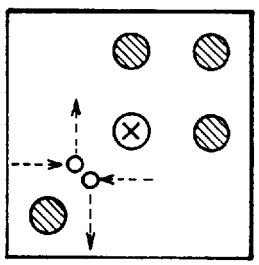
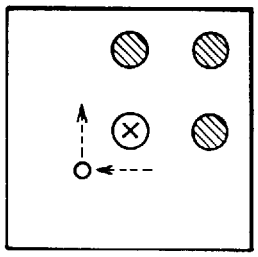
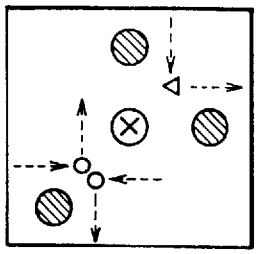
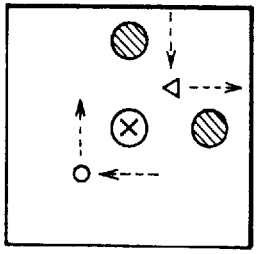
FIG. 65
CASE 06
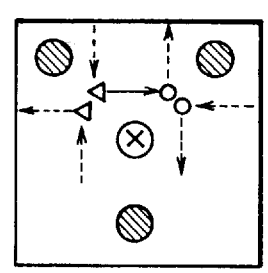
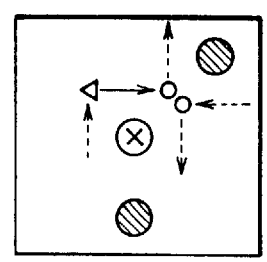
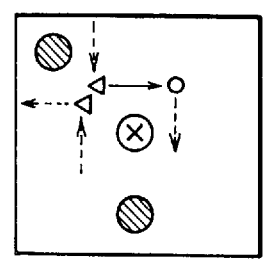
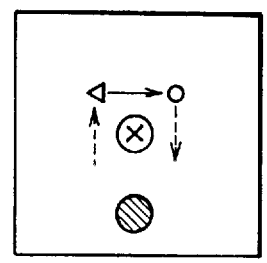
FIG. 66
CASE 08

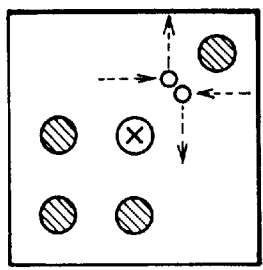
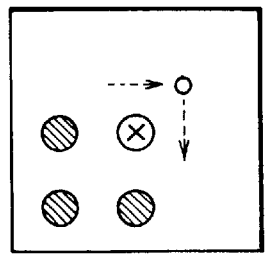
FIG. 67
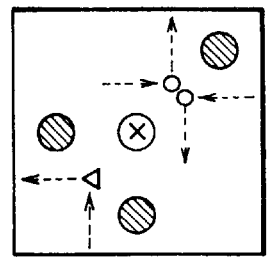
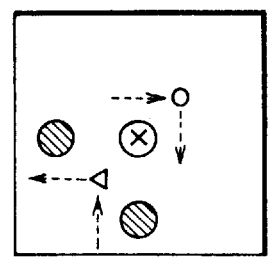
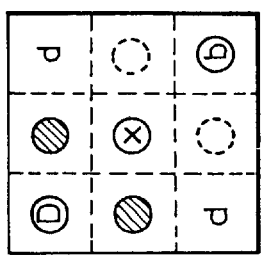
CASE 09
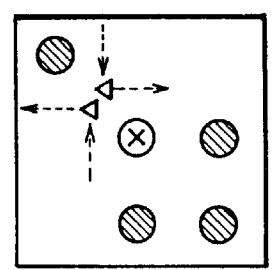
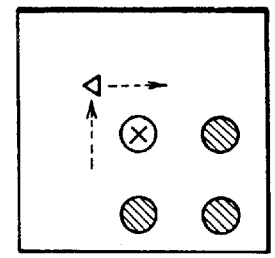
FIG. 68
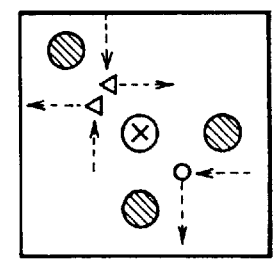
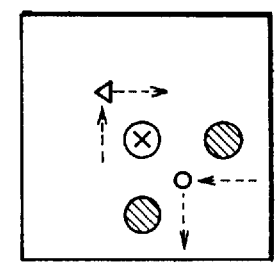
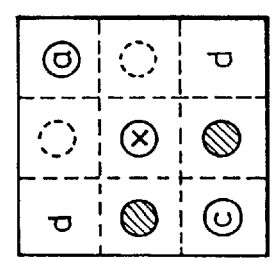
CASE 012

FIG. 84
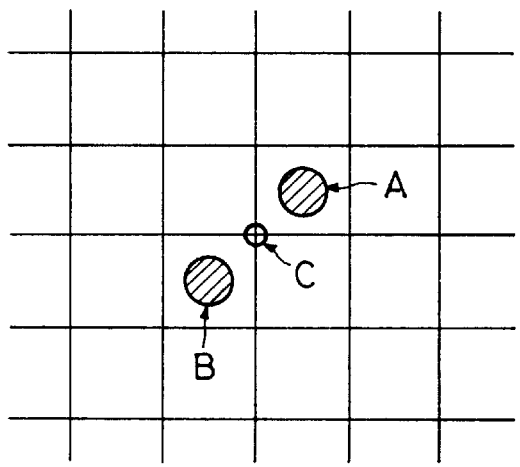
FIG. 85
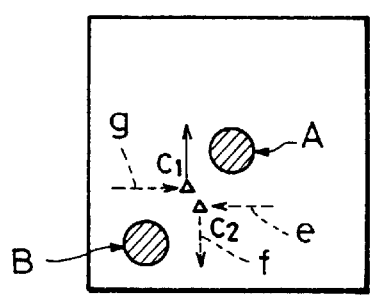
CASE c
FIG. 86     FIG. 87
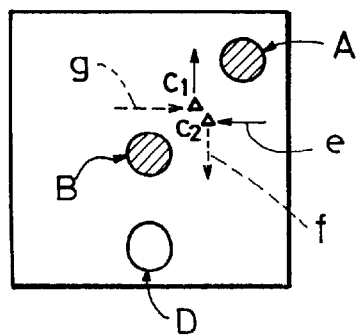 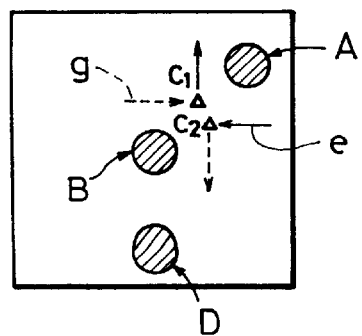
CASE a        CASE a'

CONTOUR EXTRACTING METHOD AND APPARATUS

This application is a continuation of application Ser. No. 07/779,083, filed Oct. 18, 1991, now abandoned.

BACKGROUND OF THE INVENTION

1. Field of the Invention

This invention relates to a method and apparatus for extracting contour lines of a binary image stored in the sequence of raster scanning.

2. Description of the Related Art

Heretofore, when, for example, forming an outline font from a binary dot pattern, contour lines of a binary image character pattern are extracted and stored in the form of vector information, and an outline font of a character is formed from the stored information. Such extraction of contour lines by a binary image is started from finding the start point for tracking a contour line of the binary image. When the start point for tracking has been found, a contour of the image is sequentially tracked from the start point, and tracking is continued while successively providing tracked contour points with marks indicating the completion of tracking. One contour point string (a contour line) is obtained when a loop is formed as a result of tracking. By repeating such a procedure, all the contour lines of the image can be extracted.

FIG. 2 shows an example of the procedure of a well-known contour tracking operation using 8 adjacent pixels. In FIG. 2, a binary image pattern 201 includes a blank portion 202 in an inner portion thereof. A case of extracting contour lines of this pattern will be explained. In FIG. 2, one section represents one dot (pixel (picture element)).

(1) The binary image pattern 201 is subjected to raster scanning from a reference point (0, 0) of the picture surface.

(2) If the raster scanning hits a point (for example, dot 203) not having a mark indicating the completion of tracking, contour tracking of the dot pattern is started from that point $P_0$. If such a point $P_0$ is absent in the entire picture surface, the procedure is terminated.

(3) Tracking is started in the sequence shown in FIG. 3 in the directions of 8 pixels adjacent to the start point $P_0$. A point where a pixel is first met (dot 204 in the case of FIG. 2) is made to be the next contour point $P_1$. If no adjacent point is present, the point is made to be an isolated point, and the process returns to procedure (2).

(4) After marking a contour point $P_i$ in the above-described manner, the next contour point $P_{i+1}$ is extracted from among 8 pixels adjacent to the point $P_i$, as shown in FIG. 4. In searching if any dot is present in the counterclockwise direction around the point $P_i$ (dot 402) starting from a point 401 which has just been marked, a point where a pixel is first met is made to be the next contour point $P_{i+1}$.

(5) Subsequently, contour points are successively obtained by repeating the above-described procedure (4).

If $P_{n+1}=P_1$ and $P_n=P_0$, the contour line string of one region is formed by points $P_0, P_1, \ldots, P_{n-1}$, and the process proceeds to procedure (6).

(6) The process returns to procedure (2) in order to obtain the contour line string of another image region.

Thus, contour tracking is completed. In FIGS. 3 and 4, point ⊗ represents a target point, and point ⊙ (401) represents a point which has just been marked. Numerals shown in FIGS. 3 and 4 indicate the sequence of searching the presence of a pixel (dot).

In the above-described conventional approach, however, since tracking along a contour line is performed after determining the start point for contour tracking, processing of extracting the contour line must be started after receiving the entire image in a memory. Accordingly, the needed capacity of the memory is increased, causing, for example, an increase in the production cost and processing time.

Furthermore, since the start point for the next contour is detected by another raster scanning after extracting one contour point string, pixels which have already been searched are searched again, causing an increase in the amount of calculation of image data, and a decrease in processing speed.

In the above-described conventional approach, a contour is tracked along a center of a pixel (dot), not along sides of a pixel (dot) as shown in FIG. 2. Hence, if a dot pattern having a width of one dot is tracked, the width of the detected contour line is reduced to zero width rather than a one dot width.

SUMMARY OF THE INVENTION

The present invention has been made in consideration of the above-described problems.

It is an object of the present invention to provide a contour extraction apparatus and method which can extract all contours contained in an image with one raster scanning by performing raster scanning of the image, extracting a contour while moving the position of a target pixel, determining the position of the target pixel and the presence of black points in pixels adjacent to the target pixel, extracting candidates for the start points and the end points of vectors on a contour vector string in accordance with the state of the black points, and determining the start point and the end point connected to these candidates.

It is a further object of the present invention to provide a contour extraction apparatus comprising hold means (e.g., latches) for holding states of target pixels and pixels adjacent to the respective target pixels in image data, detection means for taking out the target pixel in the sequence of raster scanning, and detecting a pixel arranging vector in the horizontal direction and in the vertical direction according to the state of the target pixel and pixels adjacent to the target pixel, determination means for determining a state of connection between the pixel arrangement vectors, and extraction means for extracting a contour of the image data according to the state of connection between the pixel arrangement vectors determined by the determination means.

It is a still further object of the present invention to provide a contour extraction method comprising the steps of selecting a point in the image data according to a state of a target pixel and pixels adjacent to the target pixel a point constituting a contour line and determining a direction of connection of points of the contour line according to a state of the adjacent pixels, determining a state of connection between the point constituting the contour line and another point of the contour line, and setting the position of the target pixel in image data in the sequence of raster scanning and extracting a contour point by executing the above-described steps according to the state of adjacent pixels for every target pixel.

It is still another object of the present invention to provide a contour extraction method which holds states of target pixels and pixels adjacent to the respective target pixels in image data, takes out the target pixel in the sequence of raster scanning, detects a pixel arranging vector in the horizontal direction and in the vertical direction according to the state of the target pixel and pixels adjacent to the target pixel, determines a state of connection between the pixel arranging vectors, and extracts a contour of the image data according to the determined state of connection state between the pixel arranging vectors.

BRIEF DESCRIPTION OF THE DRAWINGS

FIGS. 6–21 are diagrams showing examples how vectors are generated in accordance with states of pixels adjacent to respective target pixels in contour extraction in the embodiment;

FIGS. 26–30, and 35–55 are flowcharts showing extraction processing of respective vector strings;

FIG. 31 is a diagram showing a registration table of horizontal vectors having undetermined inflow vectors;

FIG. 32 is a diagram showing a registration table of horizontal vectors having undetermined outflow vectors;

FIGS. 60–68 are diagrams showing examples how vectors are generated in accordance with states of pixels adjacent to respective target pixels in contour extraction in another embodiment of the present invention;

FIG. 84 is a diagram showing an example of input for illustrating processing in the foregoing embodiments;

FIGS. 85–87 are diagrams illustrating processing for the input shown in FIG. 84;

FIGS. 96 and 97 are diagrams showing the contents of the processing for case a;

DETAILED DESCRIPTION OF THE PREFERRED EMBODIMENTS

Preferred embodiments of the present invention will now be explained in detail with reference to the drawings.

First Embodiment

Figure 1:
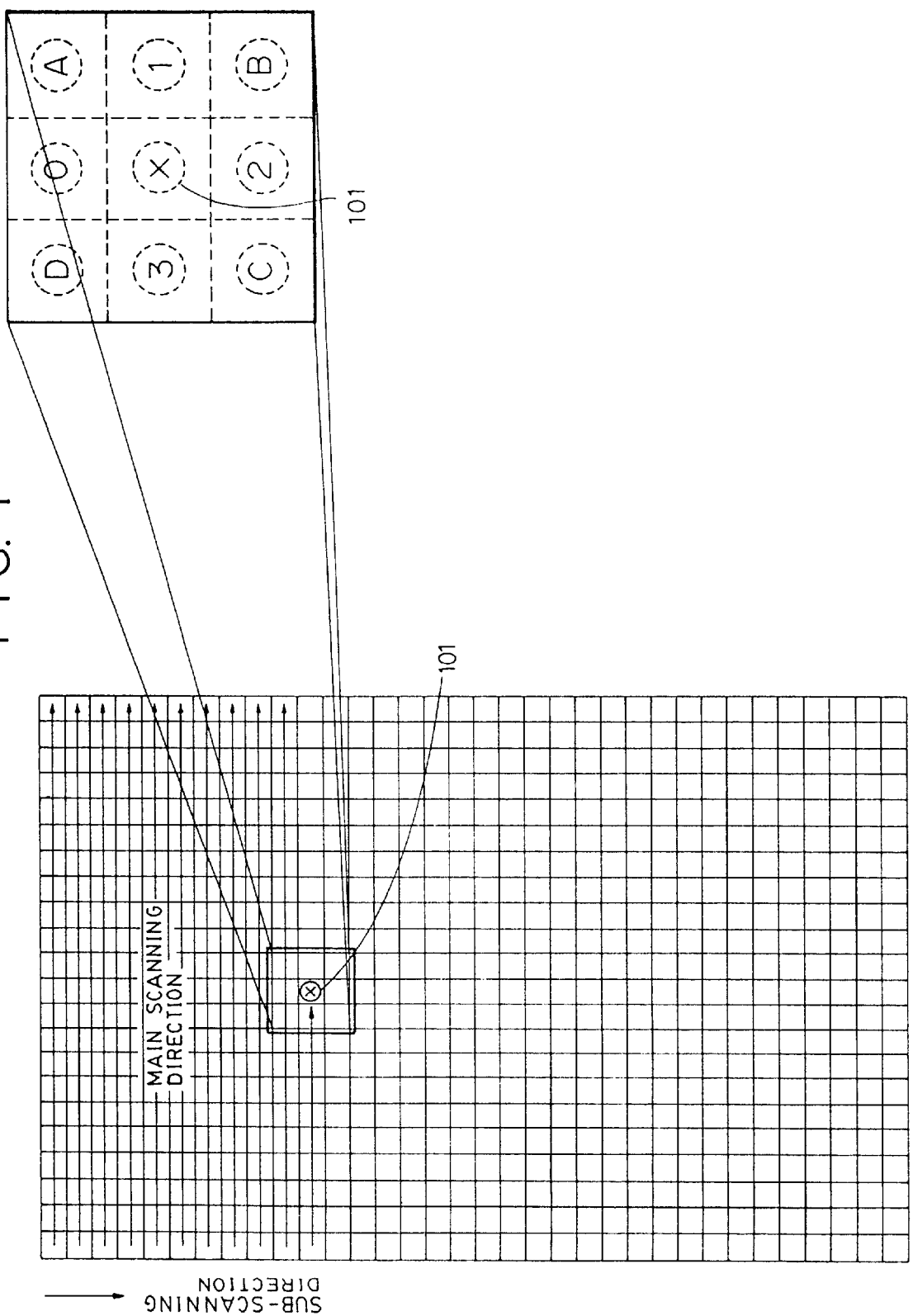
FIG. 1 is a diagram showing a target pixel and pixels adjacent to the target pixel in an embodiment of the present invention.
Figure 2:
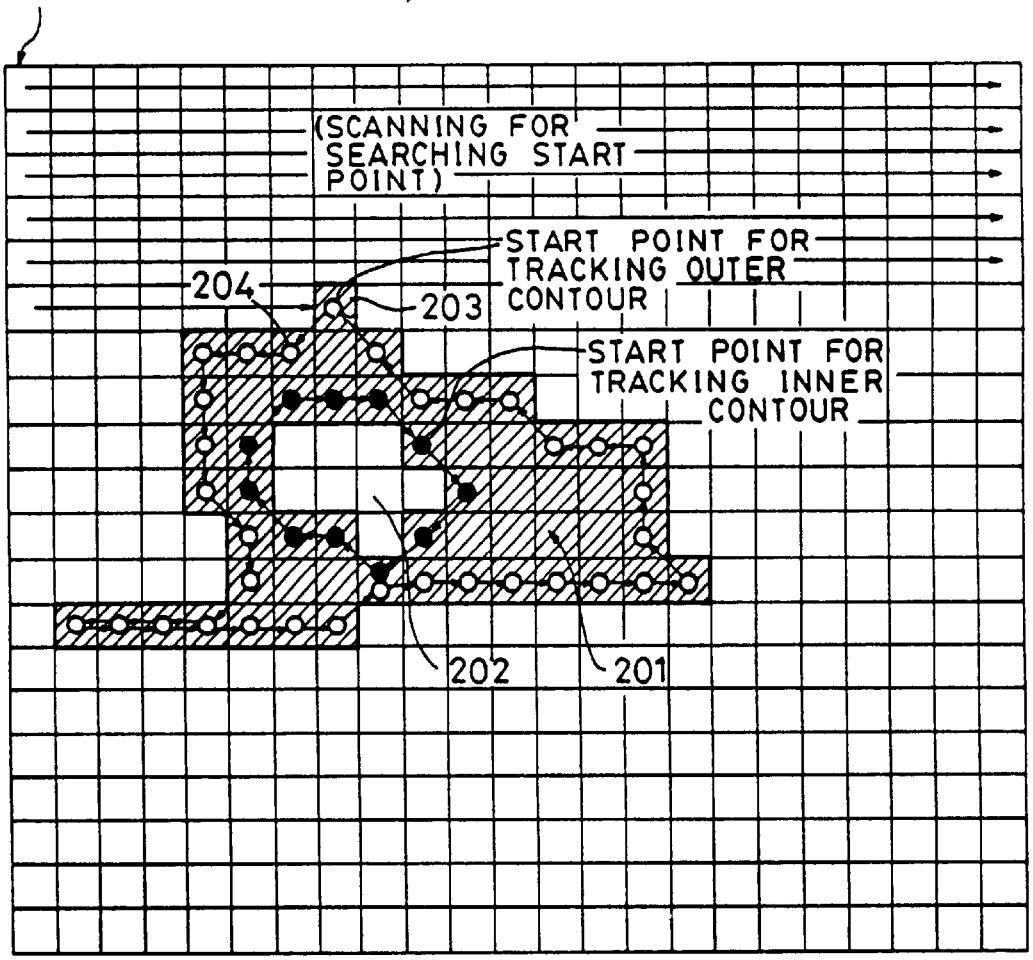
FIGS. 2–4 are diagrams illustrating a conventional approach.
Figure 3:
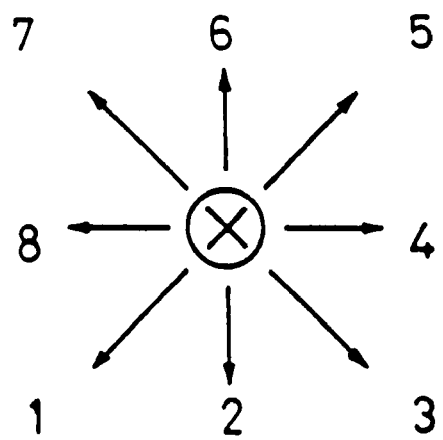

In a first embodiment of the present invention, as shown in FIG. 1, processing is performed while checking a state of a target pixel (101) and 8 pixels adjacent to the target pixel in a binary image. Processing of the entire image is successively performed by raster-scanning the target pixel and shifting the target pixel in units of a pixel.

In FIG. 1, a mark ⊗ represents the target pixel 101. Positions indicated by "0" and "2" represent a pixel (0) on the preceding raster and a pixel (2) on the succeeding raster in the sub-scanning direction situated at the same position as the target pixel 101 in the main scanning direction, respectively. Positions indicated by "1" and "3" represent a pixel (3) preceding the target pixel 101 and a pixel (1) succeeding the target pixel 101 on the same raster as the target pixel 101, respectively. Positions "A" and "B" represent pixels at a position succeeding the target pixel 101 in the main scanning direction on the preceeding raster and on the succeeding raster, respectively. Positions "C" and "D" represent pixels at a position preceeding the target pixel 101 in the main scanning direction on the succeeding raster and on the preceeding raster, respectively.

Figure 5:
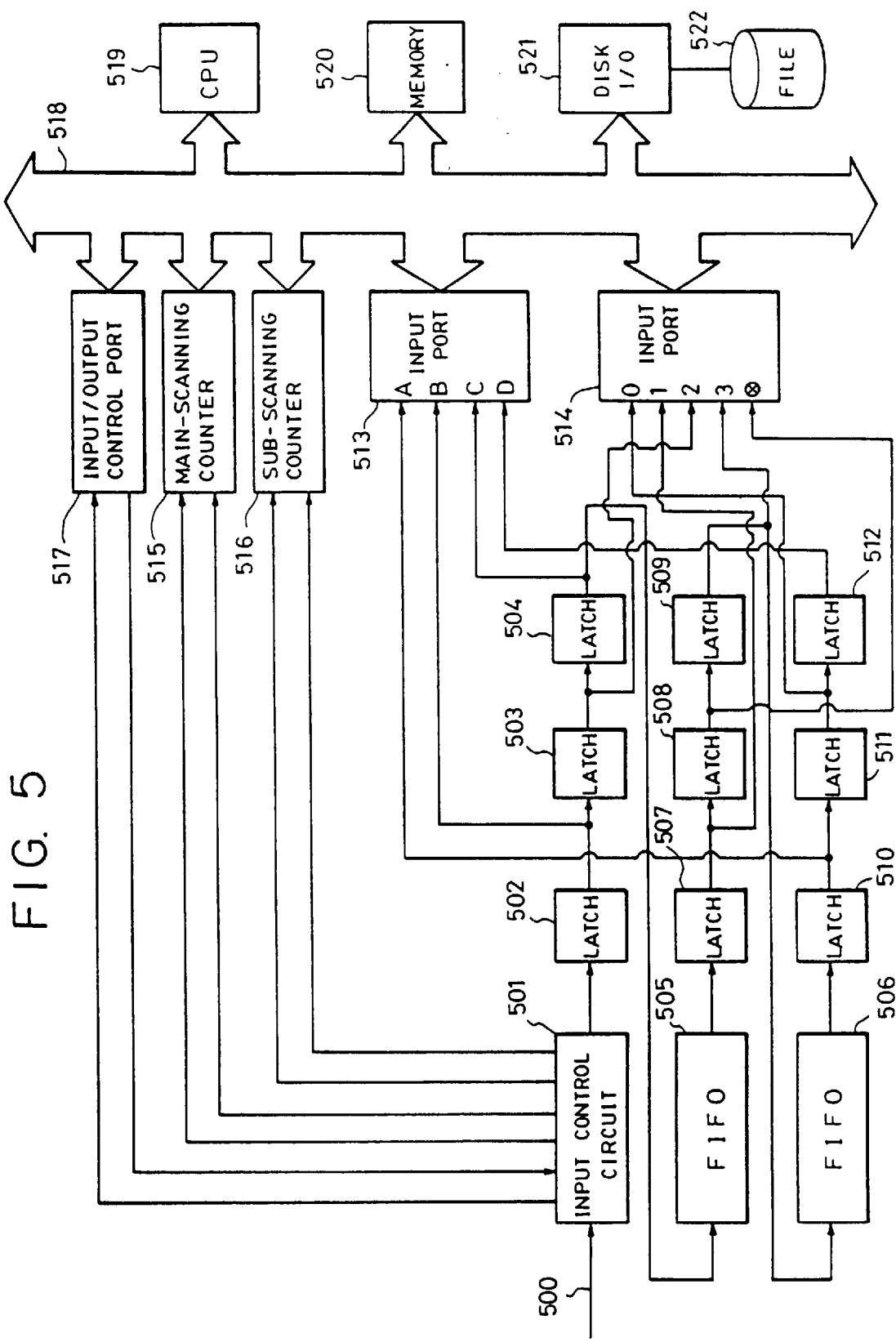
FIG. 5 is a diagram showing the schematic configuration of a contour extraction apparatus of the embodiment.

FIG. 5 is a block diagram showing the configuration of hardware for performing contour detection in the present embodiment.

In FIG. 5, an input control (interface) circuit 501 deals with image data input via a signal line 500. Binary image data are sequentially input to the input control circuit 501 via the signal line 500 in the form of raster scanning. A latch 502 holds image data input from the input control circuit 501 while sequentially updating every pixel in synchronization with a pixel synchronizing clock pulse (not shown). The latch 502 inputs data of the next pixel from the input control circuit 501 with the next pixel synchronizing clock pulse. At that time, already held image data is latched in a latch 503 in synchronization with that pixel clock pulse. In the same manner, the image data held in the latch 503 is latched in a latch 504 with the next pixel synchronizing clock pulse.

FIFOs (first-in first-out memories) 505 and 506 hold image data for one raster, respectively. The FIFO 505 sequentially receives the output of the latch 504 in synchronization with the pixel synchronizing clock pulse, and outputs data of the preceeding raster to a latch 507. In the same manner, the FIFO 506 receives the output of a latch 509, and outputs image data of the preceeding raster to a latch 510. Latches 507, 508 and 509, and latches 510, 511 and 512 operate in the same manner as the above-described latches 502, 503 and 504.

Data of 9 pixels stored in the latches 502, 503, 504, 507, 508, 509, 510, 511 and 512 comprise image data of a region comprising 9 (3×3) pixels shown in FIG. 1. That is, the data in these latches correspond to the data of the positions "B", "2", "C", "1", "⊗", "3", "A", "0" and "D" shown in FIG. 1.

Reference numerals 513 and 514 represent input ports for a CPU 519. The input port 513 inputs the data of the latches 510, 502, 504 and 512, that is, the data of the positions "A", "B", "C" and "D" shown in FIG. 1, to the CPU 519. In the same manner, the input port 514 inputs the data of the latches 511, 507, 503, 509 and 508, that is, the data of the positions "0", "1", "2", "3" and "⊗", to the CPU 519.

A main-scanning counter 515, indicates the position of a pixel in the main scanning direction, is reset by a sub-scanning synchronizing signal (not shown), and performs counting with a pixel synchronizing signal. A sub-scanning counter 516, indicates the position of a pixel in the sub-scanning direction, is reset by a page synchronizing signal (not shown), and performs counting with a sub-scanning synchronizing signal. An input/output control port 517 holds a signal indicating execution/holding of pixel data input, a signal notifying pixel data updating from the input control circuit 501 to the CPU 519, and the like. There is also shown an input/output control unit 521 for a hard disk 522. The input/output control port 517, the main-scanning counter 515, the sub-scanning counter 516, the input ports 513 and 514, the memory 520 and the disk I/O 521 are connected to the CPU 519 via a bus 518.

According to the above-described configuration, the CPU 519 can update image data via the input/output control port 517, and know the position (i, j) of the target pixel via the main-scanning counter 515 and the sub-scanning counter 516. The CPU 519 can also know the state of the target pixel and the adjacent pixels in the 8 directions via the input ports 513 and 514.

When processing of the target pixel has been completed as described above, the CPU 519 instructs updating of image data stored in the 9 latches via the input/output control port 517, and resets a signal indicating the completion of updating of image data. In receiving the instruction of updating, the input control circuit 501 clears the signal indicating updating of image data, and updates image data latched in the latch of the following stage. When the updating operation has been completed, the input control circuit 501 outputs a signal indicating the completion of updating to the input/output control port 517.

After outputting the instruction of updating, the CPU 519 awaits the input of a signal indicating the completion of updating from the input/output control port 517. When the signal indicating the completion of updating has been input, the CPU 519 executes processing relating to image data newly stored in the 9 latches. Subsequently, the same processing as described above is repeated. In completing processing of the last pixel in the image region as the target pixel, the input control circuit 501 outputs an end signal to the input/output control port 517.

Next, an explanation will be provided of processing in respective cases performed in accordance with the state of the target pixel and 8 adjacent pixels.

When the target pixel comprises a white pixel, the processing is terminated, raster scanning is advanced by one pixel, and the position of the target pixel is updated.

When the target pixel comprises a black pixel, the following processing is performed in accordance with the state of adjacent pixels. FIGS. 6–21 show the contents of processing in respective states.

Figure 6:
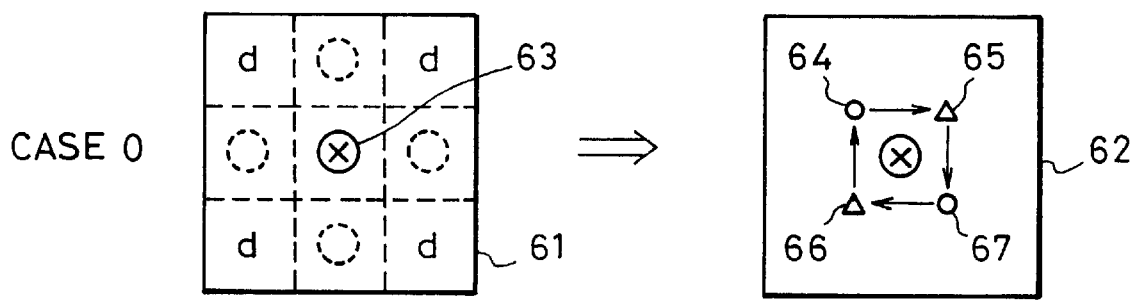
Figure 7:
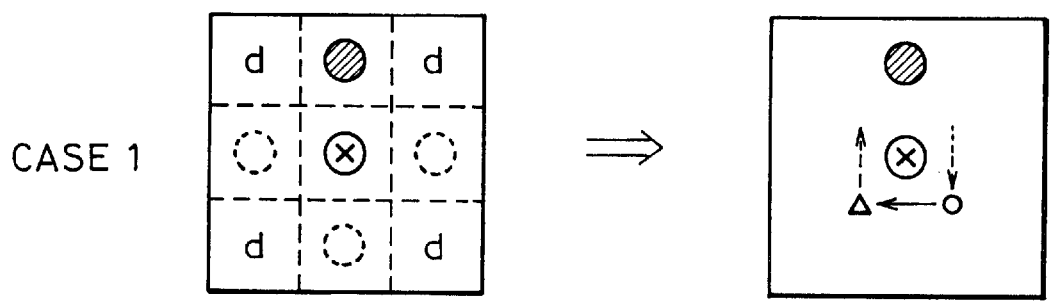
Figure 10:
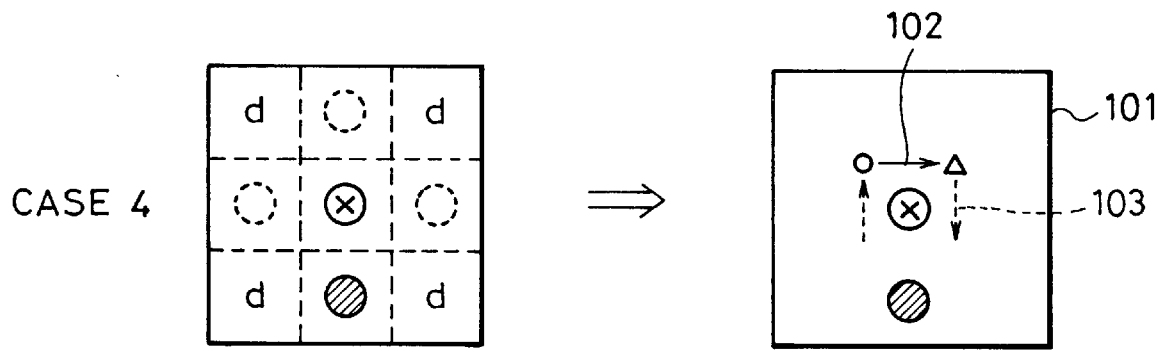
Figure 11:
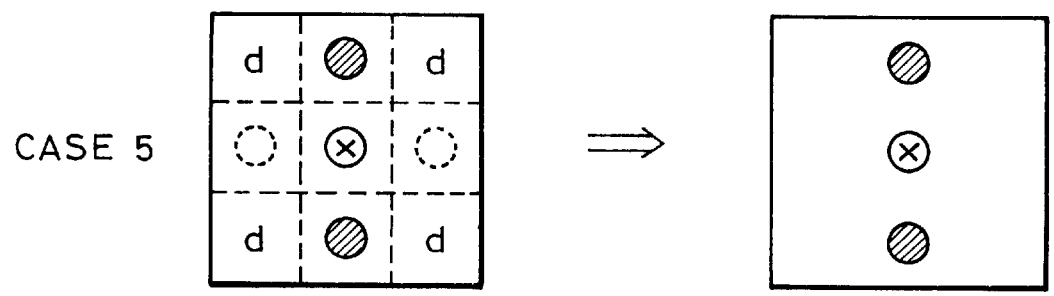
Figure 18:
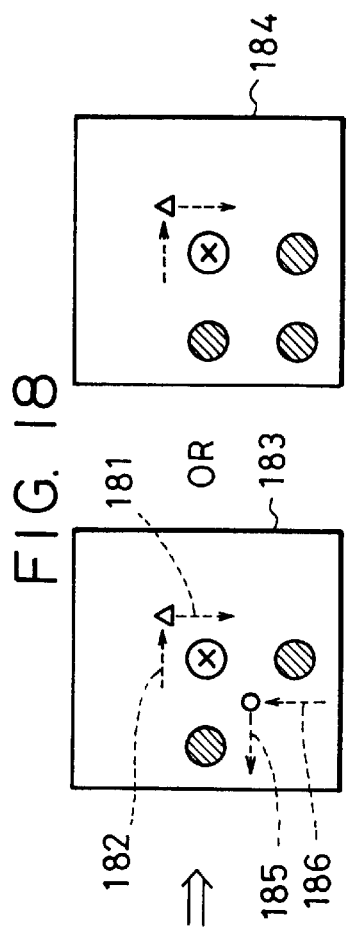

In a pixel matrix 61 shown in FIG. 6, "d" indicates "do not care", that is, that a pixel at a position indicated by "d" may be either a white pixel or a black pixel. This holds also in the drawings following FIG. 6. In a pixel matrix 62 shown in FIG. 6, a mark ○ represents the start point of a horizontal-direction vector and the end point of a vertical-direction vector, and a mark Δ represents the start point of a vertical-direction vector and the end point of a horizontal-direction vector. A solid-line arrow in the matrix 62 of FIG. 6 represents a contour vector in the direction of the arrow having determined start point and end point. A broken-line arrow shown in FIG. 7 represents a contour vector in the direction of the arrow in which only either one of the start point and the end point is determined. These marks ○ and Δ, and solid-line and broken-line arrows also have the same meaning in the drawings following FIG. 6. A mark ● indicates a black pixel. A white pixel is indicated by a broken-line mark ○ only when its position must be clearly indicated, but is not indicated in other cases.

It is assumed that the start point and the end point of the contour vector are situated at midpositions between pixels both in the main scanning direction and the sub-scanning direction. It is also assumed that the position of a pixel is indicated by positive integers both in the main scanning direction and the sub-scanning direction, and is represented by two-dimensional coordinates. For example, if the position of the target pixel 63 shown in FIG. 6 is [(3, 7): indicating the position of the 3rd pixel on the 7th raster], four vectors shown in the matrix 62 of FIG. 6 are represented as four continuous vectors having start points and end points at points 64 (2.5, 6.5), 65 (3.5, 6.5), 66 (3.5, 7.5) and 67 (2.5, 7.5).

Figure 4:
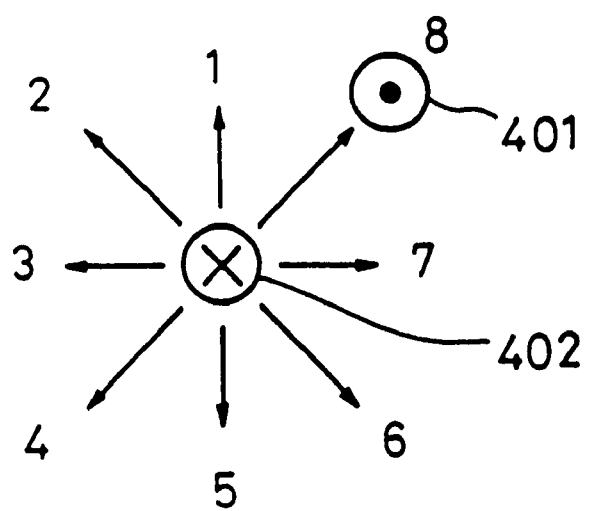

If these vectors are represented by (the coordinate of the start point, the coordinates of the end point), the four vectors shown in FIG. 4 are represented by:

[(2.5, 6.5), (3.5, 6.5)]

[(3.5, 6.5), (3.5, 7.5)]

[(3.5, 7.5), (2.5, 7.5)]

[(2.5, 7.5), (2.5, 6.5)].

In order to avoid representation in decimal fractions, the positions of pixels will be hereinafter represented only by even numbers, and the positions of start points and end points will be represented only by odd numbers. That is, an image comprising m pixels×n pixels will be represented by coordinates comprising positive even-numbers (integers) 2m×2n. Accordingly, in FIG. 6, the position of the target pixel is represented by (6, 14), and the four end points and start points are represented by (5, 13), (7, 13), (7, 15) and (5, 15), respectively. Hence, the four vectors shown in FIG. 6 are represented, respectively, by:

[(5, 13), (7, 13)]

[(7, 13), (7, 15)]

[(7, 15), (5, 15)]
[(5, 15), (5, 13)]].

In the following explanation, it is assumed that a binary image comprises m×n pixels (m and n are positive integers) configured by n rasters each including m pixels, and the position of the i-th pixel on the j-th raster is represented by (2i, 2j) (i and j are positive integers, and i≦m and j≦n).

Explanation of Contour Extraction Processing

Figure 22:
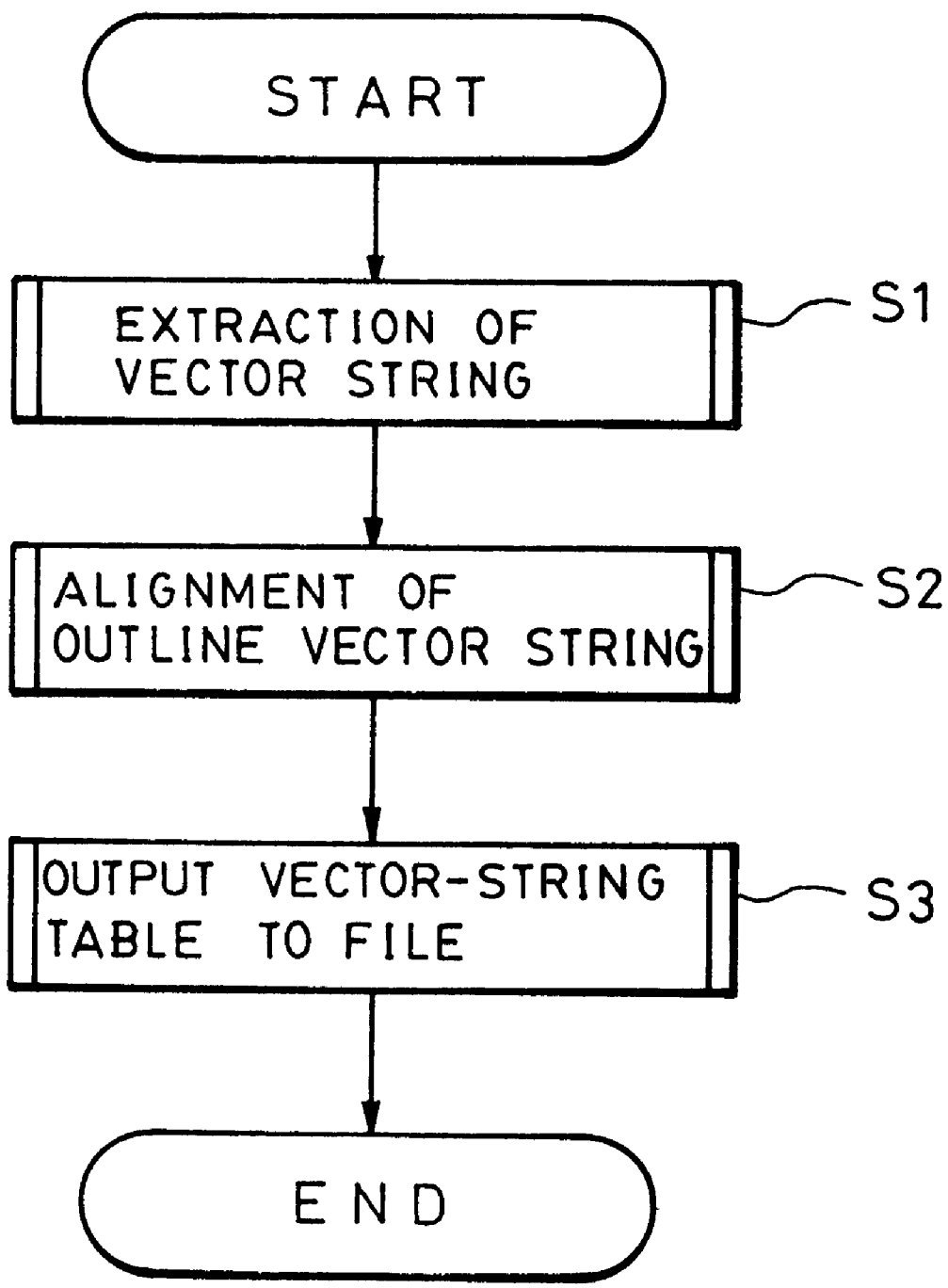
FIG. 22 is a flowchart showing entirety of contour extraction processing.

FIG. 22 is a flowchart showing the entire flow of contour extraction processing by the CPU 519 of the apparatus of the embodiment.

Figure 23:
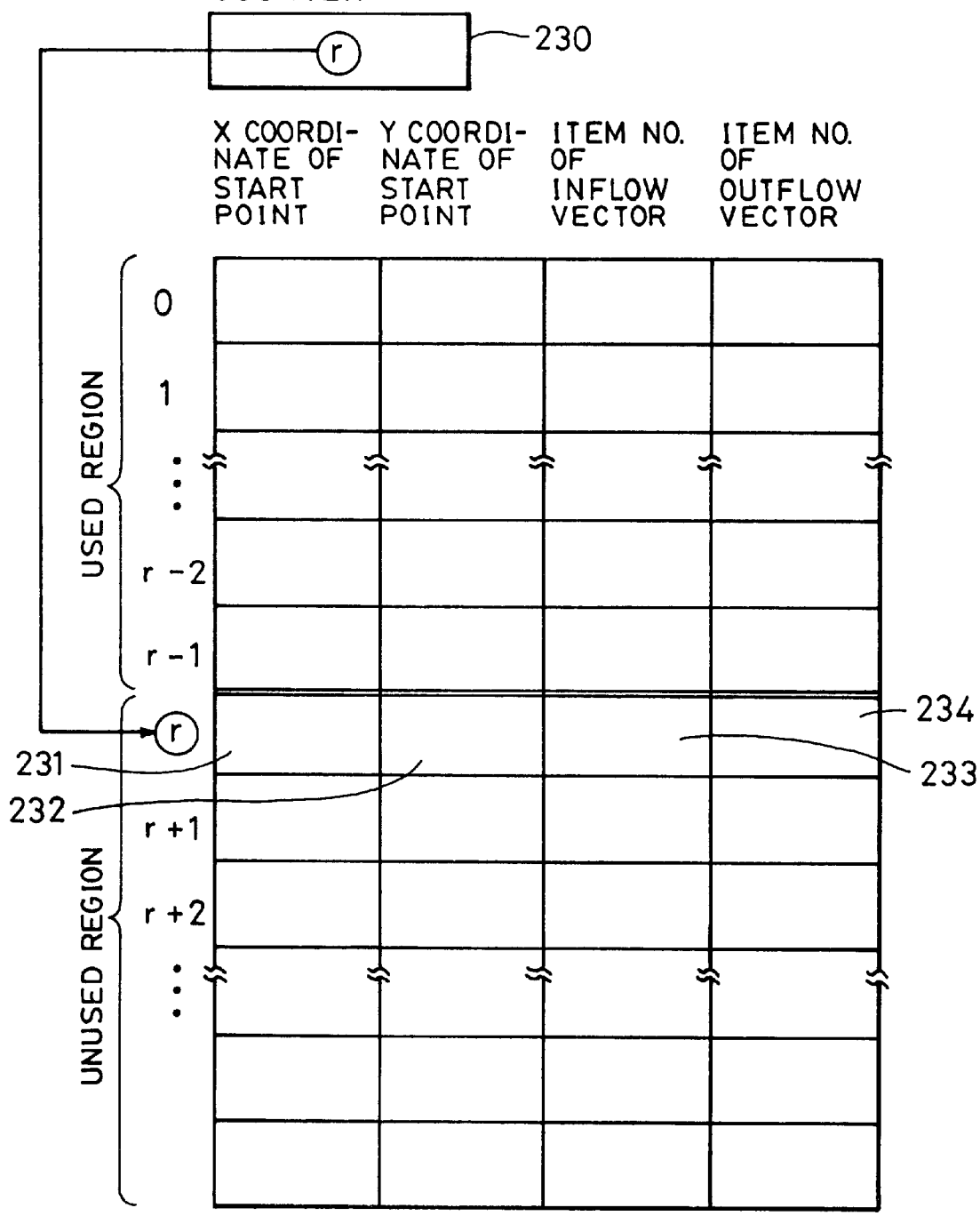
FIG. 23 is a diagram showing a registration table of horizontal vectors.
Figure 24:
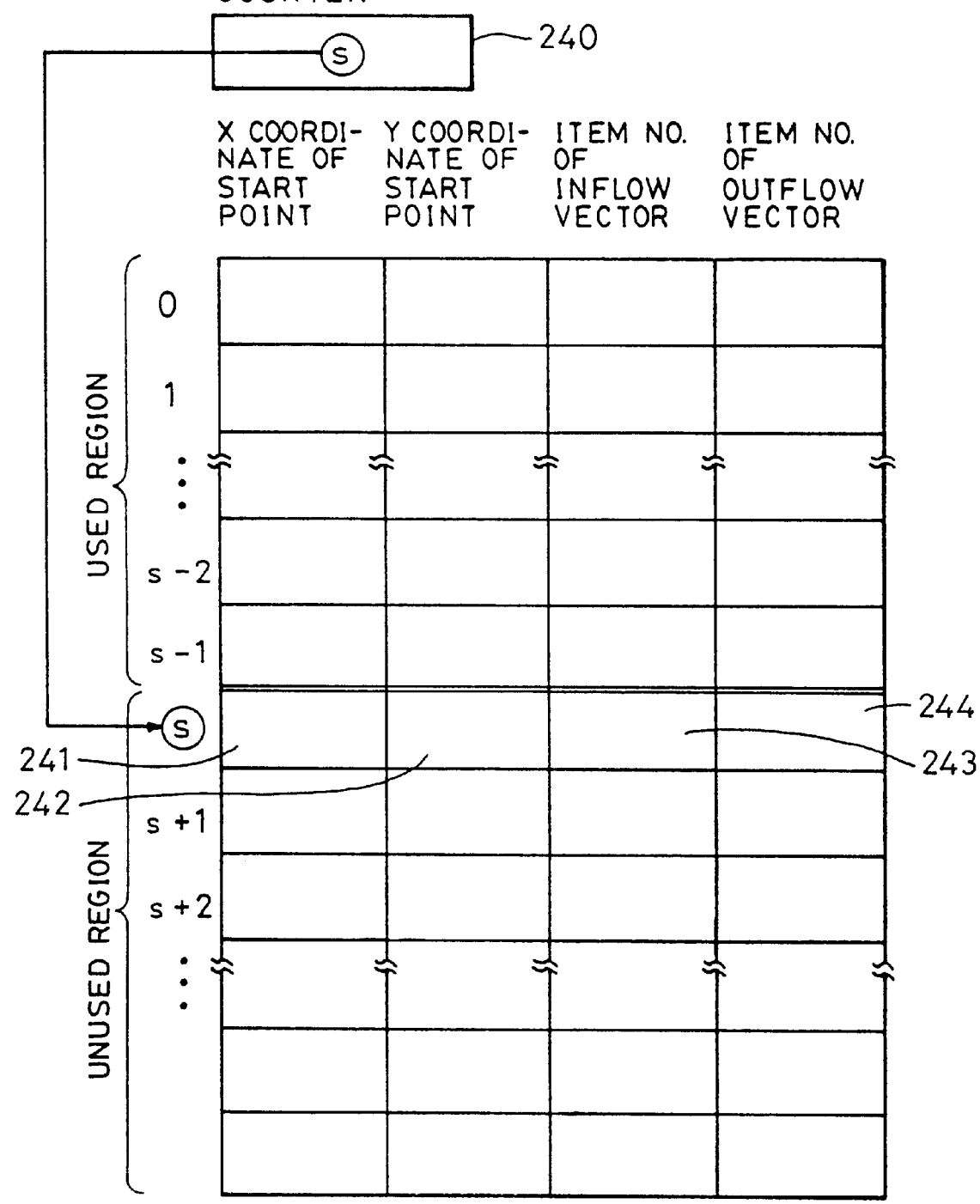
FIG. 24 is a diagram showing a registration table of vertical vectors.

First, in step S1, a vector string is extracted from binary image data. Values for each vector in the vector string are output in the form of tables, as shown in FIGS. 23 and 24. The values consist of coordinates of the start point of a particular vector, a numerical designation of the particular vector's corresponding inflow vector and a numerical designation of the particular vector's corresponding outflow vector. A particular vector's corresponding inflow vector is a vector having an end point identical to the start point of the particular vector. Accordingly, a particular vector's corresponding outflow vector is a vector having a start point identical to the endpoint of the particular vector.

FIG. 23 is a diagram showing horizontal-direction vectors, and FIG. 24 is a diagram showing vertical-direction vectors.

Figure 25:
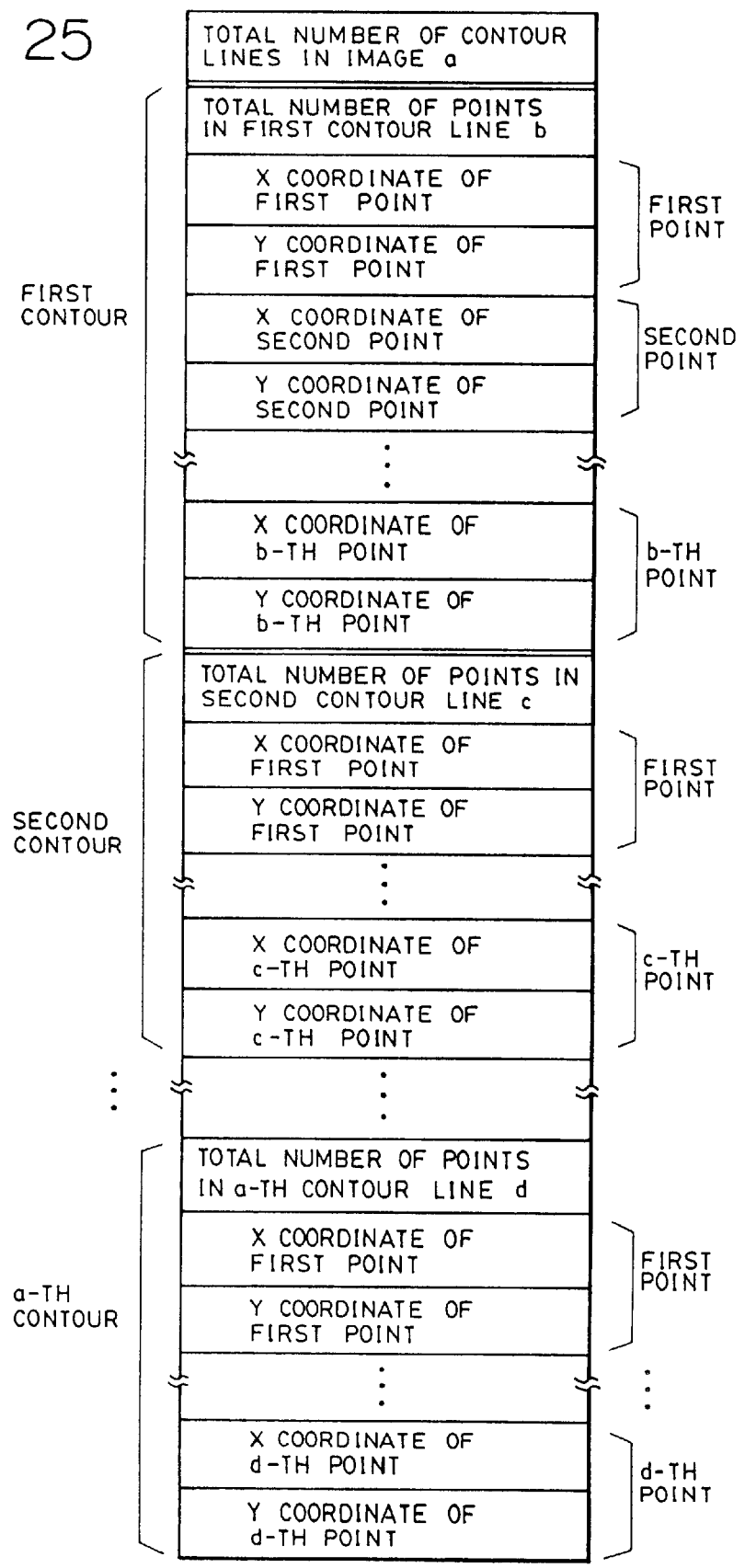
FIG. 25 is a diagram showing the form of data of contour lines.

The process then proceeds to step S2, where, by following item numbers of inflow and outflow vectors from the tables shown in FIGS. 23 and 24, a table storing the total number of contour lines in the image, the total number of points in respective contour lines, and the x coordinates and the y coordinates of respective points in the respective contour lines is formed, as shown in FIG. 25. The process then proceeds to step S3, where the table is stored in the disk 522 via the disk in file I/O 521, and a series of operations are terminated.

Figure 26:
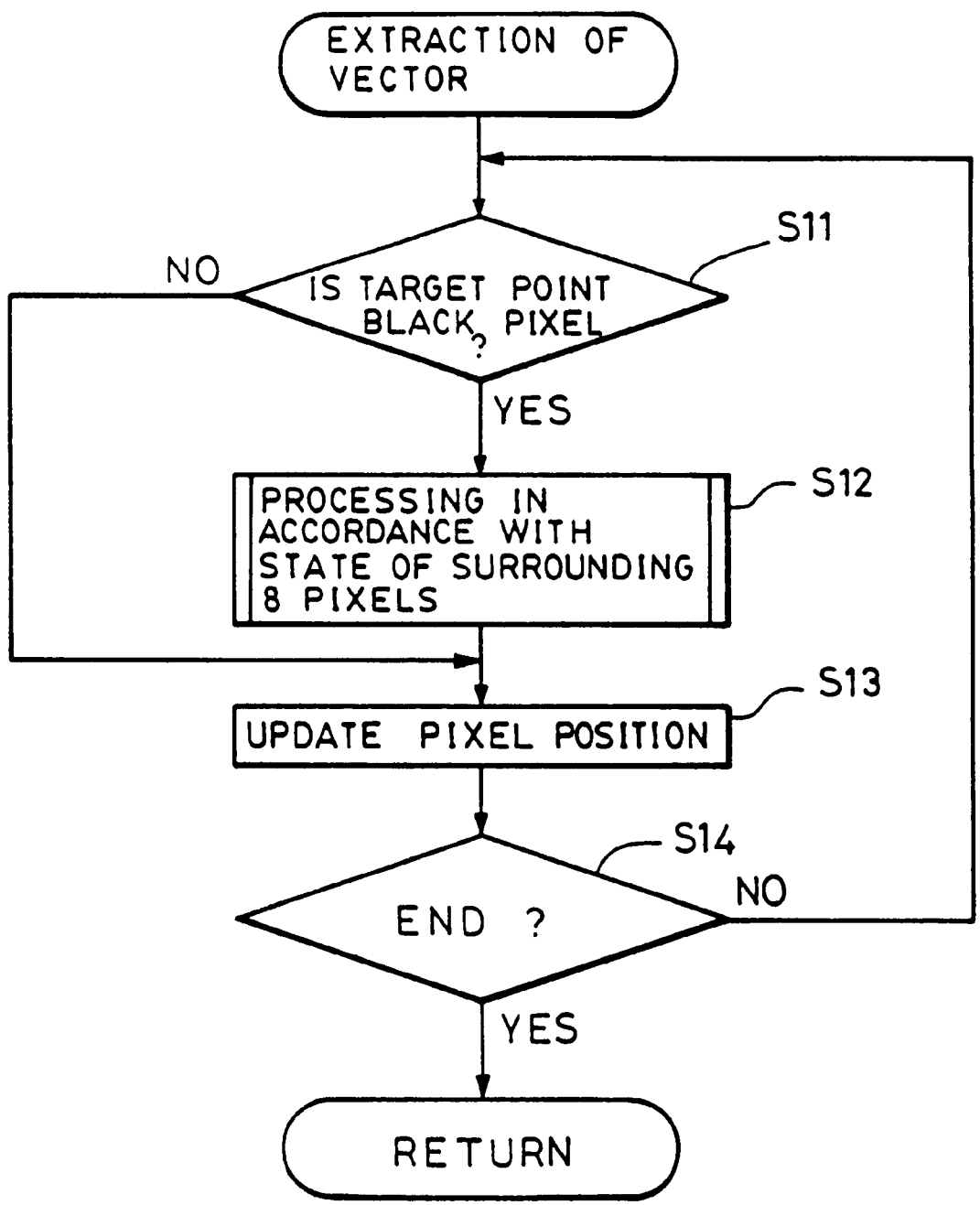

FIG. 26 is a flowchart showing the vector string extraction processing in the step S1.

First, in step S11, by checking bit 4 (the target pixel) of the input port 514, the CPU 519 determines whether the target pixel is a white pixel or a black pixel. In the case of a white pixel, the process proceeds to step S13. In the case of a black pixel, the process proceeds to step S12. In step S12, by checking the state of 8 pixels surrounding the target pixel, a processing routine appropriate for the state is called.

In step S13, updating of the position of the pixel is instructed via the input/output control port 517, as described above. In receiving a signal indicating the completion of updating from the input/output control port 517, the process proceeds to step S14, where the CPU 519 determines whether or not processing of the last pixel has been completed. If the result of the determination is negative, the process returns to step S11, where the same processing as described above is also performed for the next pixel. If the result of the determination is affirmative, the process returns to the original routine.

Figure 27:
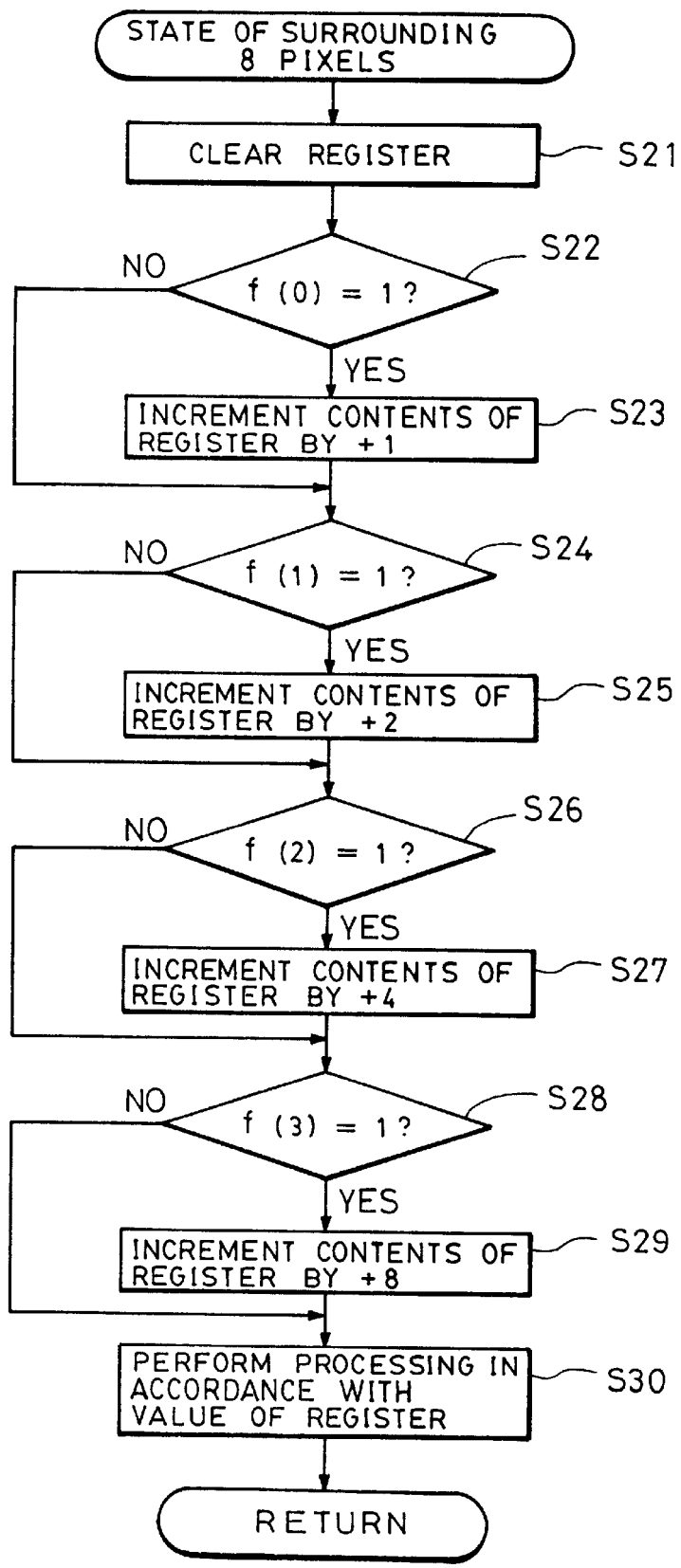

FIG. 27 is a flowchart showing processing to be executed in accordance with the state of surrounding pixels shown in step S12 of FIG. 26.

In step S21, the register of the CPU 519 is cleared to "0". The process then proceeds to step S22. If the state (hereinafter represented by f(0)) of the pixel at the position indicated by "0" in FIG. 1 is a black pixel (hereinafter represented by "1"), the process proceeds to step S23. If the state is a white pixel (hereinafter represented by "0"), the process proceeds to step S24. In step S23, 1 is added to the contents of the above-described register.

The process then proceeds to step S24. If the state of the pixel at position "1" in FIG. 1 is a black pixel (f(1)=1), the process proceeds to step S25, where 2 is added to the contents of the register. If f(1)=0, the process proceeds to step S26, where the CPU 519 checks whether or not the pixel at position "2" in FIG. 1 is a black pixel. If f(2)=1 (the pixel is a black pixel), the process proceeds to step S27, where 4 is added to the contents of the register.

The process then proceeds to step S28, where the pixel at position "3" shown in FIG. 1 is checked. If f(3)=1, the process proceeds to step S29, where 8 is added to the contents of the register. If f(3) is not 1, the process proceeds to step S30. In step S30, a routine having a processing number corresponding to the value held by the register is called.

According to the above-described processing, the contents of the register may have values 0–15 in accordance with the states of respective pixels at positions "0", "1", "2" and "3" shown in FIG. 1. Various cases corresponding to respective values are shown in FIG. 6 (case 0), FIG. 7 (case 1), FIG. 8 (case 2), FIG. 9 (case 3), FIG. 10 (case 4), FIG. 11 (case 5), FIG. 12 (case 6), FIG. 13 (case 7), FIG. 14 (case 8), FIG. 15 (case 9), FIG. 16 (case 10), FIG. 17 (case 11), FIG. 18 (case 12), FIG. 19 (case 13), FIG. 20 (case 14) and FIG. 21 (case 15).

The contents of processing corresponding to respective states will now be described in detail.

Figure 28:
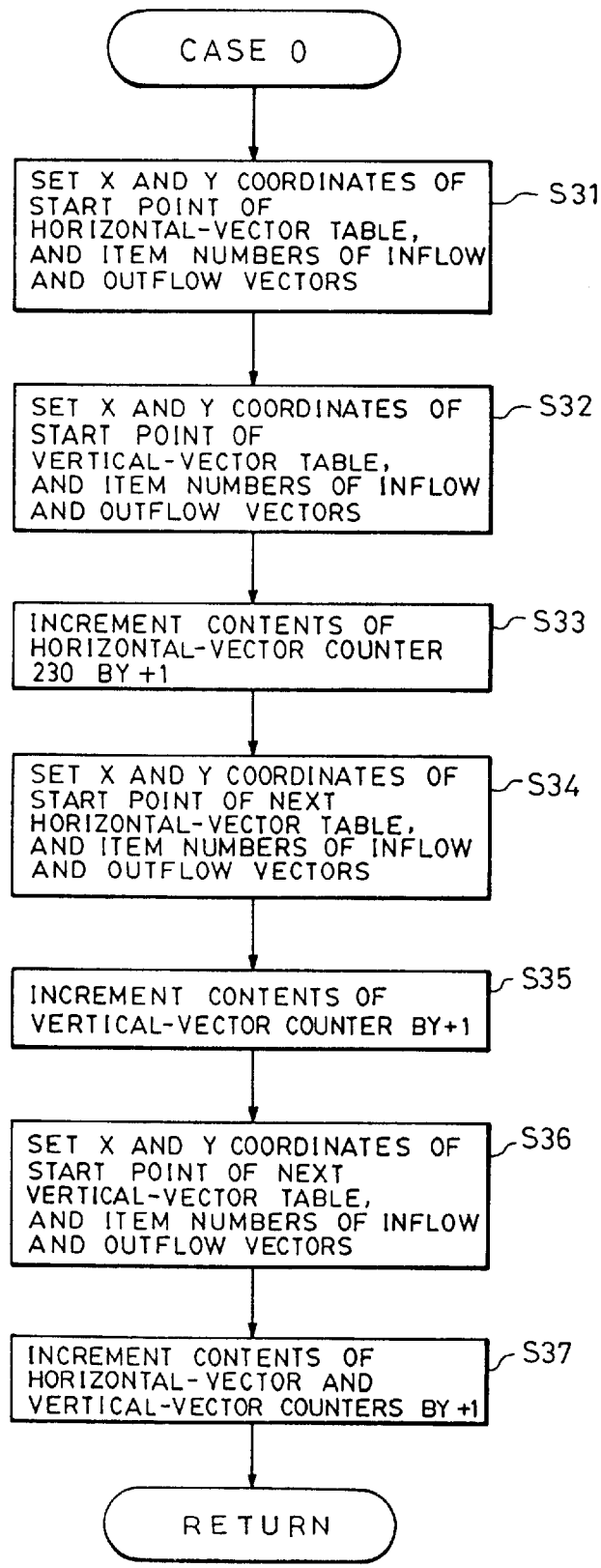

When the value of the register is "0" in step S30 of FIG. 27, processing shown in FIG. 28 is executed. FIG. 28 shows a routine for processing the state (case 0) shown in FIG. 6. An explanation will now be provided assuming that the coordinates of the target pixel 63 are (2i, 2j).

Explanation of Processing for Case 0 (FIGS. 6, 23, 24 and 28)

In step S31 shown in FIG. 28, a point (2i−1, 2j−1) is registered as the start point of the horizontal vector. That is, the value (2i−1) is stored in the column (231 in FIG. 23) in the x coordinate table of the start point (64 in FIG. 6) of the horizontal vector indicated by the horizontal-vector counter 230 shown in FIG. 23, and the value (2j−1) is stored in the column (232 in FIG. 23) in the y coordinate table of the start point of the horizontal vector. The vertical vector flowing into the horizontal vector is a vector stored in the position next to the position in the start point coordinate table of the vertical vector indicated by the vertical-vector counter 240 shown in FIG. 24 at this time period. The vertical vector where the horizontal vector flows out to is situated at the position in the start point coordinate table of the vertical vector indicated by the vertical-vector counter 240 at this time period.

That is, a value obtained by adding 1 to the value of the vertical-vector counter 240 is stored at the position (233 in the case of FIG. 23) indicated by the horizontal-vector counter 230 in the column of the item number of the inflow vector for the horizontal vector shown in FIG. 23. The value of the vertical-vector counter 240 is stored at the position (234 in the case of FIG. 23) indicated by the horizontal-vector counter 230 in the column of the item number of the outflow vector for the horizontal vector.

Next, in step S32, a point (2i+1, 2j−1) is registered as the start point (65 in FIG. 6) of the vertical vector. The horizontal vector flowing into this vertical vector is the horizontal vector registered in step S31. Another horizontal vector where the vertical vector flows out to is registered as a horizontal vector stored at the position next to that of the horizontal vector registered in step S31 in the start point coordinate table.

That is, referring to FIG. 24, the values (2i+1), (2j−1), the value of the horizontal-vector counter 230 at this time period and a value obtained by adding 1 to the value of the horizontal-vector counter 230 at this time period are stored in columns 241, 242, 243 and 244, respectively.

The process then proceeds to step S33, where the contents of the horizontal-vector counter 230 are incremented by one. In step S34, the coordinates (2i+1, 2j+1) are registered as the coordinates of the start point (67 in FIG. 6) of a horizontal vector, the vector registered in step S32 is registered as a vertical vector flowing into this horizontal vector, and another vertical vector (a vector connecting points 66 and 64, i.e., from 66 (start point) to 64 (end point), in FIG. 6) to be stored in step S36 which will have to at the position next to the vertical vector registered in step S32 within the vertical vector start point coordinate table is registered as a vertical vector where this horizontal vector flows out to.

In step S35, the contents of the vertical vector counter 240 are incremented by one. In step S36, coordinates (2i−1, 2j+1) are registered as the coordinates of the start point of the vertical vector, the horizontal vector registered in step S34 is registered as the horizontal vector flowing into this vertical vector, and the horizontal vector registered in step S31 is registered as the horizontal vector where this vertical vector flows out to. In step S37, the contents of both the horizontal-vector counter 230 and the vertical-vector counter 240 are incremented by one, and the processing is terminated.

The result of the processing is extracted as the state shown in the matrix 62 of FIG. 6, in which a loop is formed by circulation of four vectors, i.e., two horizontal vectors connecting points 64 and 65 and points 67 and 66, and two vertical vectors connecting points 65 and 67 and points 66 and 64.

Explanation of Processing for Case 1 (FIGS. 7, 23, 24 and 29)

Figure 29:
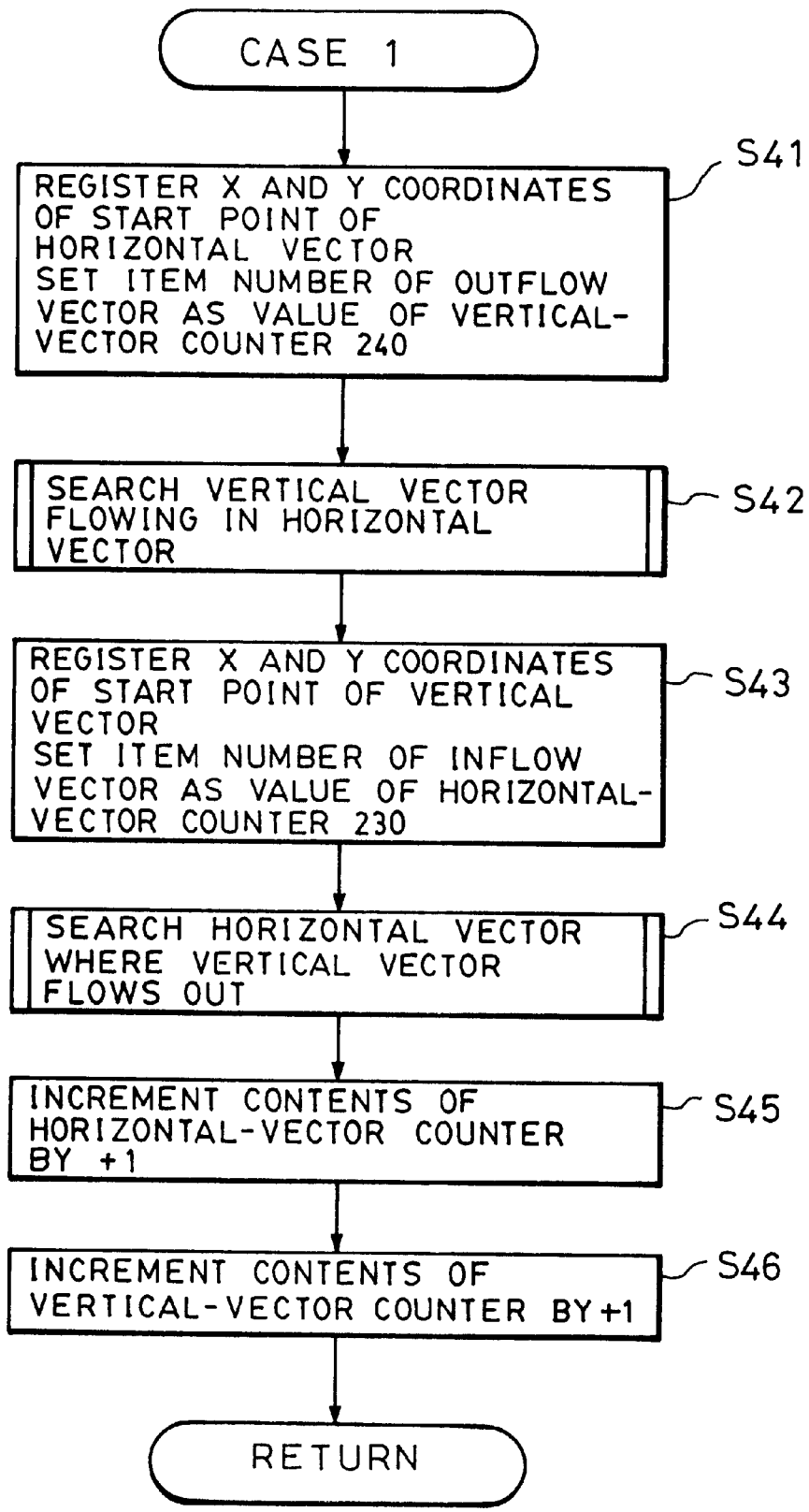

FIG. 29 is a flowchart showing processing for case 1 called when the value held in the register is 1 in step S30 shown in FIG. 27.

Figure 30:
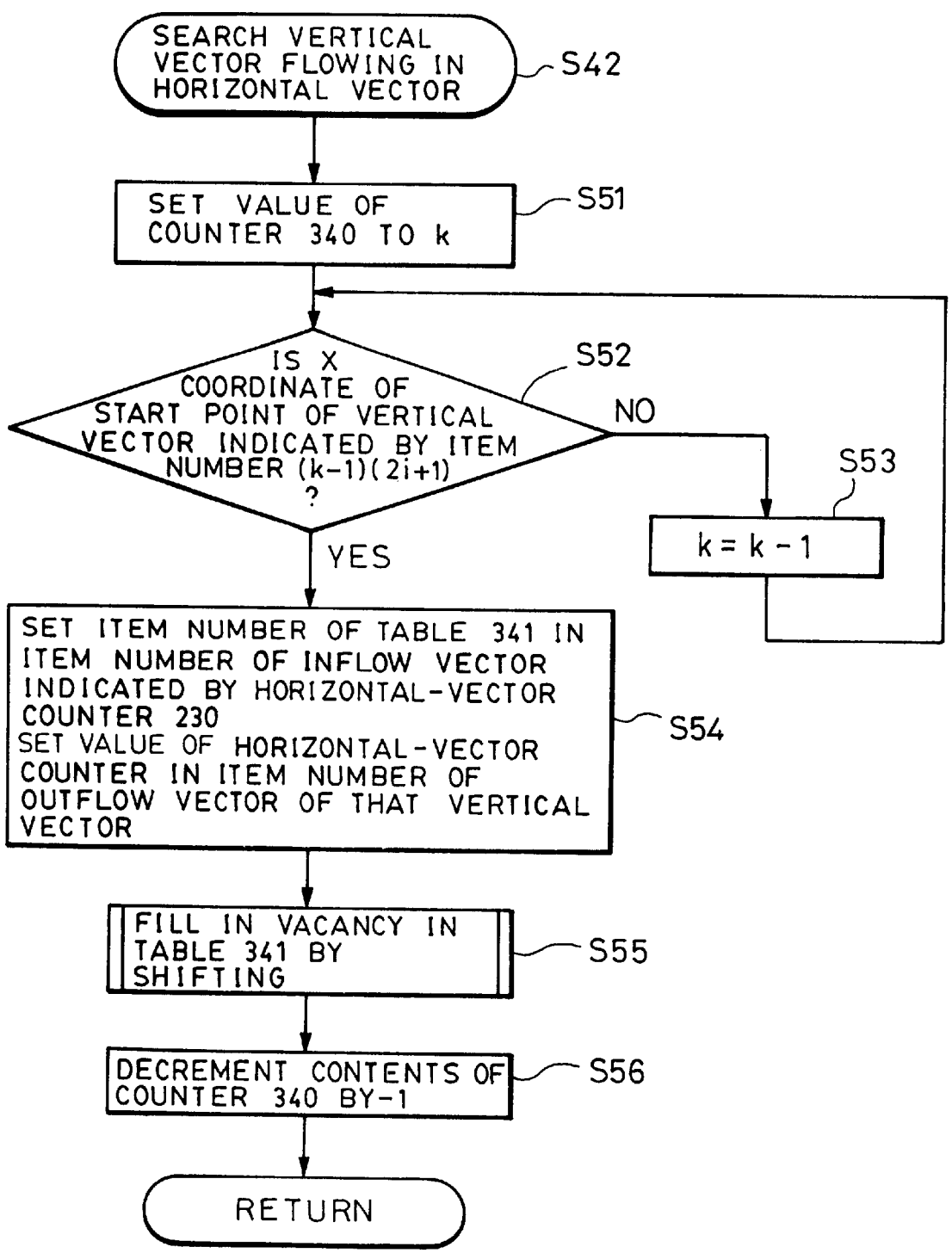

First, in step S41, coordinates (2i+1, 2j+1) are registered in the x and y coordinates of the start point in the table shown in FIG. 23 as the start point of the horizontal vector. The value of the vertical-vector counter 240 to be registered in step S43 (to be described later) is set as the number (column 234) of the vertical vector where this horizontal vector flows out to. The process then proceeds to step S42, where the vertical vector flowing into the horizontal vector registered in step S41 is searched from the table 341 of vertical vectors having undetermined vectors to flow out shown in FIG. 34 and is registered. The contents of the processing in step S42 are shown in the flowchart of FIG. 30.

In step S51, the value of a vertical-vector counter 340 having undetermined outflow vector for holding the number of vertical vectors having undetermined vectors to flow out registered in the table 341 is set to variable k. In step S52, the CPU 519 determines whether or not the column of the x coordinate of the start point of the vertical vector indicated by item number (k−1) registered in the item number table 341 of vertical vectors having undetermined outflow vectors is (2i+1). If the result of the determination is negative, the value (k) of the variable k is decremented by one, and step S52 is executed again. If the result of the determination in step S52 is affirmative, the process proceeds to step S54.

In step S54, the vertical vector having the item number (k−1) in the table 341 is set as the inflow vector of the horizontal vector registered in the step S41, and the horizontal vector registered in step S41 is set as the vector where this vertical vector flows out to. Accordingly, the number of the vertical vector having the item number (k−1) in the table 341 is stored in the item number column of the inflow vector for the horizontal vector indicated by the horizontal-vector counter 230 shown in FIG. 23, and the value of the horizontal-vector counter 230 in the step S41 is stored in the item number column of the outflow vector for the vertical vector shown in FIG. 24.

In step S55, the vector for which the vector to flow out has been determined in the steps S63 and S54 is eliminated from the table 341 of vectors having undetermined outflow vectors, and the vacancy in the table is filled in by shifting. Subsequently, in step S56, the value of the vertical-vector counter 340 having undetermined outflow vector is decremented by one to update so that the number of vertical vectors counted in counter 340 for which horizontal vectors to flow out are undetermined registered in the table 341 of item numbers of vertical individual vectors having undetermined outflow vectors is reduced by one, and the process returns to the original routine.

Thus, the processing in step S42 shown in FIG. 29 is terminated, and the process proceeds to step S43. In step S43, a point (2i−1, 2j+1) is registered as the start point of the vertical vector, and the horizontal vector registered in step S41 is set as the horizontal vector flowing into this vertical vector. Subsequently, in step S44, the horizontal vector where the vertical vector registered in step S43 flows out is searched from the table 311 of vectors having undetermined inflow vectors shown in FIG. 31, and is registered. The contents of the processing in step S44 are shown in the flowchart of FIG. 35.

Figure 35:
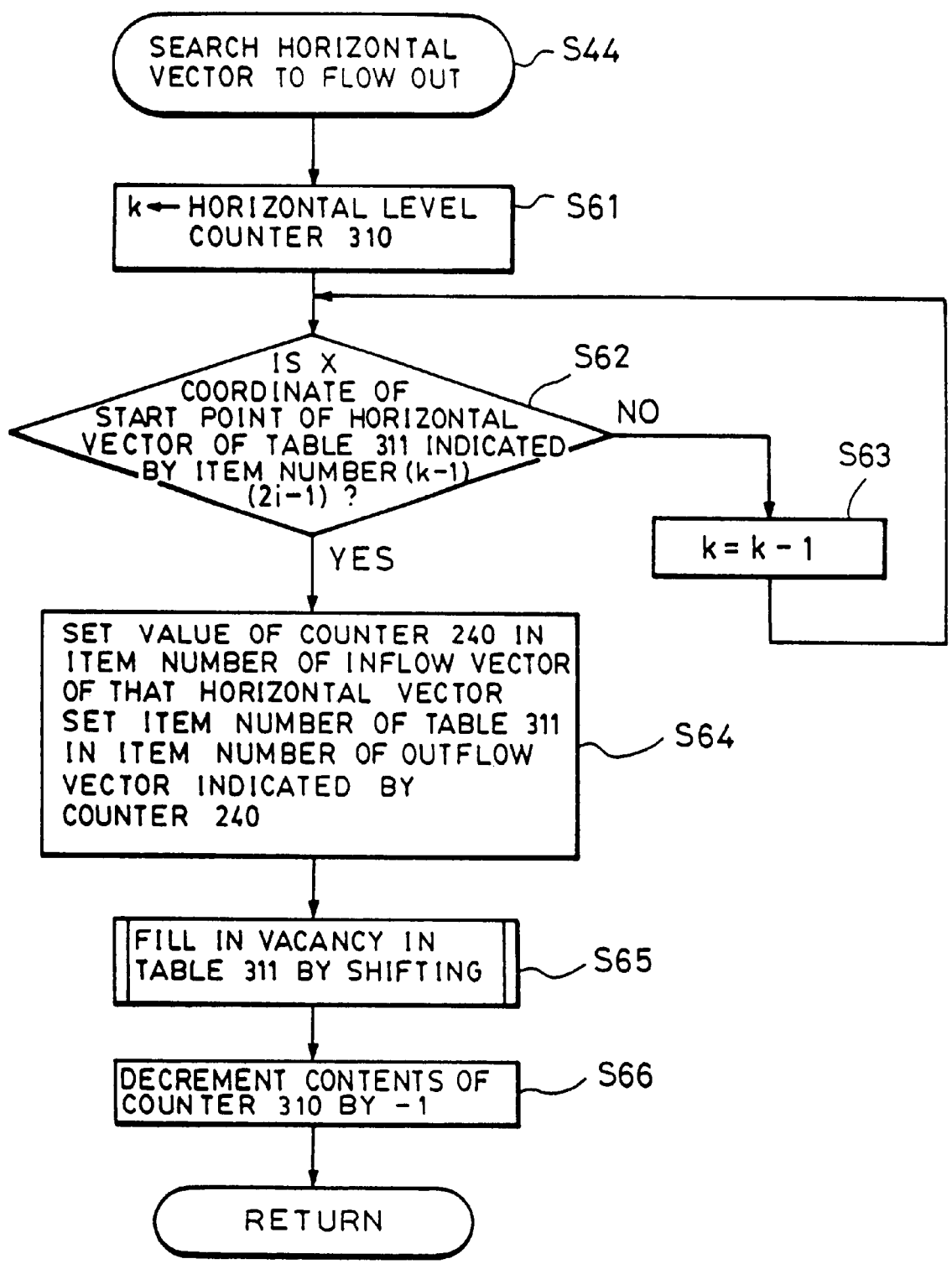

The processing shown in FIG. 35 is executed entirely in the same manner as the processing shown in FIG. 30. That is, the vector where the vertical vector registered in step S43 flows out to is registered in the item number column of the outflow vector shown in FIG. 24, and the value of the vertical-vector counter 240 is set in the item number column of the inflow vector of the horizontal vector flowing out to this vertical vector to register this vertical vector. The table 311 shown in FIG. 31 is thereby-updated.

Subsequently, in step S45, the contents of the horizontal-vector counter 230 are incremented by one. In step S46, the contents of the vertical-vector counter 240 are incremented by one, and the process returns to the original processing.

Explanation of Processing for Case 2 (FIGS. 8, 23, 24, 33 and 36)

Figure 36:
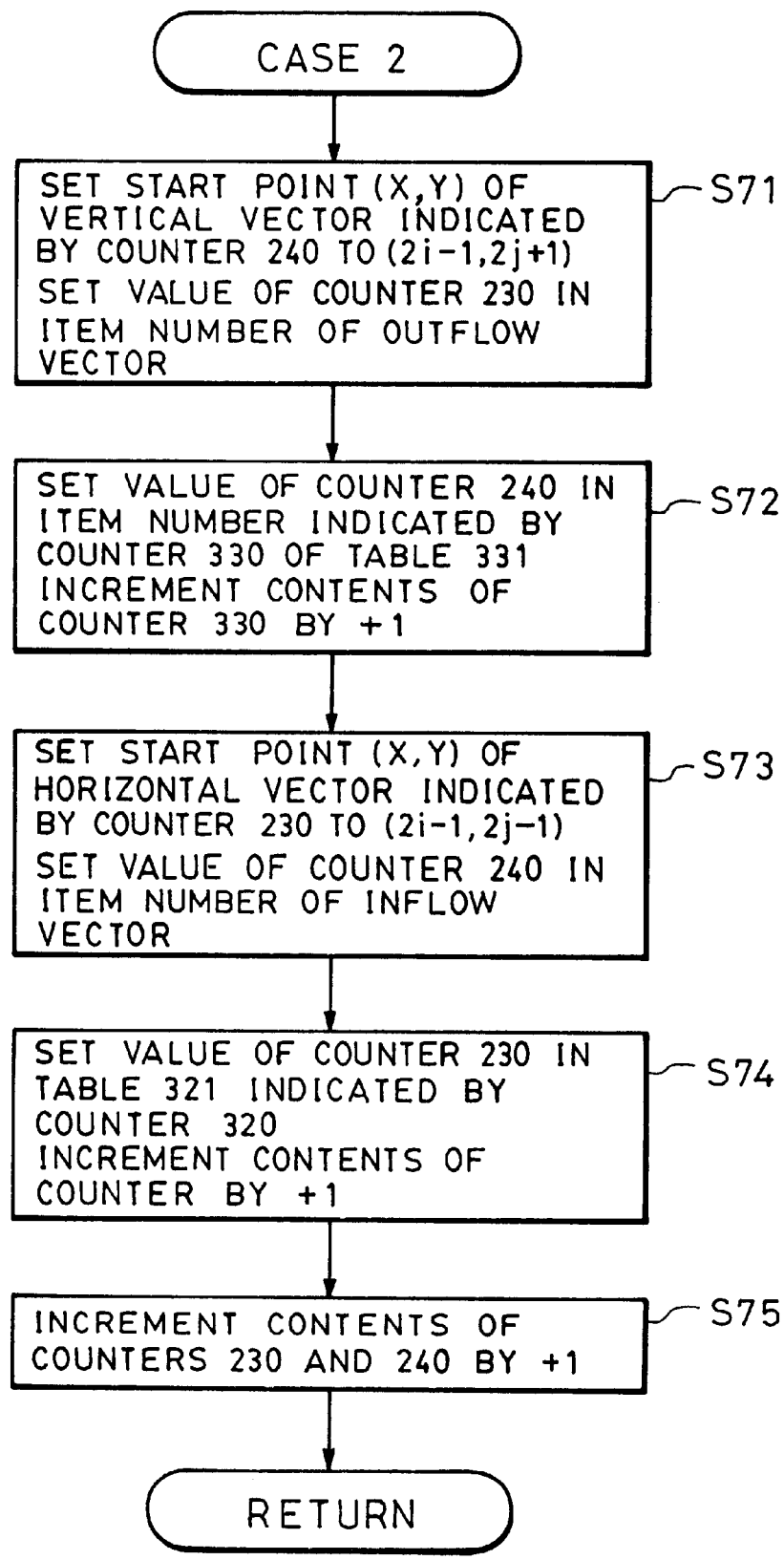

When the value held by the register in step S30 shown in FIG. 27 is "2", processing shown in FIG. 36 is executed.

The processing shown in FIG. 36 is a routine for processing the state shown in FIG. 8.

First, in step S71, a point (2i−1, 2j+1) is registered as the start point of the vertical vector indicated by the vertical-vector counter 240 shown in FIG. 24, and the horizontal vector from which this vertical vector flows out is set as the horizontal vector to be registered in step S73. In step S72, the vertical vector registered in step S71 is registered in the unused region adjacent to the used region in the table 331 of the vertical vector having an undetermined inflow vector shown in FIG. 33 as a vector for which the inflow horizontal vector is undetermined, and the contents of the counter 330 of the vertical vector having an undetermined inflow vector are incremented by one. The process then proceeds to step S73, where the start point of the horizontal vector in the column indicated by the counter 230 in the table shown in FIG. 23 is registered as a point (2i−1, 2j−1), and the vertical vector registered in the step S71 is registered as the inflow vertical vector in the table.

In step S74, the horizontal vector registered in step S73 is registered in the unused region adjacent to the used region in the table 321 of horizontal vectors having undetermined outflow vectors shown in FIG. 32 as a vector for which the inflow vertical vector is undetermined, and the contents of the horizontal-vector counter 320 having undetermined outflow vector are incremented by one. In step S75, the contents of both the horizontal-vector counter 230 and the vertical-vector counter 240 are incremented by one, and the process returns to the original processing.

Explanation of Processing for Case 3 (FIGS. 9, 23, 24 and 37)

Figure 37:
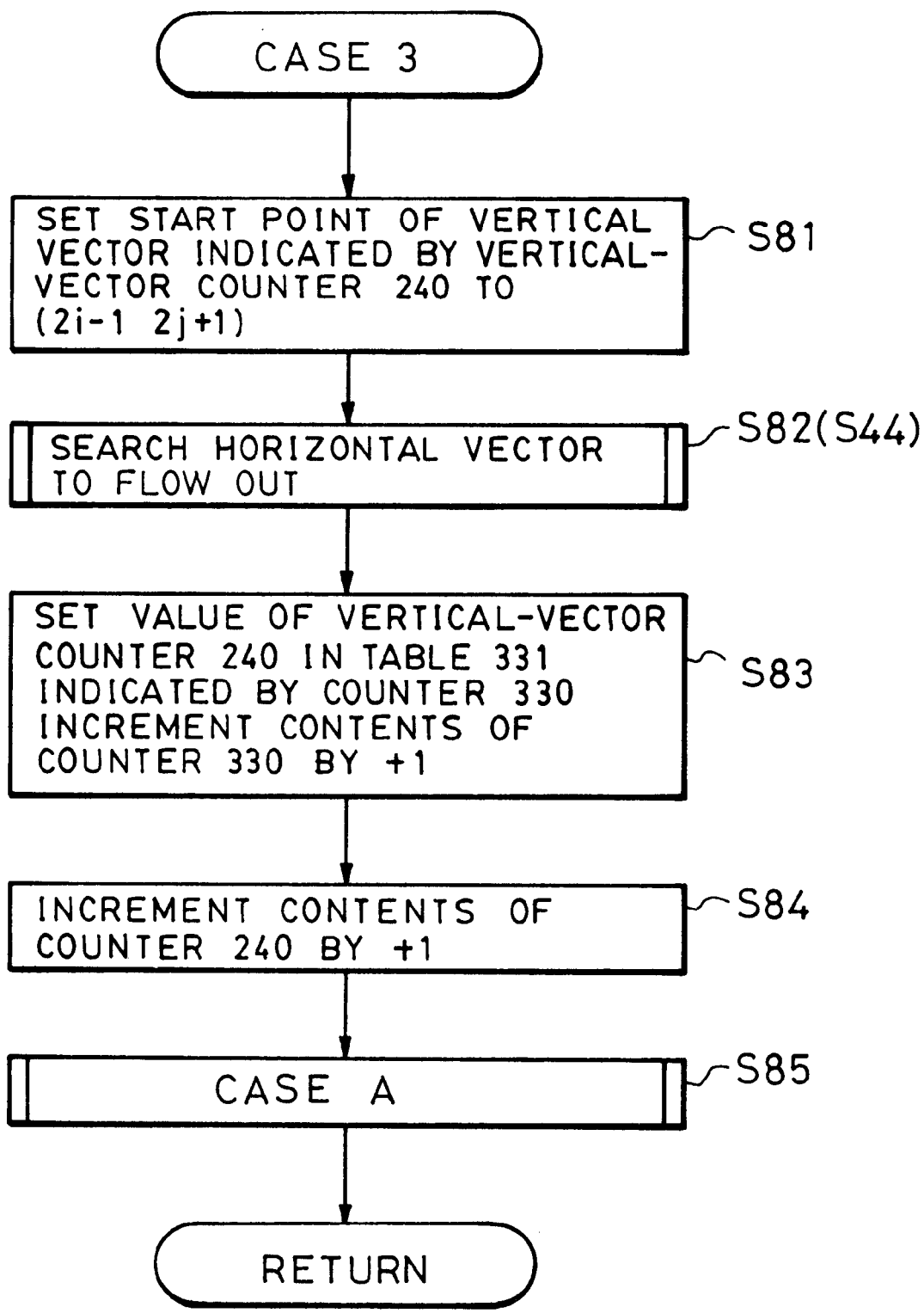

When the value of the register in step S30 shown in FIG. 27 is "3", processing shown in FIG. 37 is executed. This processing is a routine for processing the state shown in FIG. 9.

Figure 38:
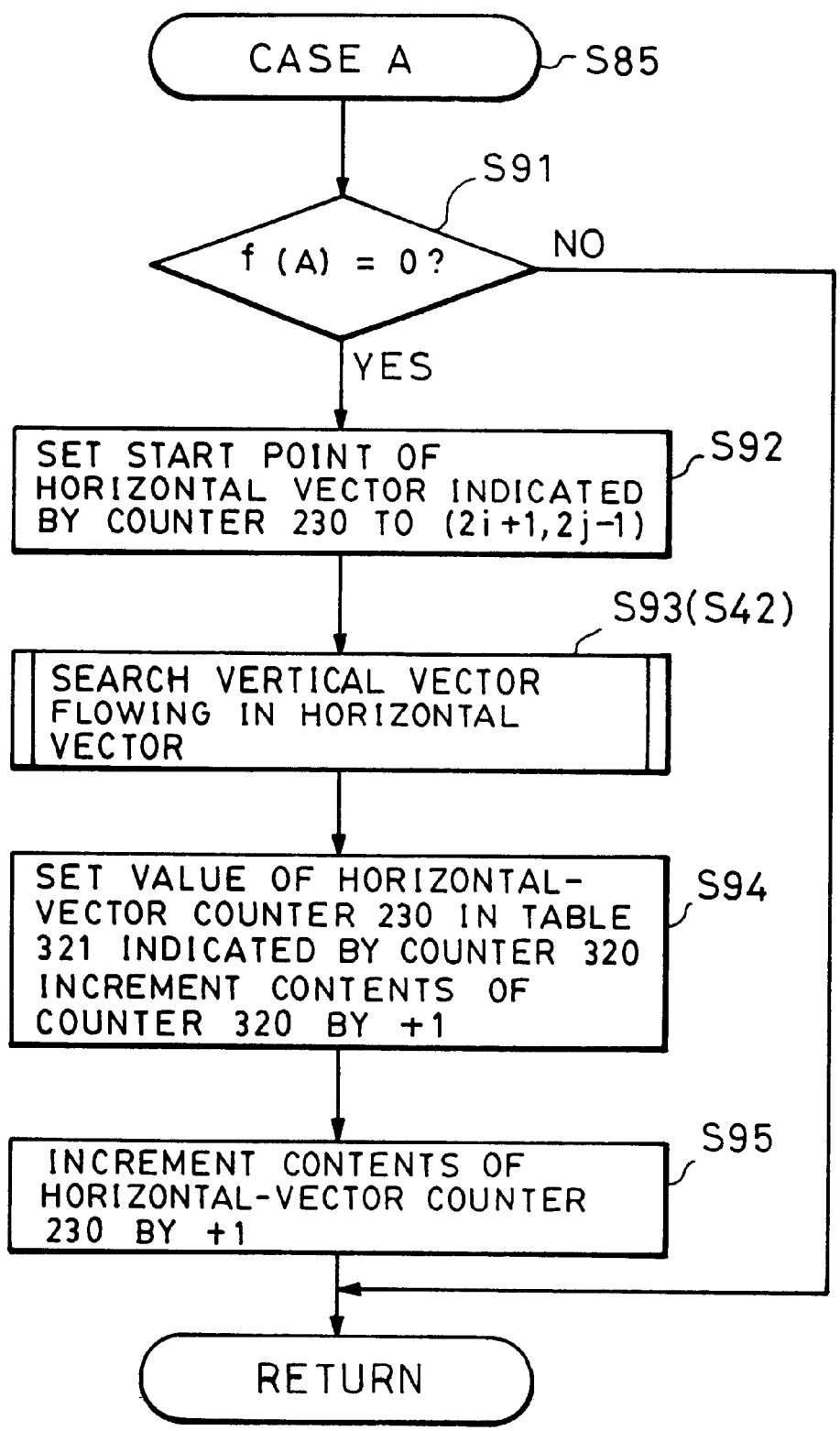
Figure 90:
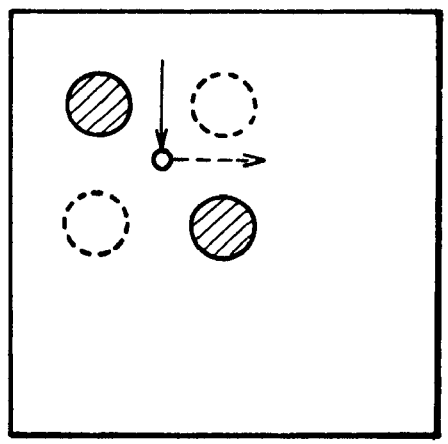
FIGS. 90 and 91 are diagrams showing the contents of the processing for case e.

In step S81, a point (2i−1, 2j+1) is registered as the start point of the vertical vector 91 (FIG. 90). The process then proceeds to step S82, where the horizontal vector where the vertical vector registered in step S81 flows out to is obtained in the same manner as in the above-described step S44. Subsequently, in step S83, the value of the vertical-vector counter 240 is set in the table 331 indicated by the counter 330, and the contents of the counter 330 are incremented by one. Subsequently, in step S84, the contents of the vertical-vector counter 240 are incremented by one. In step S85, processing for case A is performed. This processing is shown in the flowchart of FIG. 38.

The flowchart shown in FIG. 38 will now be explained. In step S91, the CPU 519 checks whether or not the pixel A shown in FIG. 9 is white "0". If the result of the check is negative, the processing is terminated with performing no further operation. This is shown by a matrix 93 in FIG. 9.

If the result of the check in step S91 is affirmative, the process proceeds to step S92, where the start point of the horizontal vector 94 (FIG. 9) is set to a point (2i+1, 2j−1). Subsequently, in step S93, the vertical vector flowing into this horizontal vector is searched. The process then proceeds to step S94, where the number of the horizontal vector is set in the table 321 as a horizontal vector having an undetermined vector to flow out. In step S95, the contents of the horizontal-vector counter 230 are incremented by one, and the process is terminated.

Explanation of Processing for Case 4 (FIGS. 10, 23, 24, 31–34 and 39)

When the value of the register is "4" into step S30 shown FIG. 27, a routine shown in FIG. 39 is called. This routine is a routine of processing case 4 shown in FIG. 10.

In step S101, a point (2i−1, 2j−1) is registered as the start point of the horizontal vector 102, and the vector where this horizontal vector flows out to is set as the vertical vector to be registered in step S103, and the value of the vertical-vector counter 240 at this time period is set in the item number column of the outflow vector shown in FIG. 23. In step S102, the value of the counter 230 is registered in the table 311 shown in FIG. 31 to update the table 311 assuming that the vector flowing into the vector registered in step S101 is undetermined. In step S103, a point (2i+1, 2j−1) is defined as the start point of the vertical vector 103 (FIG. 10), and the value of the horizontal-vector counter 230 is set in the item number column of the inflow vector in the table shown in FIG. 24 assuming that the inflow vector of this vector is the horizontal vector 102 registered in step S101. In step S104, the value of the vertical-vector counter 240 is set in the column 341 of the table indicated by the counter 340 shown in FIG. 34 assuming that the vector where the vertical vector registered in-step S103 flows out to is undetermined. Subsequently, in step S105, the contents of both the horizontal-vector counter 230 and the vertical-vector counter 240 are incremented by one, and the process returns to the original processing.

Explanation of Processing for Case 5

When the value of the register is "5" in step S30 shown in FIG. 27, a routine shown in FIG. 40 is called. This routine shown in FIG. 40 is called in the case of the state shown in FIG. 11, and the process returns with performing no further operation.

Explanation of Processing for Case 6 (FIGS. 12, 23, 24, 31–34, 41 and 42)

When the value of the register is "6" in step S30 shown in FIG. 27, a routine shown in the flowchart of FIG. 41 is called. This is processing for case 6 shown in FIG. 12.

First in step S111, a point (2i−1, 2j−1) is registered as the start point of the horizontal vector 122 (FIG. 12) indicated by the counter 230 shown in FIG. 23. Subsequently, in step S112, the horizontal vector 122 registered in step S111 is registered in the horizontal-vector table 321 having undetermined outflow vector shown in FIG. 32 as a vector having an undetermined outflowing vector, in the same manner as in step S94 shown in FIG. 38. In step S113, the value of the counter 230 is registered in the horizontal-vector table 311 having undetermined inflow vector shown in FIG. 31 assuming that the vector flowing into the horizontal vector 122 registered in step S111 is undetermined, in the same manner as in step S102 shown in FIG. 39. Subsequently, in step S114, the contents of the horizontal-vector counter 230 are incremented by one. In step S115, the CPU 519 determines whether the pixel at position (B) is a white pixel or a black pixel. In the case of a white pixel, a point (2i+1, 2j+1) is registered as the start-point of the vertical vector 124, as indicated by a matrix 120 in FIG. 12. In the case of a black pixel, the processing is terminated and no further processing is performed, as indicated by a matrix 121 shown in FIG. 12.

Figure 42:
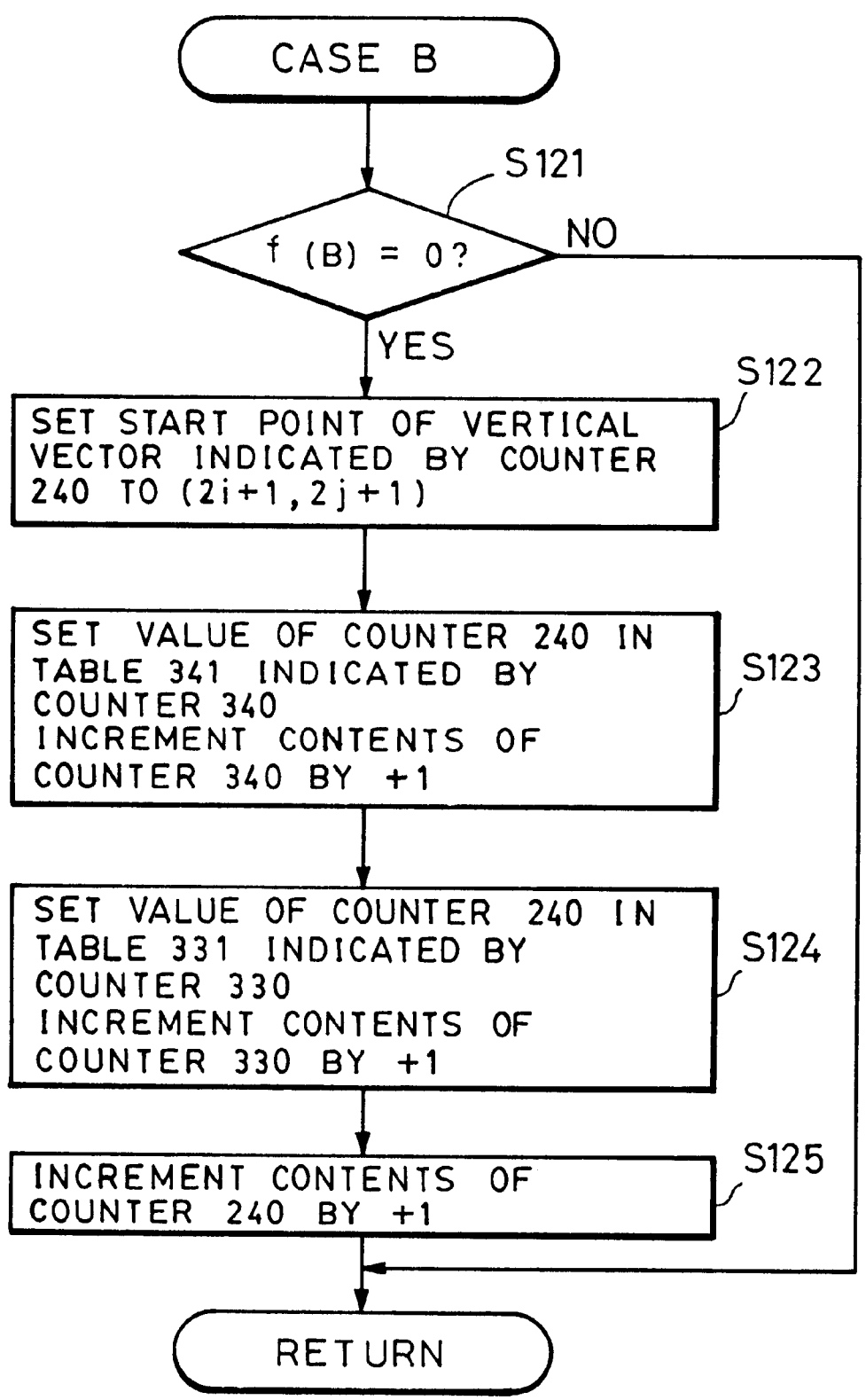

FIG. 42 shows details of the processing in step S115.

In step S121, the CPU 519 determines whether the pixel B is a white pixel or a black pixel. In the case of a black pixel, the process returns with no further processing performed. In the case of a white pixel, the process proceeds to step S122. In step S122, a point (2i+1, 2j+1) is registered as the start point of the vertical vector 124. In step S123, this vertical vector 124 is registered in the table 341 shown in FIG. 34 as a vertical vector for which a vector to flow out is undetermined. In step S124, the value of the counter 240 is set in the table 331 shown in FIG. 33 assuming that the vector flowing into the vertical vector 124 registered in step S122 is undetermined, as in the above-described step S72 shown in FIG. 36. In step S125, the contents of the vertical-vector counter 240 are incremented by one, and the process returns to the original routine.

Explanation of Processing for Case 7 (FIGS. 13, 38, 42 and 43)

Figure 43:
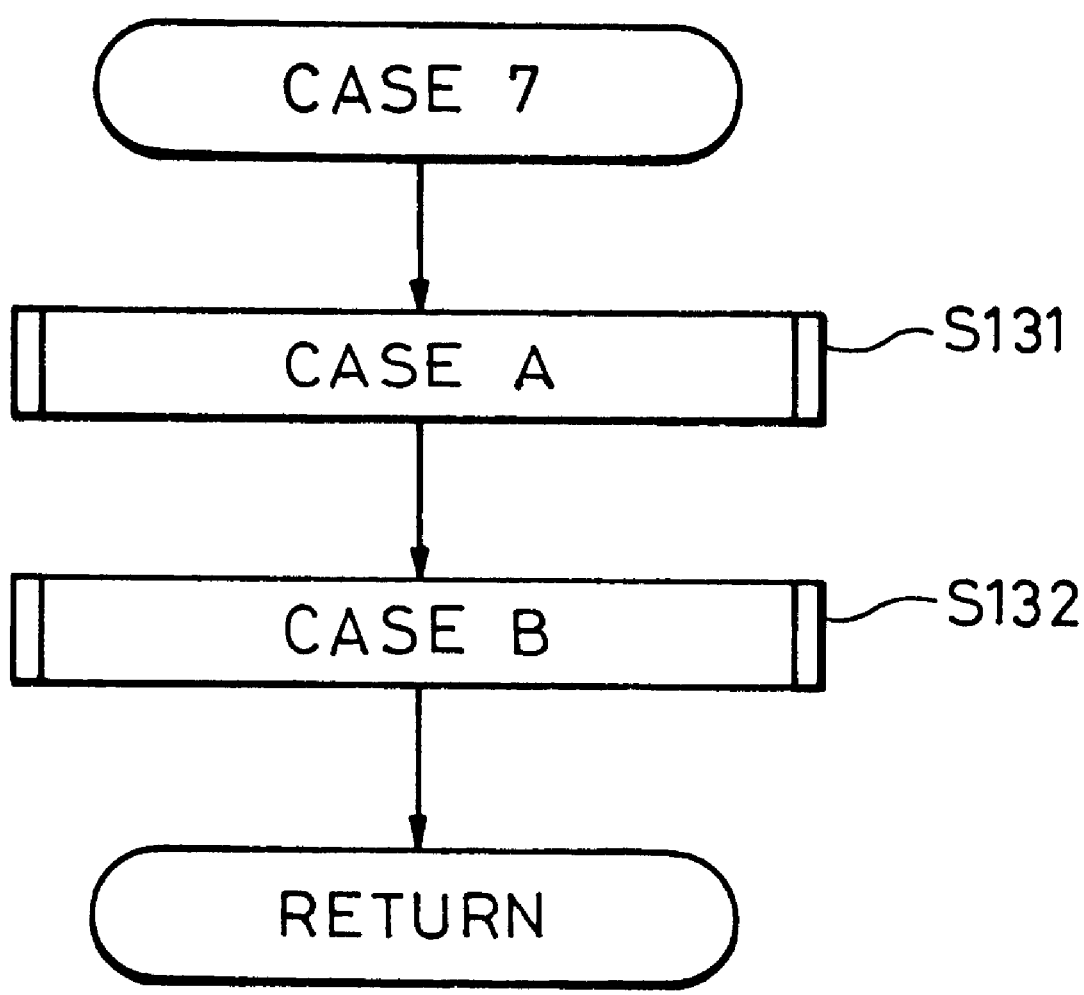

When the value of the register is "7" in step S30 shown in FIG. 27, a routine shown in the flowchart of FIG. 43 is executed. This routine performs processing for case 7 shown in FIG. 13.

In step S131, processing corresponding to the state of the pixel A is performed, as in step S85 shown in FIG. 38. Subsequently, in step S132, processing corresponding to-the state of the pixel B is performed, as in step S115 shown in FIG. 41, and the process returns to the original routine.

In FIG. 13, matrices 130, 131, 132 and 133 represent cases wherein the both pixels at positions (A) and (B) are white pixels, wherein only the pixel at position (A) is a black pixel, wherein only the pixel at position (B) is a black pixel, and wherein the both pixels at positions (A) and (B) are black pixels, respectively.

Explanation of Processing for Case 8 (FIGS. 14, 44–46)

Figure 44:
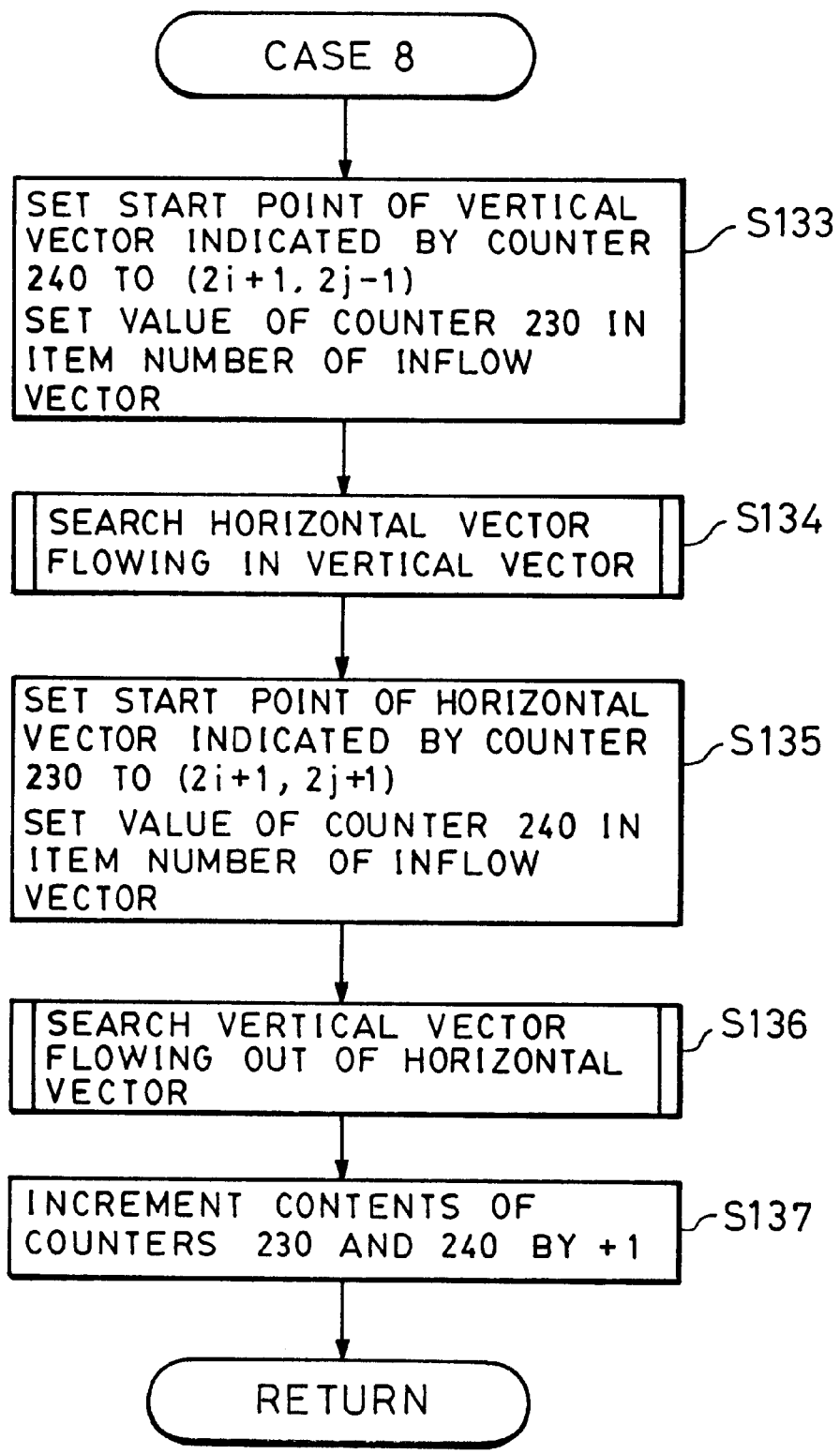

When the value of the register is "8" in step S30 shown in FIG. 27, a processing routine shown in FIG. 44 is called. This routine performs processing for case 8 shown in FIG. 14.

In step S133, a point (2i+1, 2j−1) is registered in the table shown in FIG. 24 as the start point of the vertical vector 141 (FIG. 14) indicated by the vertical-vector counter 240, the value of the counter 230 is registered in the item number column of the outflow vector assuming that the horizontal vector where this vector flows out to is the vector to be registered in the following step S135. In step S134, the horizontal vector flowing into the vertical vector 141 registered in step S133 is obtained using the table 321 shown in FIG. 32 according to a procedure shown in FIG. 45.

Figure 45:
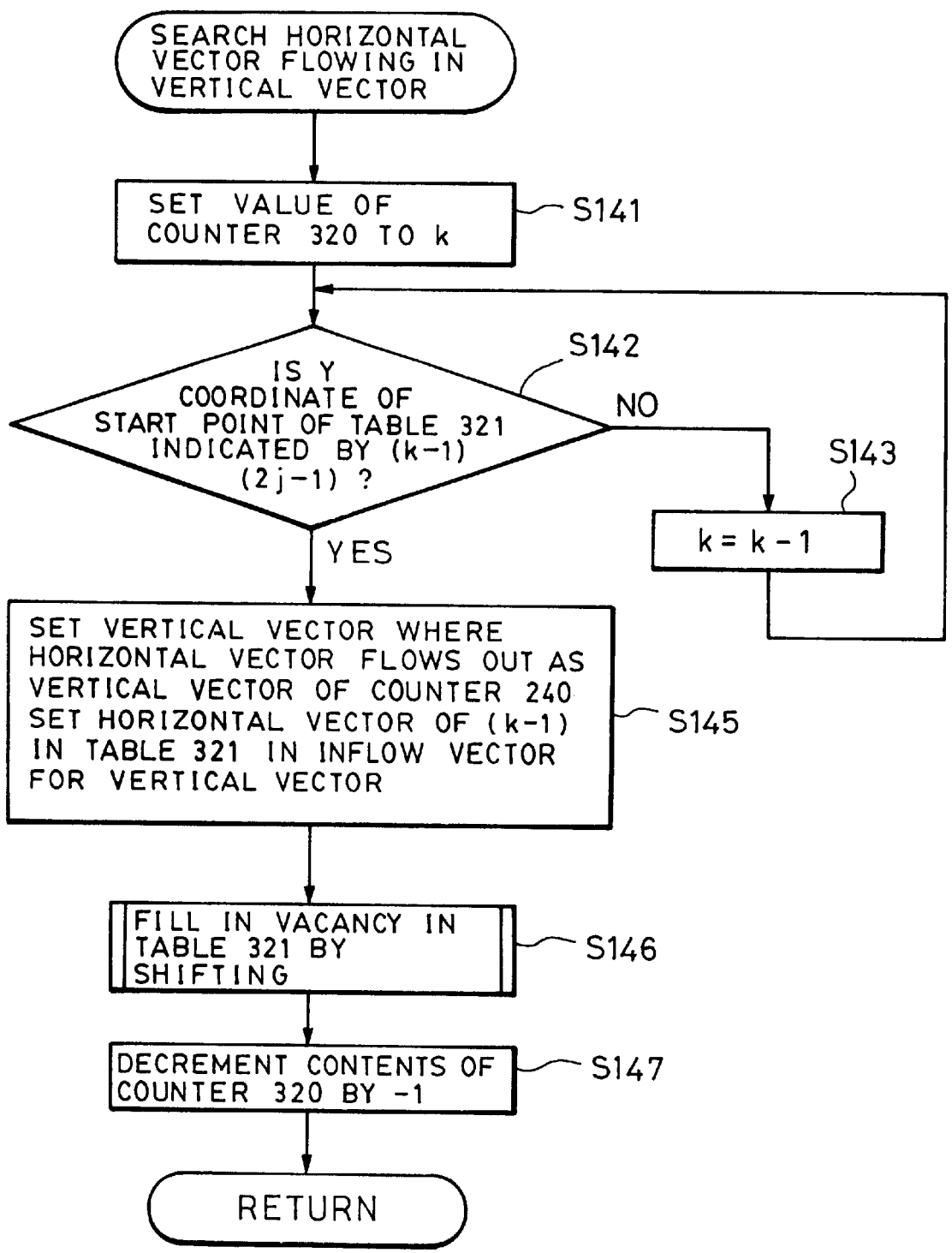

The processing shown in FIG. 45 is entirely the same as the above-described processing shown in FIGS. 30 and 35. That is, the horizontal vector flowing into the vertical vector 141 registered in step S133 is registered, and the vertical vector 141 registered in step S133 is registered as the vertical vector where this horizontal vector flows out to (step S145). In step S146, a vacancy in the table 321 is filled in. In step S147, the contents of the counter 320 are decremented by ones and the table 321 shown in FIG. 32 is updated.

In step S135 shown in FIG. 44, a point (2i+1, 2j+1) is registered as the start point of the horizontal vector 142 (FIG. 14) indicated by the horizontal vector counter 230, and the vertical vector 141 registered in step S133 is registered as the vertical vector flowing in the vector 142. In step S136, the vertical vector where the horizontal vector 142 registered in step S135 flows out to is obtained using the table 331 shown in FIG. 33 according to a procedure shown in FIG. 46.

Figure 33:
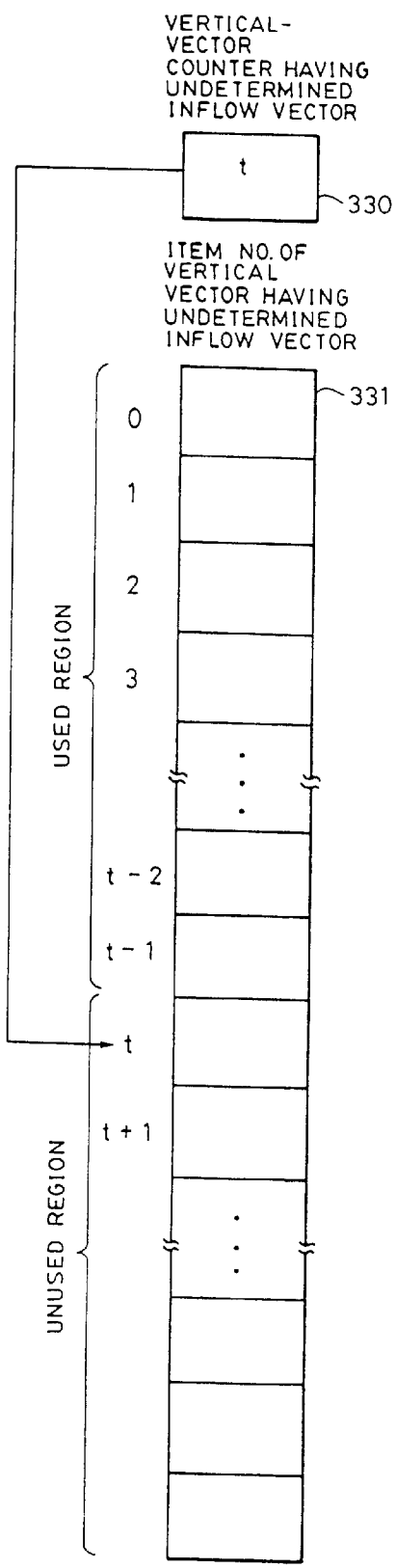
FIG. 33 is a diagram showing a registration table of vertical vectors having undetermined inflow vectors.
Figure 46:
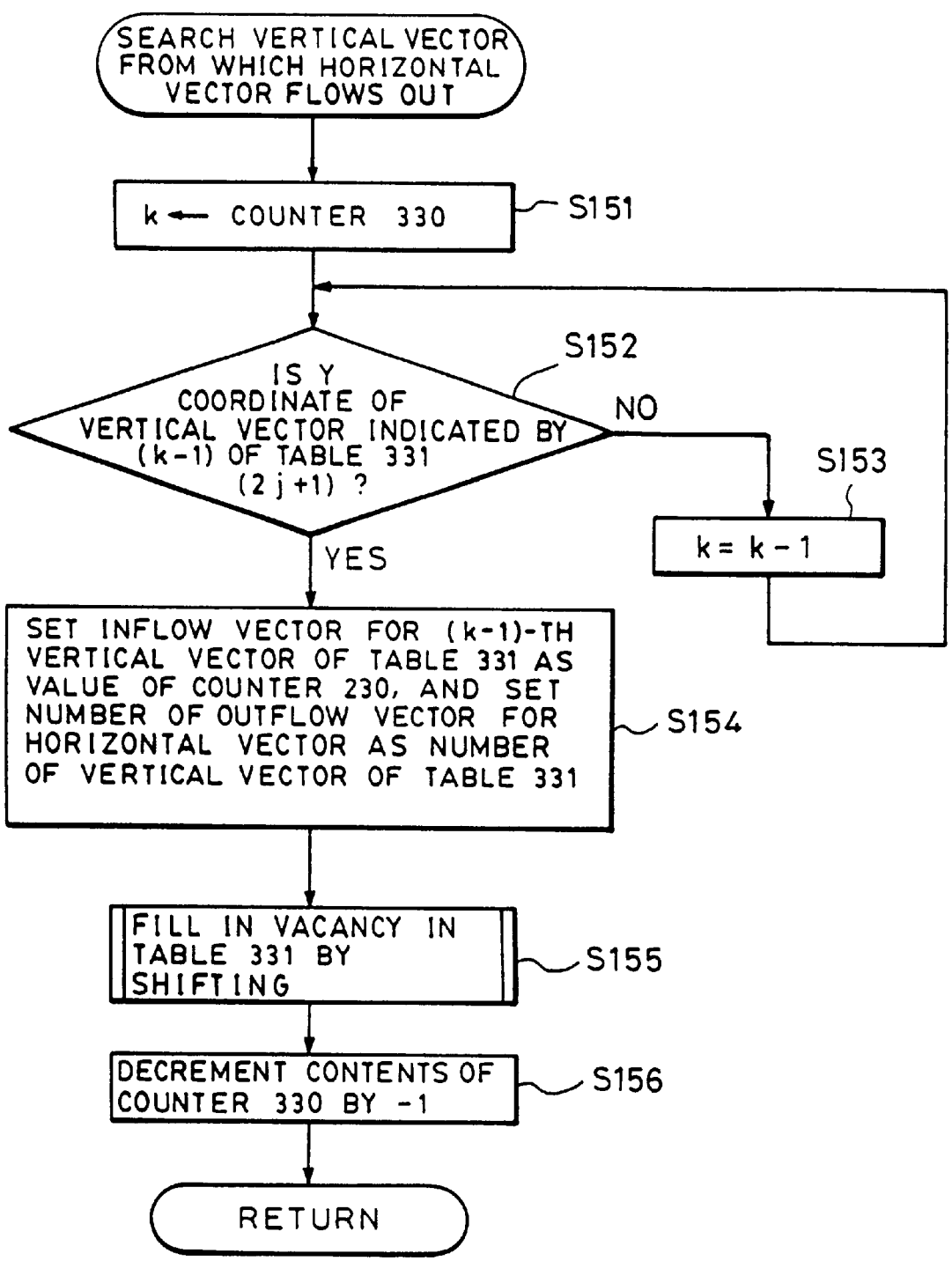

The processing shown in FIG. 46 is entirely the same as the above-described processing shown in FIGS. 30, 35 and 45. That is, the vertical vector where the horizontal vector 142 registered in step S135 shown in FIG. 44 flows out to is registered, and the horizontal vector 142 registered in step S135 is registered as the vector flowing into this vertical vector (step S154 shown in FIG. 46). In steps S156 and S156, the table shown in FIG. 33 is updated.

Referring again to FIG. 44, in step S137, the contents of both the horizontal-vector counter 230 and the vertical-vector counter 240 are incremented by one, and the process returns to the original processing.

Figure 47:
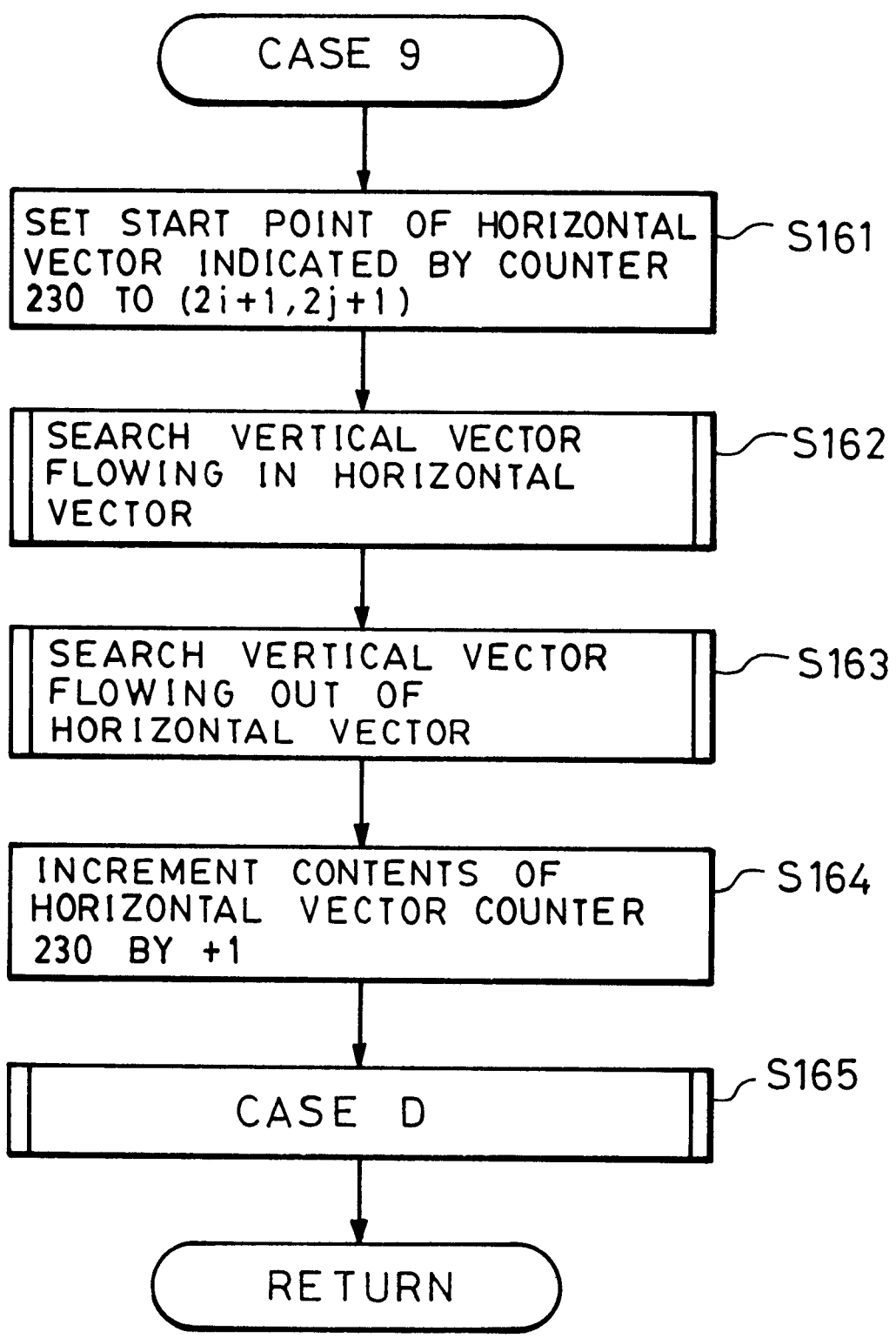

Explanation of Processing for Case 9 (FIGS. 15 and 47)

When the value of the register is "9" in step S30 shown in FIG. 14, a routine shown in FIG. 47 is called. This routine processes case 9 shown in FIG. 15.

Figure 34:
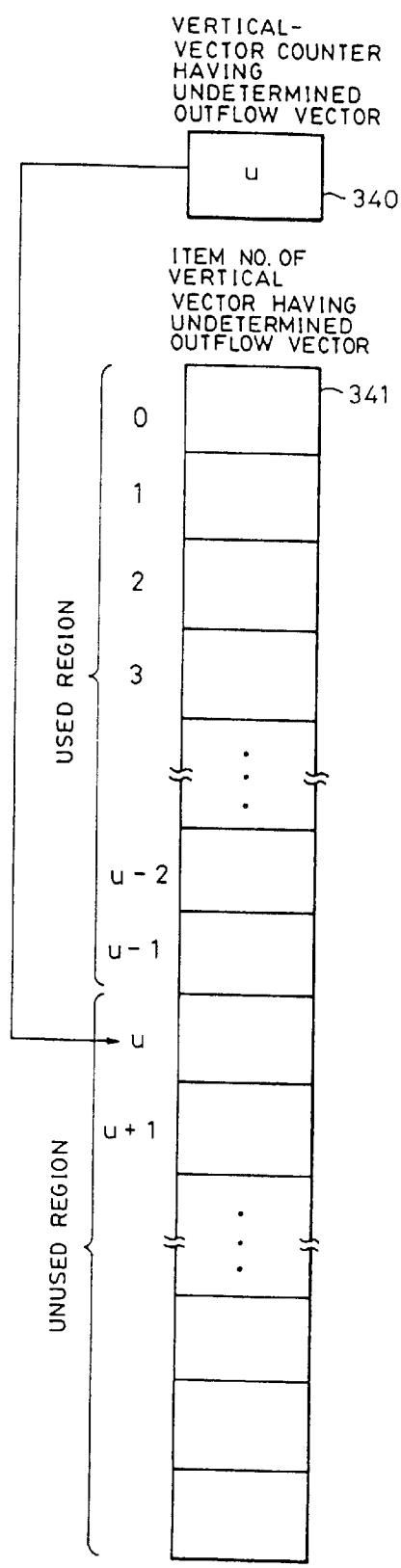
FIG. 34 is a diagram showing a registration table of vertical vectors having undetermined outflow vectors.

First, in step S161, a point (2i+1, 2j+1) is registered as the start point of the horizontal vector 151 (FIG. 15). Subsequently, in step S162, the vertical vector flowing into this horizontal vector 151 is searched using the table 341 shown in FIG. 34 in the same manner as the above-described procedure shown in FIG. 30. The horizontal vector registered in step S161 is registered in the table shown in FIG. 24 as the horizontal vector where the searched vertical vector flows out to. Thus, the table 341 shown in FIG. 34 is updated.

In step S163, the vertical vector where the horizontal vector 151 registered in step S161 flows out to is searched using the table shown in FIG. 33 in the same manner as in the above-described procedure shown in FIG. 46, the horizontal vector 151 registered in step S161 is registered as the vector flowing into this vertical vector; and the table 331 shown in FIG. 33 is updated.

In step S164, the contents of the horizontal-vector counter 230 are incremented by one. In step S165, the CPU 519 determines whether the pixel at position (D) is a white pixel or a black pixel. In the case of a white pixel, as indicated by a matrix 152 shown in FIG. 15, a point (2i−1, 2j−1) is registered as the start point of the vertical vector 154. In the case of a black pixel, the process is terminated with performing no further operation (a matrix 153 shown in FIG. 15).

Figure 48:
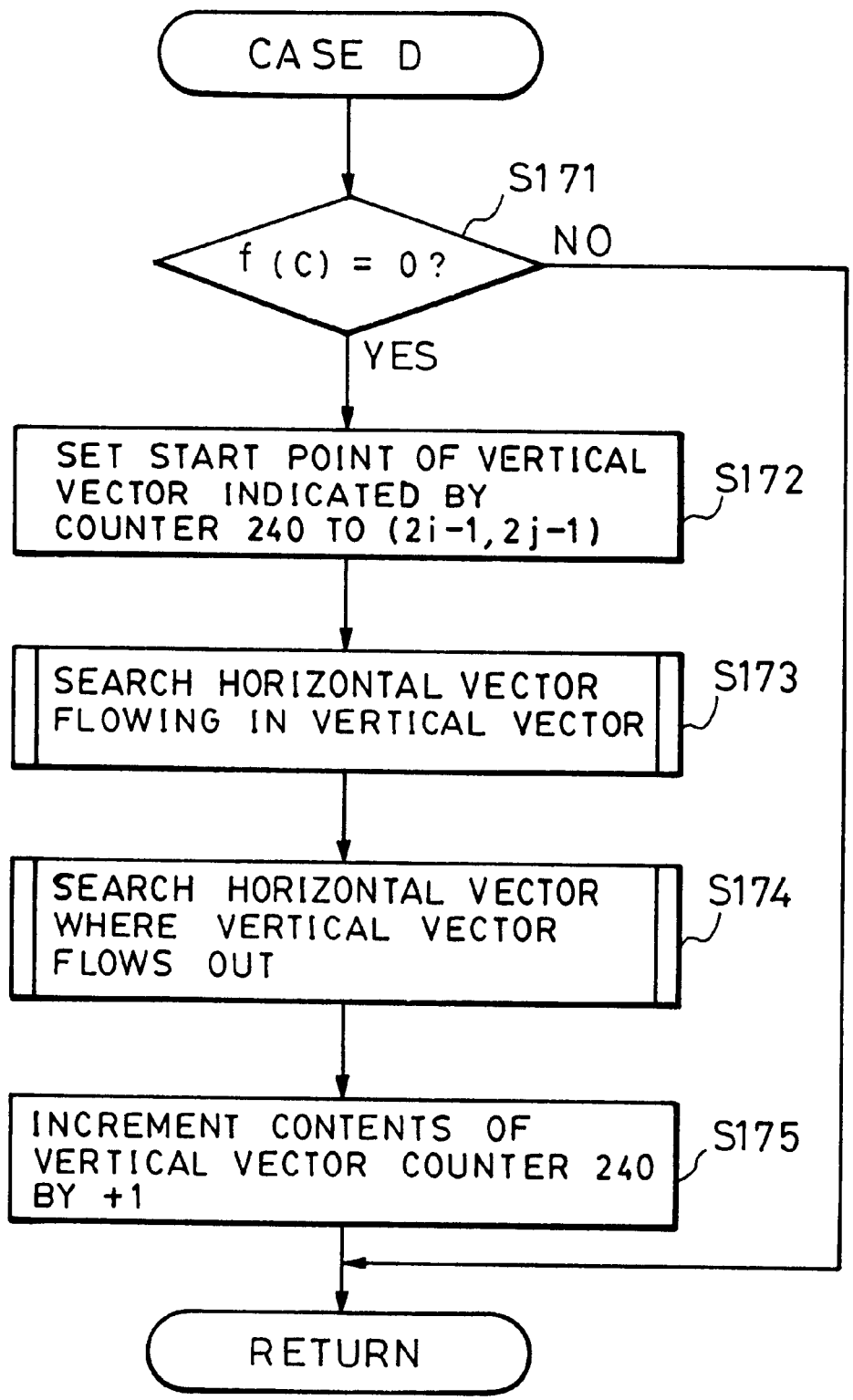

FIG. 48 shows the contents of processing (case D) in step S165.

In step S171, the CPU 519 determines whether the pixel at position (D) is a white pixel or a black pixel. In the case of a black pixel, the process returns with no further processing having been performed. In the case of a white pixel, the process proceeds to step S172, where a point (2i−1, 2j−1) is registered as the start point of the vertical vector 154. Subsequently, the process proceeds to step S173, where the above-described processing shown in FIG. 45 is performed. That is, the horizontal vector flowing into the vertical vector 154 registered in step S172 is registered, the vertical vector 154 registered in step S172 is registered as the vertical vector to which this horizontal vector flows in, and the table 321 shown in FIG. 32 is updated.

Subsequently, in step S174, the above-described processing shown in FIG. 35 is performed. That is, the horizontal vector where the vertical vector 154 registered in step S172 flows out to is registered, the vertical vector 154 registered in step S172 is registered as the vector flowing into this horizontal vector, and the table 311 shown in FIG. 31 is updated. In step S175, the contents of the vertical-vector counter 240 are incremented by one, and the process returns to the original processing.

Explanation of Processing for Case 10

Figure 49:
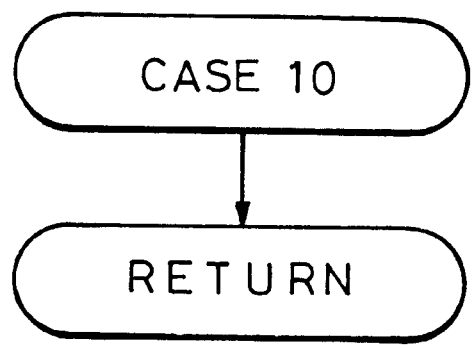

When the value of the register is "10" in step S30 shown in FIG. 27, a sub-routine shown in FIG. 49 is called. This routine processes case 10 shown in FIG. 16. The routine shown in FIG. 49 returns with performing no further operation when it is called.

Explanation of Processing for Case 11

Figure 50:
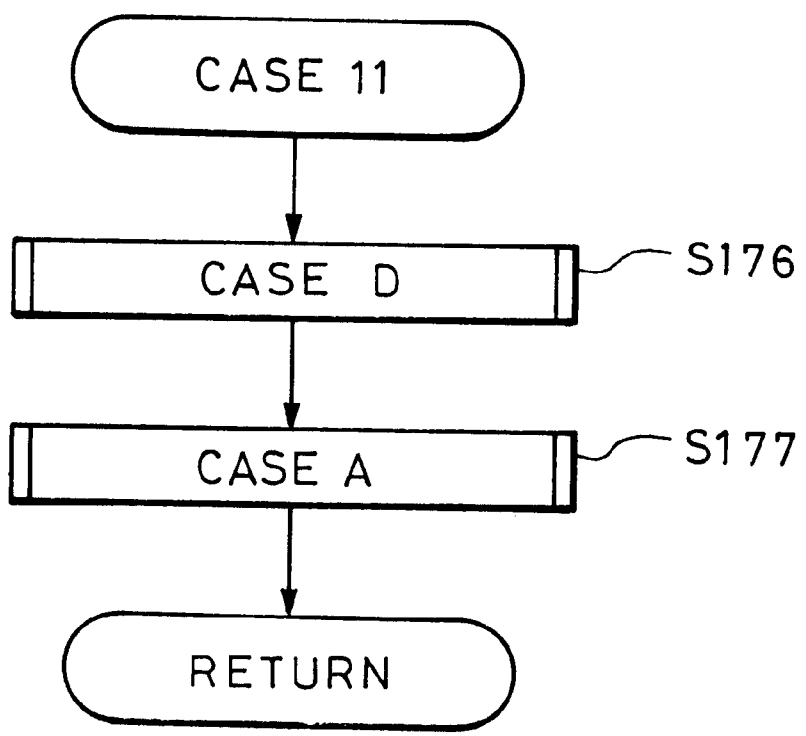

When the value of the register is "11" in step S30 shown in FIG. 27, a sub-routine shown in FIG. 50 is called. This routine processes case 11 shown in FIG. 17.

First, in step S176, the above-described processing according to the flowchart shown in FIG. 48 is performed in accordance with the state of the pixel at position (D) in the same manner as in step S165. Subsequently, in step S177, the above-described processing shown in FIG. 38 is performed in accordance with the state of the pixel at position (A) in the same manner as in steps S85 and S131. Matrices 170, 171, 172 and 173 shown in FIG. 17 represent the results of processing for cases wherein the both pixels at positions (D) and (A) are white pixels, wherein only the pixel at position (A) is a black pixel, wherein only the pixel at position (D) is a black pixel, and wherein the both pixels at positions (A) and (D) are black pixels.

Explanation of Processing for Case 12 (FIGS. 18, 23, 24, 51 and 52)

Figure 51:
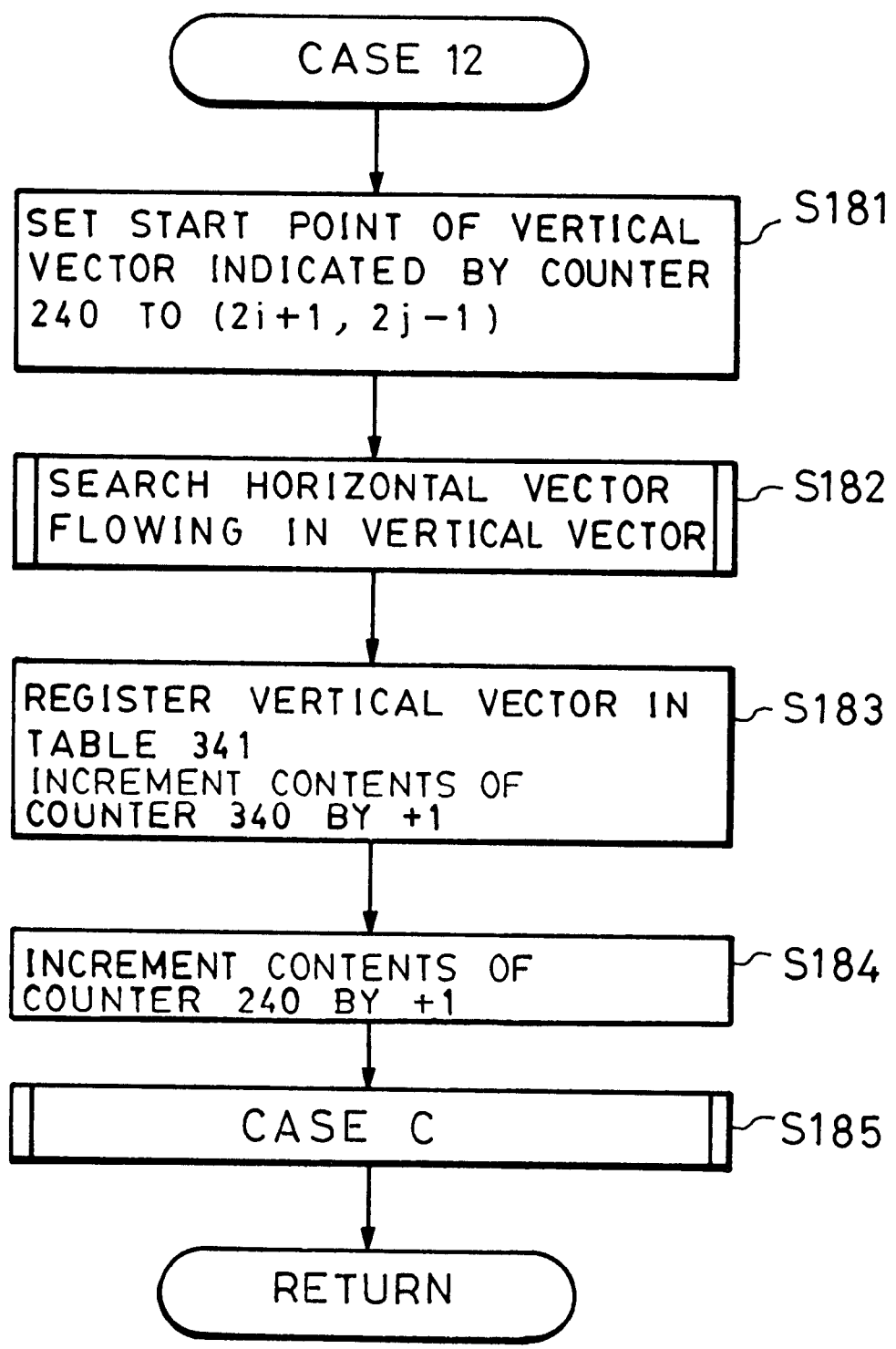

When the value of the register is "12" in step S30 shown in FIG. 27, a routine shown in FIG. 51 is called. This routine processes the state of case 12 shown in FIG. 18.

In step S181, a point (2i+1, 2j−1) is registered as the start point of the vertical vector 181 (FIG. 18) in the table shown in FIG. 24. In step S182, the horizontal vector 182 flowing into the vertical vector 181 registered in step S181 is searched according to the procedure shown in FIG. 45 and is registered, as in the above-described step S134 shown in FIG. 44. The vertical vector 181 registered in step S181 is registered as the vertical vector where this horizontal vector 182 flows out to, and the table 321 shown in FIG. 32 is updated.

Subsequently, in step S183, the fact that the vector where the vertical vector 181 registered in step S181 flows out to is undetermined is registered in the table 341 shown in FIG. 34, and the counter 340 is updated. In step S184, the contents of the vertical-vector counter 240 are incremented by one. In step S185, the CPU 519 determines whether the pixel at position C is a white pixel or a black pixel. In the case of a white pixel, a point (2i–1, 2j+1) is registered as the start point of the horizontal vector 185, as indicated in a matrix 183 shown in, FIG. 18. In the case of a black pixel, the processing is terminated with performing no further operation, as indicated in a matrix 184 shown in FIG. 18.

Figure 52:
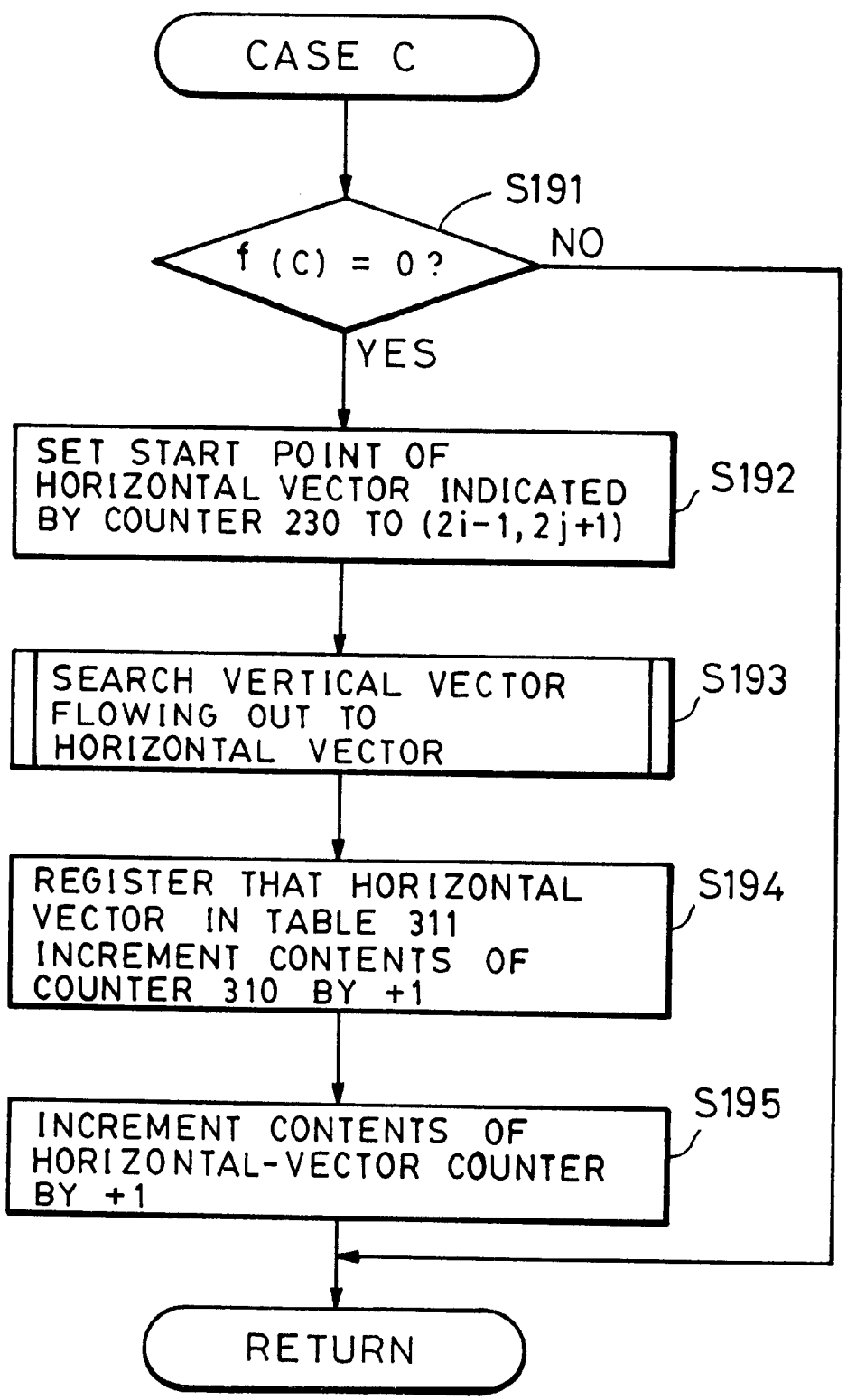

The flowchart of FIG. 52 shows the contents of the processing in step S185.

In step S191, the CPU 519 determines whether the pixel at position C is a white pixel or a black pixel. In the case of a black pixel, the process returns with no further processing performed. In the case of a white pixel, the process proceeds to step S192, where a point (2i–1, 2j+1) is registered as the start point of the horizontal vector 185. Subsequently, in step S193, the above-described processing indicated by the flowchart shown in FIG. 46 is performed, and the vertical vector where the horizontal vector 185 registered in step S192 flows out to is registered. The horizontal vector 185 registered in step S192 is registered in the table shown in FIG. 24 as, the vector flowing into this vertical vector, and the table 331 shown in FIG. 33 is updated.

In step S194, the fact that the horizontal vector 185 registered in step S192 is a vector having an undetermined inflow vertical vector is registered in the horizontal vector table 311 having an undetermined inflow vector shown in FIG. 31, and the contents of the counter 310 are incremented by one. The process then proceeds to step S195, where the contents of the horizontal-vector counter 230 are incremented by one, the process returns to the original processing.

Figure 19:
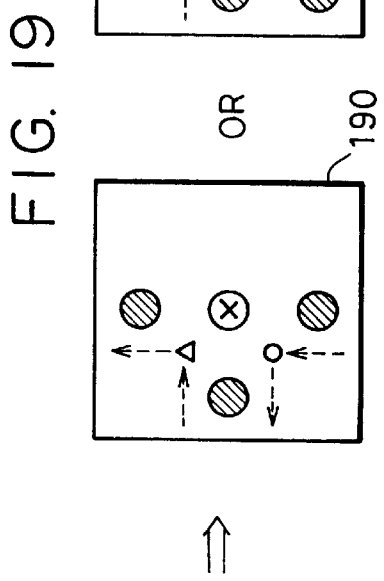
Figure 20:
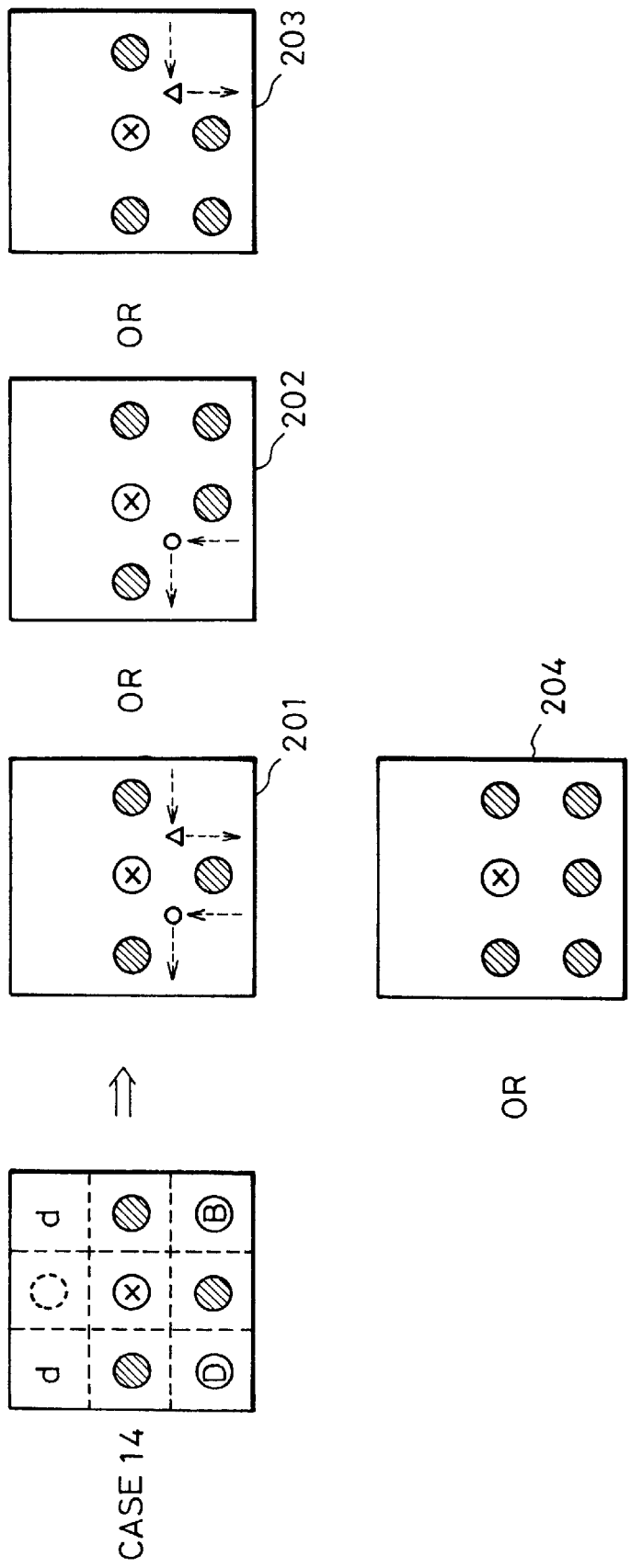
Figure 53:
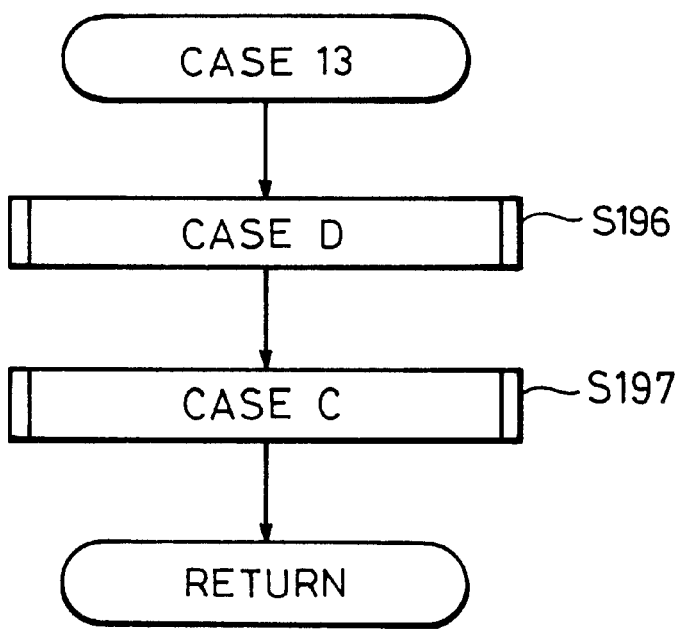

Explanation of Processing for Case 13 (FIGS. 19 and 53)

When the value of the register is "13" in step S30 shown in FIG. 27, a routine shown in FIG. 53 is called. This routine processes case 13 shown in FIG. 19.

In step S196, the above-described processing indicated by the flowchart shown in FIG. 48 is performed in accordance with the state of the pixel at position D, in the same manner as in step S165 shown in FIG. 47 and step S176 shown in FIG. 50.

In step S197, the above-described processing indicated by the flowchart shown in FIG. 52 is performed in accordance with the state of the pixel at position C, in the same manner as in step S185 shown in FIG. 51. Matrices 190, 191, 192 and 193 represent the results of processing for cases wherein the both pixels at positions D and C are white pixels, wherein only the pixel at position C is a black pixel, wherein only the pixel at position D is a black pixel, and wherein the both pixels at positions C and D are black pixels, respectively.

Explanation of Processing for Case 14

Figure 54:
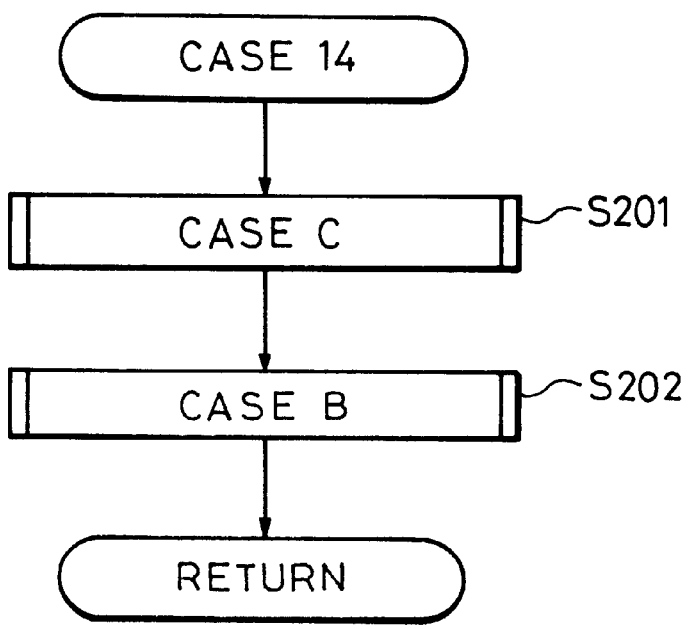

When the value of the register is "14" in step S30 shown in FIG. 27, a routine shown in FIG. 54 is called. This routine processes the state of case 14 shown in FIG. 20.

In step S201 shown in FIG. 54, the above-described processing for case C shown in FIG. 52 is performed in accordance with the state of the pixel at position C, in the same manner as in step S185 shown in FIG. 51 and in step S197 shown in FIG. 53. Subsequently, in step S202, the above-described processing for case B shown in FIG. 42 is performed in accordance with the state of the pixel at position B, in the same manner as in step S115 shown in FIG. 41 and in step S132 shown in FIG. 43.

Matrices 201, 202, 203 and 204 represent the results of processing for cases wherein the both pixels at positions C and B are white pixels, wherein only the pixel at position B is a black pixel, wherein only the pixel at position C is a black pixel, and wherein the both pixels at positions C and B are black pixels.

Explanation of Processing for Case 15

Figure 55:
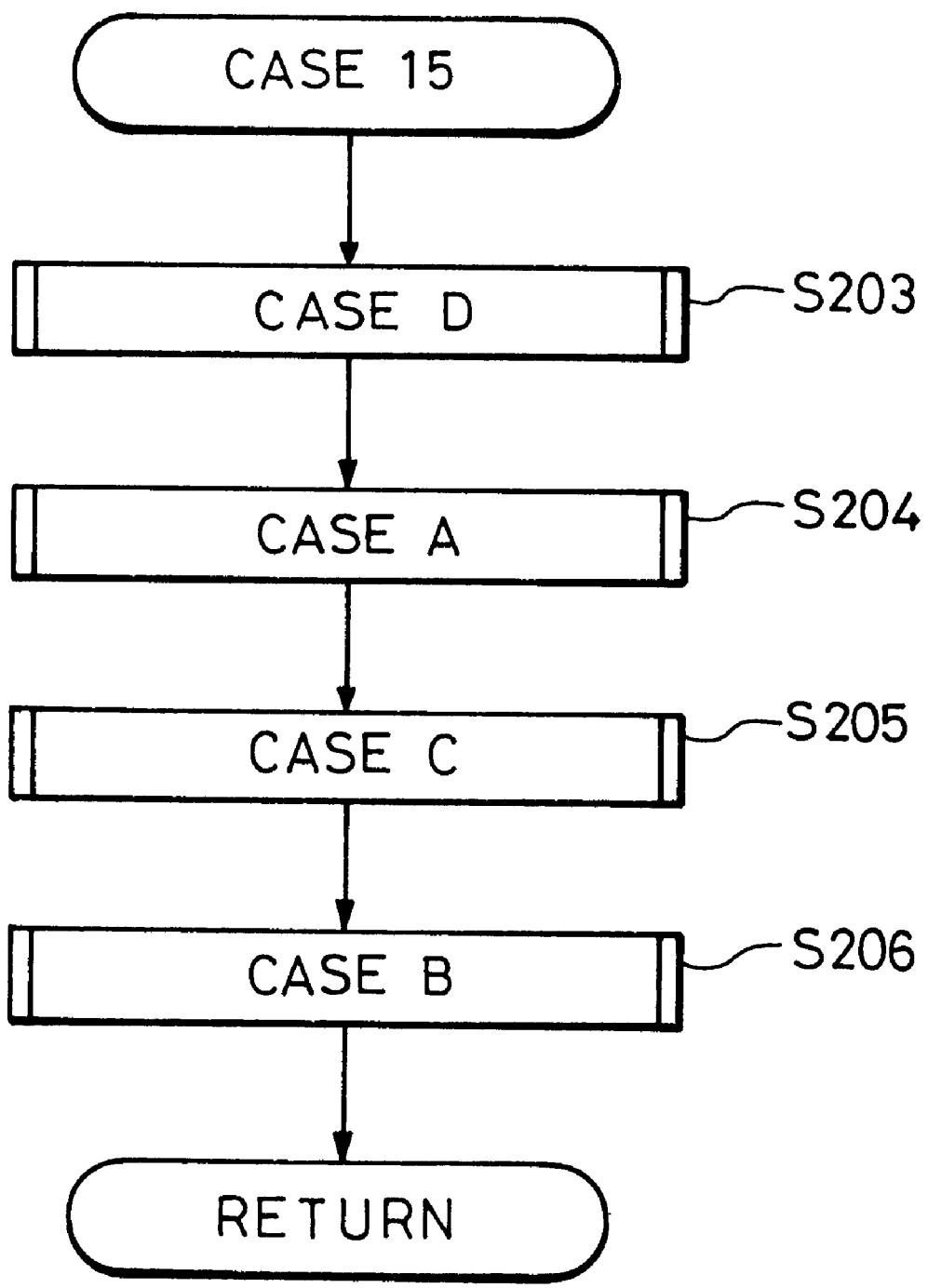

When the value of the register is "15" in step S30 shown in FIG. 27, a routine shown in FIG. 55 is called. This routine processes the state of case 15 shown in FIG. 21.

In step S203, the above-described processing for case D indicated by the flowchart shown in FIG. 48 is performed in accordance with the state of the pixel at position D, in the same manner as in the above-described step S165. Subsequently, in step S204, the above-described processing for case A shown in FIG. 38 is performed in accordance with the state of the pixel at position A, in the same manner as in the above-described steps S85, S131 and the like. In step S205, the above-described processing for case C shown in FIG. 52 is performed in accordance with the state of the pixel at position C, in the same manner as in the above-described step S185 and the like. In step S206, the above-described processing for case B shown in FIG. 42 is performed in accordance with the state of the pixel at position B, in the same manner as in step S115 and the like shown in FIG. 41.

Figure 21:
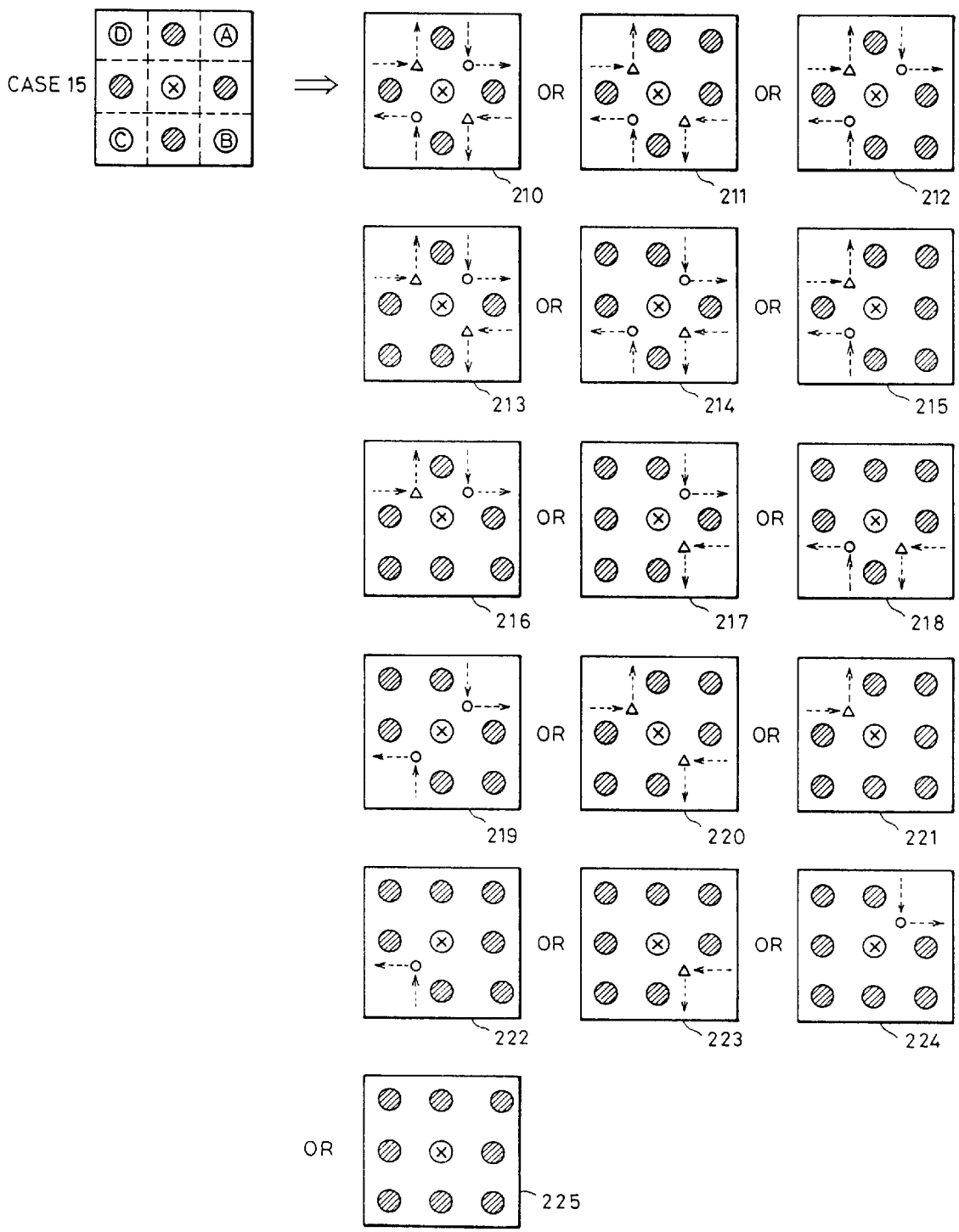

A matrix 210 shown in FIG. 21 represents the result of processing when all the pixels at positions D, A, C and B are white pixels. Matrices 211, 212, 213 and 214 represent the results of processing when only the pixel at position A is a black pixel, when only the pixel at position B is a black pixel, when only the pixel at position C is a black pixel, and when only the pixel at position D is a black pixel, respectively. Matrices 215, 216, 217, 218, 219 and 220 represent the results of processing when only the pixels at positions A and B are black pixels, when only the pixels at positions B and C are black pixels, when only the pixels at positions C and D are black pixels, when only the pixels at positions D and A are black pixels, when only the pixels at positions B and D are black pixels, and when only the pixels at positions A and C are black pixels, respectively. Matrices 221, 222, 223 and 224 and represent the results of processing when only the pixel at position D is a white pixels, when only the pixel at position C is a white pixel, when only the pixel at position B is a white pixel, and when only the pixel at position A is a white pixel. A matrix 225 represents the result of processing when all the pixels are black pixels.

According to the above-described procedures, a series of processing for extracting respective vector strings in step S1 shown in FIG. 22 are executed.

Processing of Aligning Outline Vector String

Figure 56:
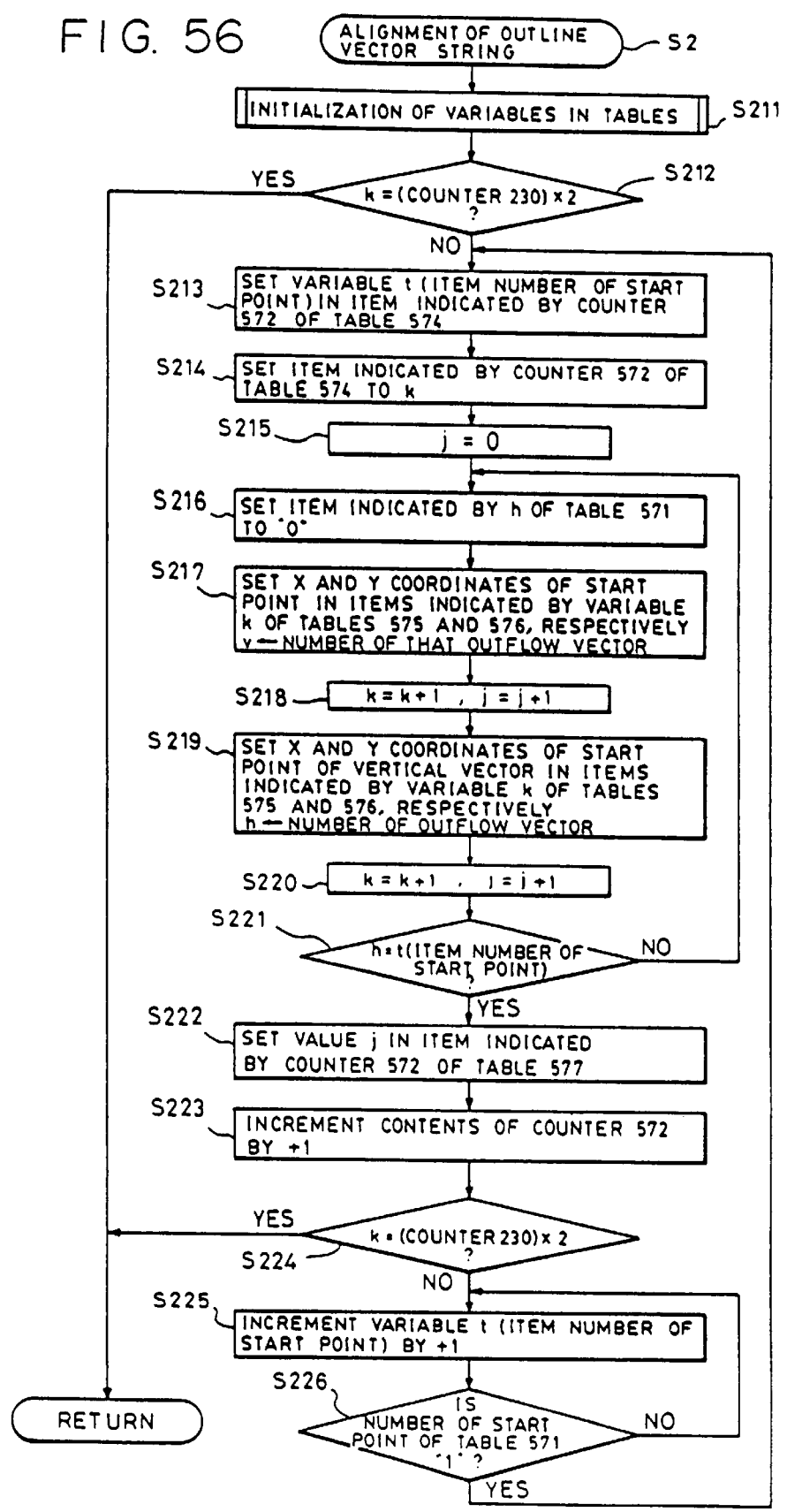
FIGS. 56 and 58 are flowcharts showing arrangement processing of an outline vector string.

FIG. 56 shows the contents of processing of aligning an outline vector string in step S2 shown in FIG. 22. The flowchart shown in FIG. 56 is operated using a group of tables (FIG. 23) relating to horizontal vectors and a group of tables (FIG. 24) relating to vertical vectors formed in step S1 shown in FIG. 22, and a group of tables shown in FIG. 57 (to be described later).

Figure 58:
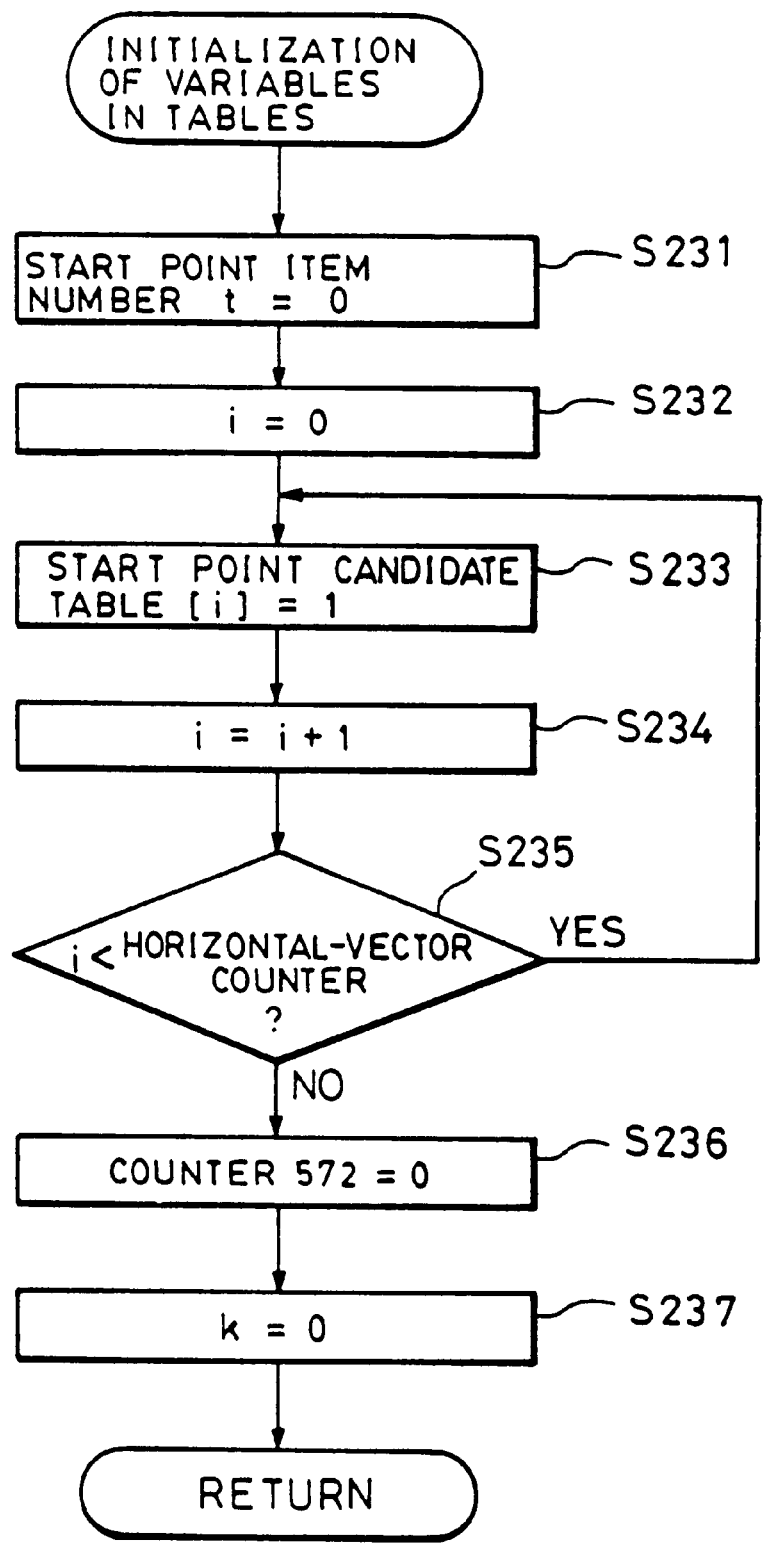

First, in step S211, initialization of necessary items in the group of tables shown in FIG. 67 is performed. A flowchart shown in FIG. 58 shows the contents of the processing in step S211 in detail.

In step S231, variable (start point item number) t holding item numbers of start points is temporarily set to 0. The process then proceeds to step S232, where variable i is set to "0". In step S233, the i-th item in start point candidate table 571 is set to "1". In step S234, the variable i is incremented by one. In step S235, the CPU 519 determines whether or not the variable i has a value smaller than the value of the horizontal-vector counter 230. If the result of the determination is affirmative, the process returns to step S233.

If the result of the determination in step S235 is negative, the process proceeds to step S236, where a loop-number counter 572 is reset to "0". Subsequently, in step S237, variable k is reset to "0", and the process returns to the original routine. Thus, "1"s are set in all the columns from the 0-th to the (the value of the horizontal-vector counter 230–1)-th column in the start point candidate table 571.

When the operation in step S211 has been completed as described above, the process proceeds to step S212, where the CPU 519 determines whether or not the variable k equals twice the value of the horizontal-vector counter 230. If the result of the determination is affirmative, the process returns with performing no further operation. If the result of the determination is negative, the process proceeds to step S213. In step S213, the value held in the variable t is stored at the position of the item in start point item number table 574 indicated by the value held in the loop-number counter 572. In step S214, the value (that is, the value stored in step S213) stored in the item in the start point item number table 574 indicated by the value of the loop-number counter 672 is set in variable h. In step S215, variable j is reset to 0.

The loop-number counter 572 indicates the number of the contour currently being arranged. The item number of the start point of the contour currently being arranged is stored in the item number column in the start point item number table 574 indicated by the loop-number counter 572. The variable k holds the total number of points already processed and being processed within the contour already processed and being processed. The variable j holds the number of processed points within the contour currently being arranged. The variable h indicates the item number of the horizontal vector to be subsequently processed.

Subsequently, the process proceeds to step S216, where the item number in the start point candidate table 571 indicated by the value of the variable h is reset to "0". The process then proceeds to step S217, where the values held in the positions of the items of the x coordinate (FIG. 23) of the start point of the horizontal vector and the y coordinate (FIG. 23) of the start point of the horizontal vector indicated by the value of the variable h are stored in the positions of the items indicated by the variable k within x coordinate table 575 and y coordinate table 576. At the same time, the value held in the position of the item number (FIG. 23) of the outflow vector for the horizontal vector indicated by the variable h is set in variable v. The variable v indicates the item number of the vertical vector to be subsequently processed. In step S218, the values held in the variable k and the variable j are incremented by one.

The process then proceeds to step S219, where the values held in the positions of the items of the x coordinate (FIG. 24) of the start point of the vertical vector and the y coordinate (FIG. 24) of the start point of the vertical vector indicated by the variable v are stored in the positions of the items indicated by the value of the variable k within the x coordinate table 575 and the y coordinate table 576. At the same time, the value held in the position of the item of the item number (FIG. 24) of the outflow vector for the vertical vector indicated by the value of the variable v is set in the variable h. The item number of the horizontal vector flowing out of this vertical vector is thereby set in the variable h. In step S220, the values held in the variable k and the variable j are incremented by one.

Subsequently, in step S221, the CPU 519 determines whether the value of the variable h equals the value of the table 573 (variable t) holding the item number of the start point of the contour currently being arranged. If the result of the determination is negative, the process returns to step S216, where processing for the next point which is a point in the same contour is performed. If the result of the determination is affirmative, the process proceeds to step S222, where the processing of the contour currently being arranged is terminated. In step S222, the value held by the variable j is stored in the position of the item in table 577 which includes the number of points holding the number of points included in each contour indicated by the loop-number counter 572 as the number of points included in the contour currently being processed. In step S223, the value of the loop-number counter 572 indicating the number of the contour currently being arranged is incremented by one.

Subsequently, in step S224, the CPU 519 determines whether or not the number of already-processed points held by the variable k equals twice the number of points held within the horizontal-vector table held in the horizontal-vector counter 230. If the result of the determination is affirmative, the process is terminated, and returns to the original processing. If the result of the determination is negative, the process proceeds to step S225, where the value of the item number 573 of the start point is incremented by one. In step S226, the CPU 519 determines whether or not the value held in the item in the start point candidate table 571 indicated by the value of the item number 573 of the start point is "1". If the result of the determination is negative, the process returns to step S225, where search for the start point candidate is resumed. If the result of the determination is affirmative, the process returns to step S213, where the arrangement of points within the next contour is started.

Figure 57:
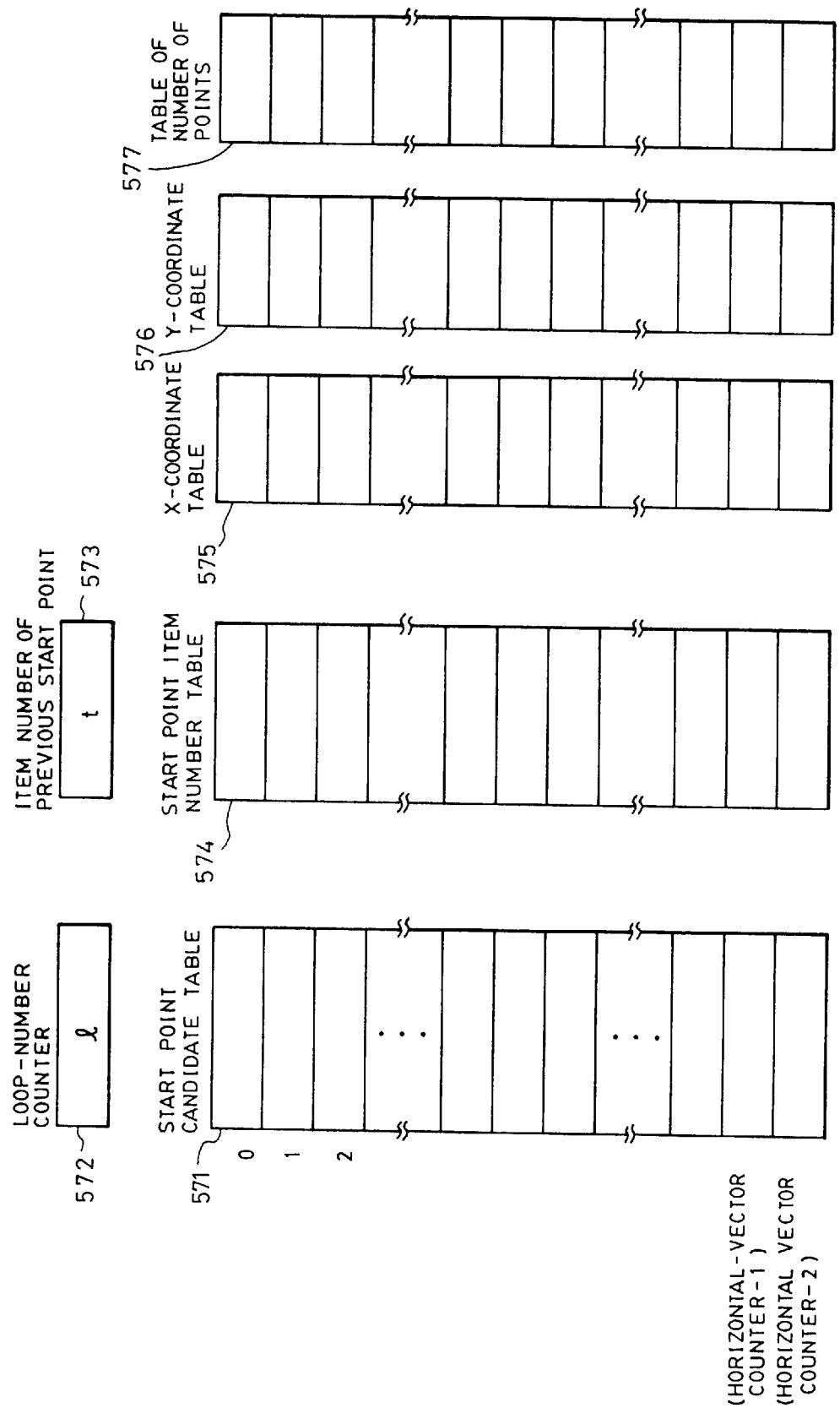
FIG. 57 is a diagram illustrating start point candidate tables in the embodiment.

As described above, according to the processing of step S2 shown in FIG. 22, the data of starts points of respective vectors shown in FIGS. 23–25 are arranged in the tables shown in FIG. 57 as strings of coordinates of points sequentially aligned for respective contour loops.

Output of Vector String Table

Figure 59:
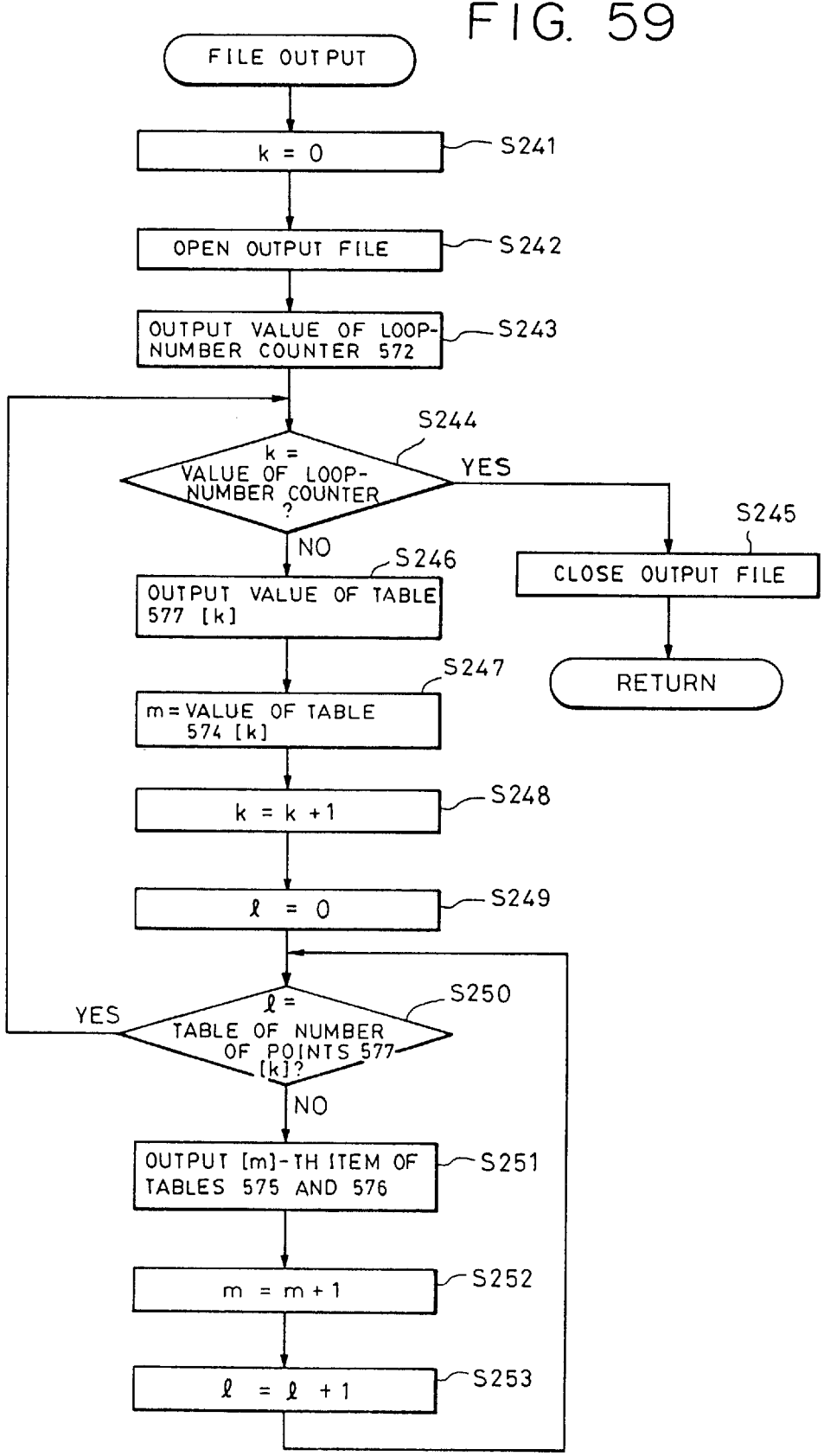
FIG. 59 is a flowchart showing processing of outputting a vector string table to a file.

An explanation will now be provided of the processing of outputting the vector-string table to the file in step S3 shown in FIG. 22 with reference to a flowchart shown in FIG. 59.

In step S241, the variable k is reset to "0". The process then proceeds to step S242, where an output file is opened on the disk 522 via the disk I/O 521. In step S243, the value held in the loop-number counter 572 is output to the file opened in step S242. In step S244, the CPU 519 determines whether or not the value of the variable k equals the value held in the loop-number counter 572. If the result of the determination is affirmative, the process proceeds to step S245, where the output file is closed, and the process returns to the original processing.

If the result of the determination in step S244 is negative, the process proceeds to step S246, where the value stored in the position of the item indicated by the variable k in the table 577 of the number of points within a contour loop is output to the disk 522. In step S47, the value stored in the position of the item in the start point item number table 574 indicated by the value of the variable k is set in variable m. The variable k holds the number of the contour loop currently being output, and the variable m holds the number of the item storing the start point of the point string within the contour currently being output. Subsequently, in step S248, the value of the variable k is incremented by one. In step S249, the value of the variable l is reset to "0". The variable l holds the number of already-output points within the contour loop currently being output.

In step S250, the CPU 519 determines whether or not the value of the variable l equals the number of points within the contour loop currently being output. If the result of the determination is affirmative, the step returns to step S244. If the result of the determination is negative, the process proceeds to step S251. In step S251, the values stored in the positions of the items within the x coordinate table 575 and the y coordinate table 576 indicated by the variable m are output to the output file 521. In step S252, the value of the variable m is incremented by one. In step S253, the value of the variable l is incremented by one, and the process returns to step S250. Thus, the result is output to the disk 522 in the form shown in FIG. 25 based on the table shown in FIG. 57, and the processing in step S3 shown in FIG. 22 is terminated.

According to the above-described procedure, a contour line connected in four directions is extracted. However, the present invention is not limited to this approach, but may also be applied when a contour line connected in eight directions is extracted.

Another Embodiment

Cases 0, 1, 2, 3, 4, 6, 8, 9 and 12 in the first embodiment may be modified into cases 00, 01, 02, 03, 04, 06, 08, 09 and 012 shown in FIGS. 60, 61, 62, 63, 64, 65, 66, 67 and 68, respectively, by changing the setting of the start points of vectors and the setting of states of connection in respective cases.

An explanation will now be provided of the processing of the respective cases according to flowcharts shown in FIGS. 69–83.

Figure 60:
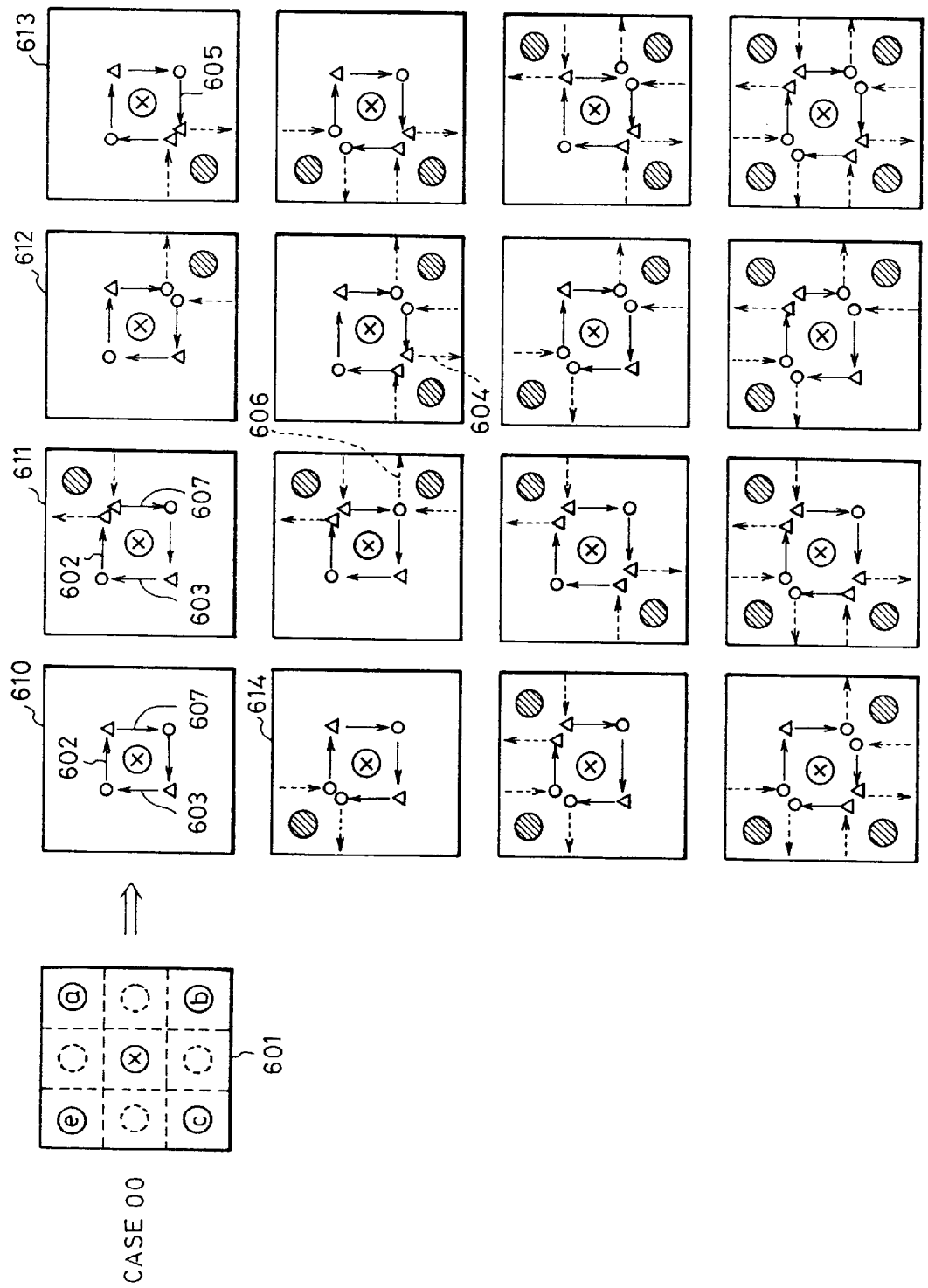
Figure 69:
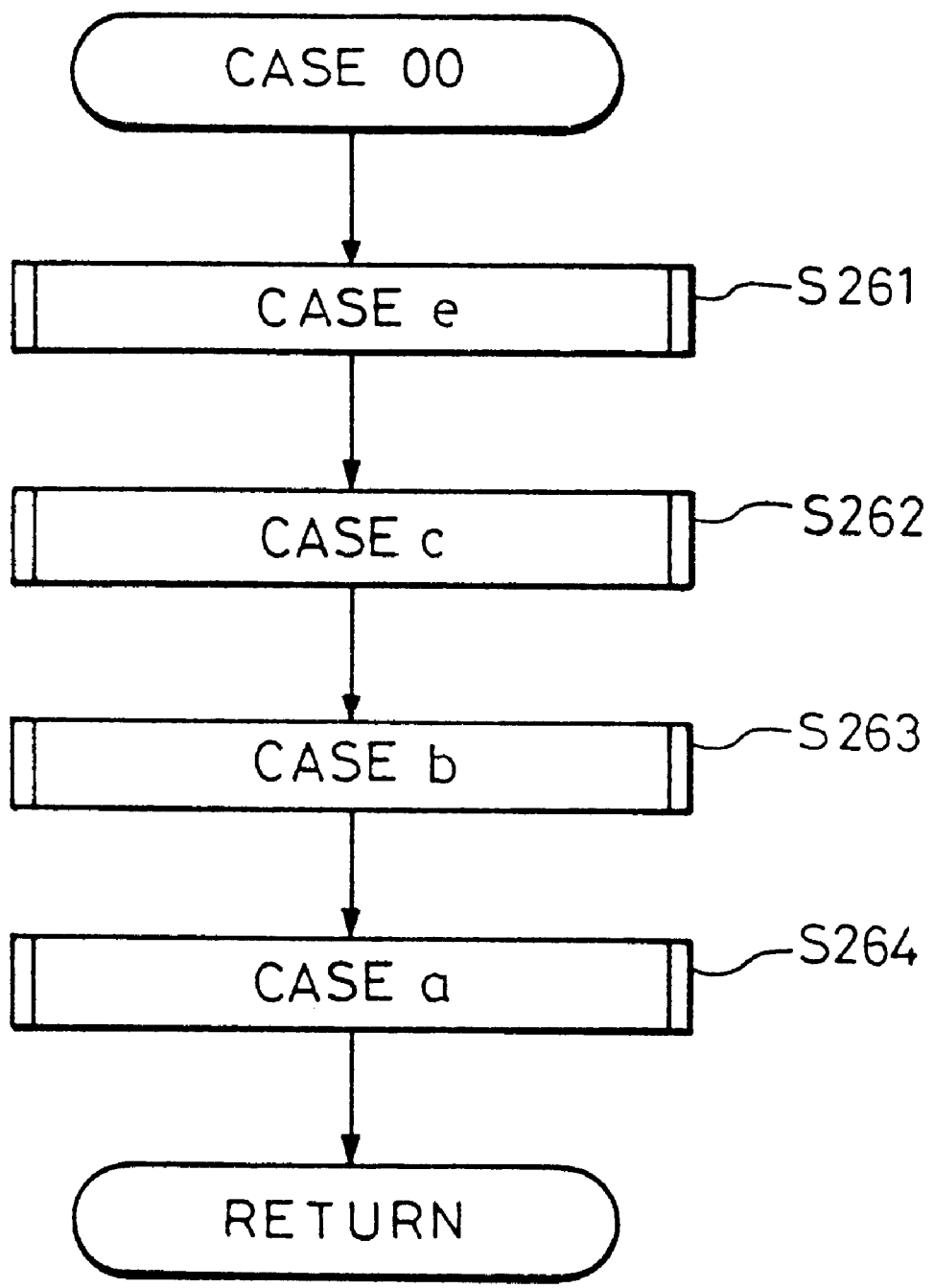
FIGS. 69–83 are flowcharts showing processing procedures in the second embodiment of the present invention.
Figure 70:
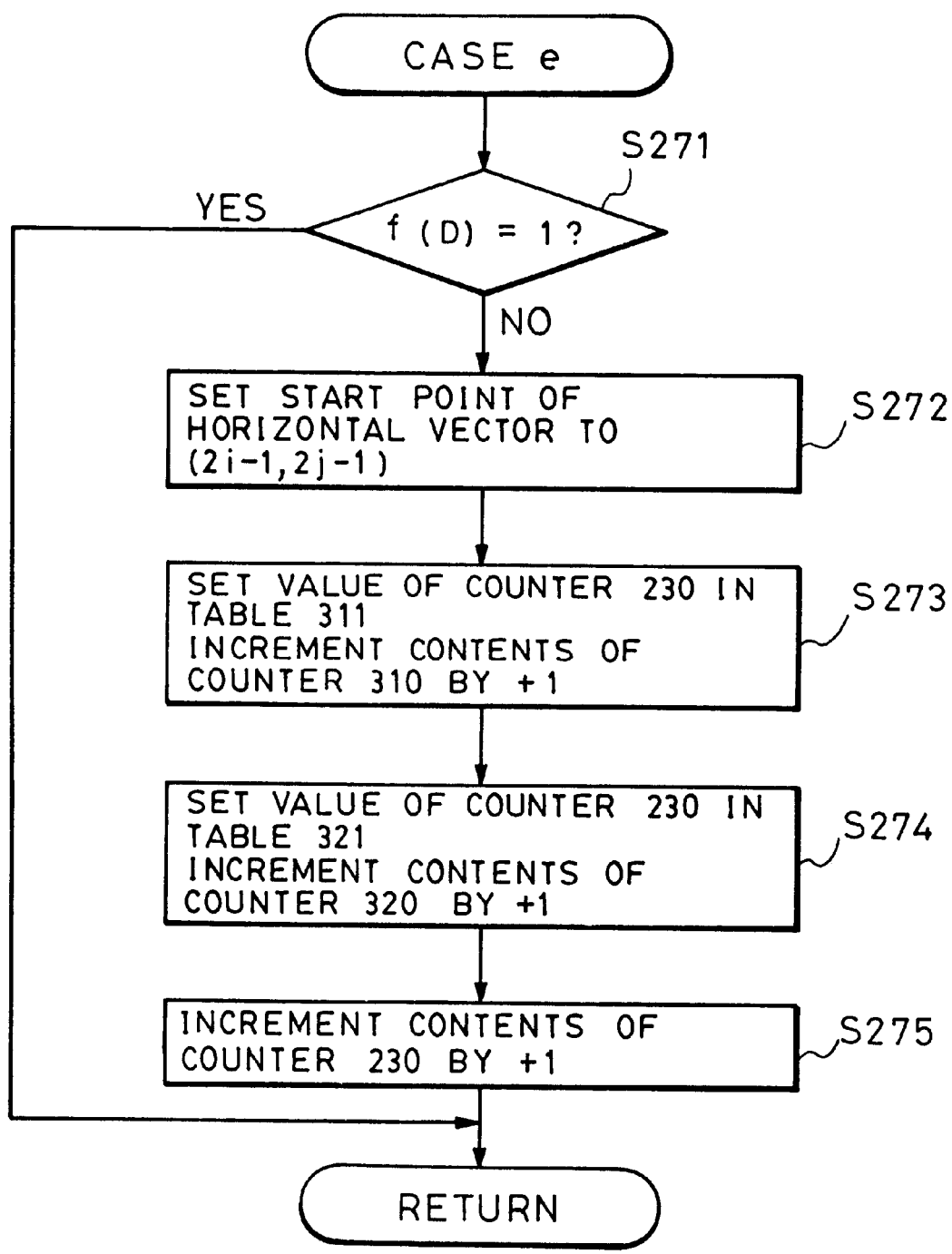

FIG. 69 is a flowchart showing processing for case 00. In step S261, processing for the neighborhood of the pixel at position (e) in a pixel matrix 601 shown in FIG. 60 is performed. The contents of the processing are shown in the flowchart of FIG. 70. The position (e) corresponds to the position of the pixel D in FIG. 1.

In the flowchart of FIG. 70, if the pixel at position D is a black pixel, the start point of the vector between the point D and the target point was already extracted in the processing when the pixel at position D was the target pixel. Accordingly, if f(D)=1 in step S271, the process returns to the original processing with performing no further operation.

In the case of f(D)=0, the process proceeds to step S272, where a point (2i−1, 2j−1) is registered in the table shown in FIG. 23 as the start point of the horizontal vector 602 (FIG. 60). In step S273, the value of the counter 230 is registered in the table 311 shown in FIG. 31 assuming that the vector which flows into this horizontal vector is undetermined, and the value of the counter 310 is updated. The process then proceeds to step S274, where the value of the counter 230 is registered in the table 321 shown in FIG. 32 assuming that the vector where the horizontal vector flows out to is undetermined, and the value of the counter 320 is updated. Finally, the value of the horizontal-vector counter 230 is incremented by one, and the process returns to the original processing. Thus, the processing for case e in step S261 is terminated.

Figure 71:
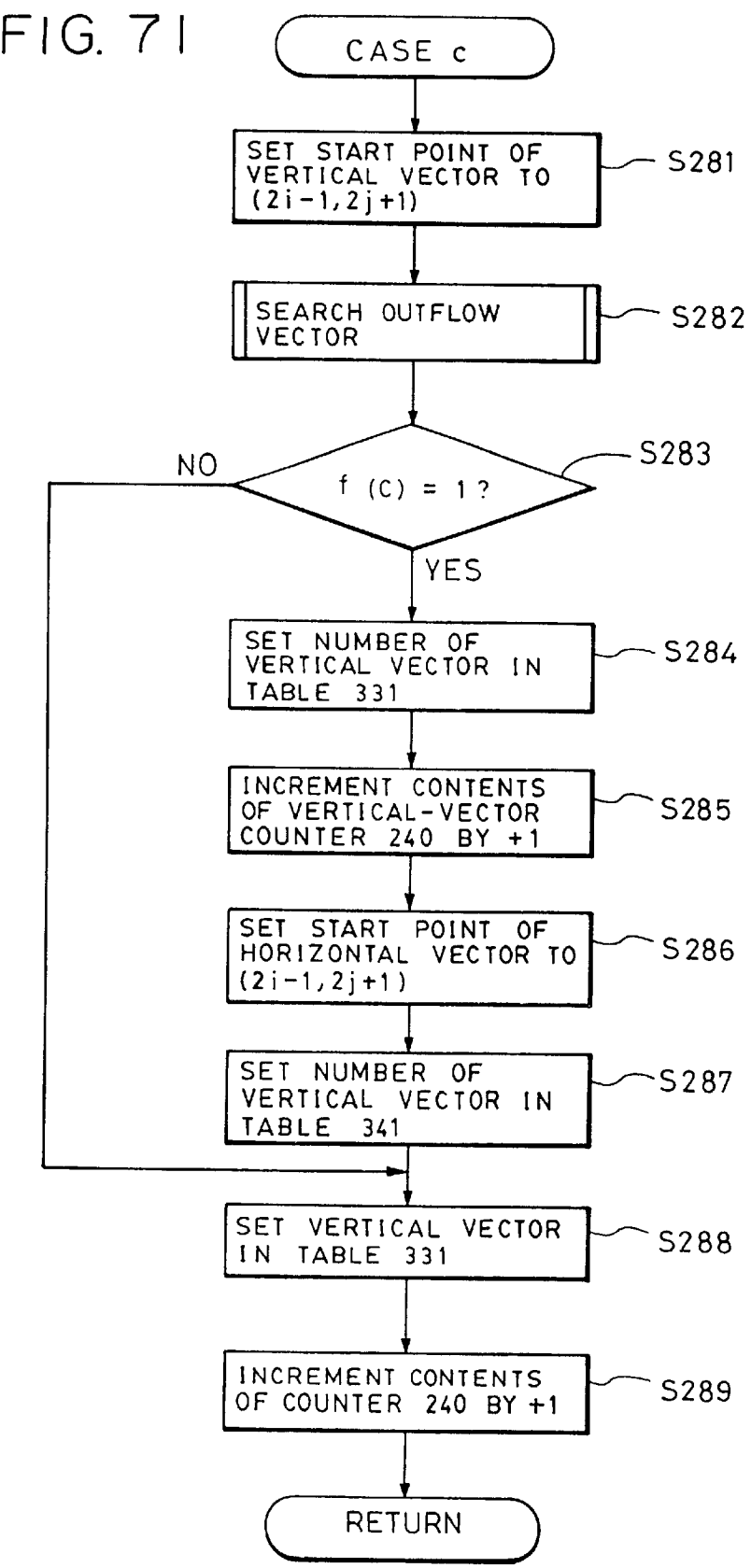

Subsequently, the process proceeds to step S262, where processing for the neighborhood of the pixel at position C shown in FIG. 1 is performed. The contents of the processing are shown in the flowchart of FIG. 71.

In step S281, a point (2i−1, 2j+1) is registered in the table shown in FIG. 24 as the start point of the vertical vector 603 (FIG. 60). The process then proceeds to step S282, where the horizontal vector where this vertical vector flows out to is searched, and is registered. The process then proceeds to step S283, where the CPU 519 determines whether or not the pixel at position C is a black pixel. If the result of the determination is negative, the process proceeds to step S288, where the vertical vector 603 registered in step S281 is registered in the table 331 shown in FIG. 33 as a vector having an undetermined inflow vector. In step S289, the value of the vertical counter 240 is incremented by one, and the process returns to the original processing.

If the result of the determination in step S283 is affirmative, the process proceeds to step S284, where the vertical vector 603 registered in step S281 is registered in the table 331 shown in FIG. 33 as a vector having an undetermined inflow vector. Subsequently, in step S285, the value of the vertical-vector counter 240 is incremented by one. In step S286, the point (2i−1, 2j+1) is registered as the start point of the vertical vector 604 (FIG. 60) different from the vertical vector registered in step S281. The process then proceeds to step S287, where the vertical vector 604 registered in step S286 is registered in the table 341 shown in FIG. 34 as a vector having an undetermined vector to flow out. In step S288, the vertical vector 604 is registered in the table 331 as a vector having an undetermined inflow vector. In step S289, the value of the vertical-vector counter 240 is incremented by one, and the process returns to the original processing. The processing for case C in step S262 is thereby terminated.

Figure 72:
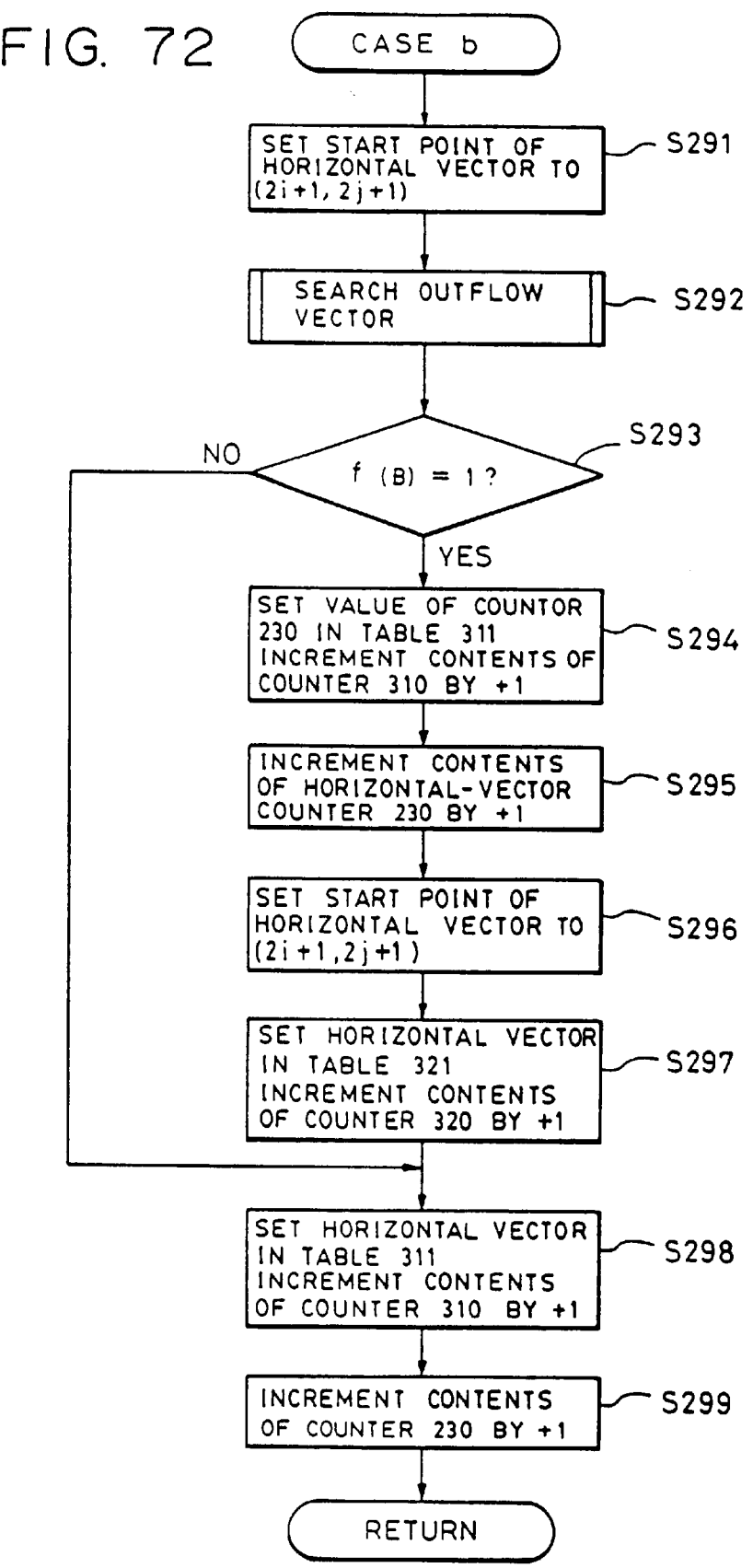

In step S263, processing for the neighborhood of the pixel (b) at position B shown in FIG. 1 is performed. The contents of the processing are shown in the flowchart of FIG. 72.

In step S291, a point (2i+1, 2j+1) is registered in the table shown in FIG. 23 as the start point of the horizontal vector 605 (FIG. 60). Subsequently, in step S292, the vertical vector where this horizontal vector 605 flows out to is searched, and is registered in the column of the item number of the outflow vector shown in FIG. 23. In step S293, the CPU 519 determines whether or not the pixel at position B is a black pixel. If the result of the determination is negative, the process proceeds to step S298, where the horizontal vector 605 registered in step S291 is registered in the table 311 as a vector having an undetermined inflow vector, the value of the horizontal-vector counter 230 is incremented by one, and the process returns to the original processing.

If the result of the determination in step S293 is affirmative, the process proceeds to step S294. In step S294, the horizontal vector 605 registered in step S291 is registered in the table 311 as a vector having an undetermined inflow vector, and the value of the counter 310 is incremented by one. The process then proceeds to step S295, where the value of the horizontal-vector counter 230 is incremented by one. The process then proceeds to step S296, where the point (2i+1, 2j+1) is registered in the table shown in FIG. 23 as the start point of the horizontal vector 606 (FIG. 60) different from the horizontal vector registered in step S291. The process then proceeds to step S297, where the vector registered in step S296 is registered in the table 321 as a vector having an undetermined vector to flow out, and the value of the counter 320 is updated. In step S298, this horizontal vector is registered in the table 311 as a vector having an undetermined inflow vector. In step S299, the value of the horizontal-vector counter 230 is incremented by one, and the process returns to the original processing.

Thus, the processing for case b in step S263 is terminated.

Figure 73:
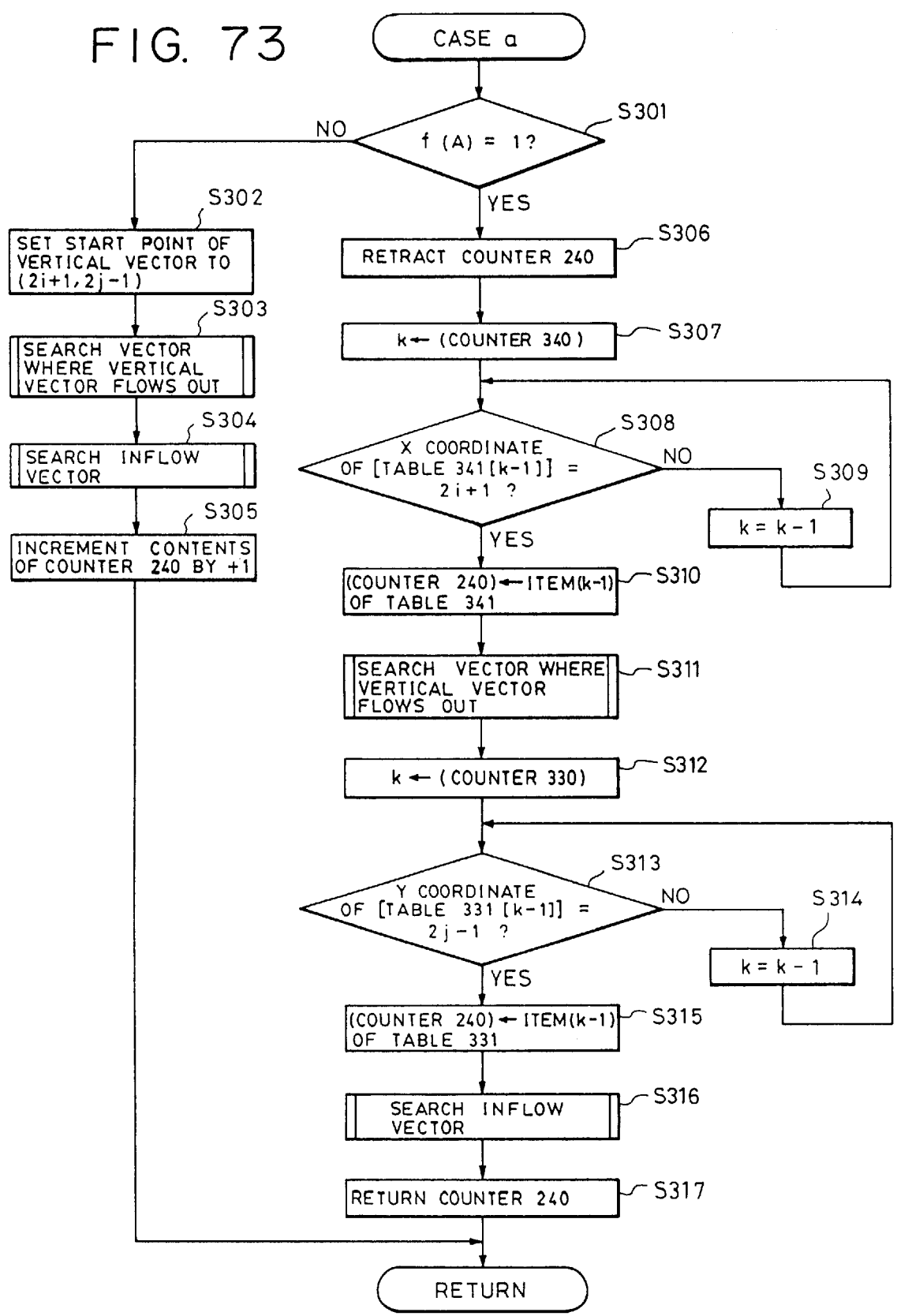

In step S264 shown in FIG. 69, processing for the neighborhood of the pixel ⓐ at position A shown in FIG. 1 is performed. The contents of the processing are shown in the flowchart of FIG. 73.

In step S301, the CPU 519 determines whether or not the pixel at position A is a black pixel. If the result of the determination is negative, the process proceeds to step S302, where a point (2i+1, 2j−1) is registered as the start point of the vertical vector 607 (FIG. 60), and the process proceeds to step S303. In step S303, a vector where the vertical vector registered in step S302 flows out to is searched in the same manner as in the above-described processing shown in FIG. 35, and is registered. The processing shown in FIG. 73 differs from the processing shown in FIG. 35 only in that the determination term (2i−1) in step S62 in FIG. 35 becomes (2i+1) in the present processing. Other processing procedures are entirely the same as in the processing shown in FIG. 35.

The process then proceeds to step S304, where an inflow vector for the vertical vector 607 registered in step S302 is searched by performing the above-described processing shown in the flowchart of FIG. 45, and is registered. In step S305, the value of the vertical-vector counter 240 is incremented by one, and the process returns to the original processing.

If the result of the determination in step S301 is affirmative, since the start point of the vector between the position A and the target point was already extracted in the processing when the pixel at position A was the target point, the value of the vertical-vector counter 240 is first retracted in step S306. Subsequently, in steps S307–S310, the already-registered vertical vector between the pixel at point A and the target point having an undetermined vector to flow out is searched. That is, in step S308, the CPU 519 checks whether or not the x coordinate of the vertical vector indicated by the contents of the column of the item (k−1) in the table 341 is (2i+1). If the result of the check is affirmative, the contents of the column of the item (k−1) in the table 341 are set in the counter 240 in step S310. In step S311, the horizontal vector where this vertical vector flows out to is searched and registered in the entirely same manner as in the above-described step S303.

In steps S312–S315, the already-registered vertical vector between the point A and the target point having undetermined inflow vector is searched. That is, in step S313, the CPU 519 checks whether or not the y coordinate of the vertical vector indicated by the contents of the column of the item (k−1) in the table 331 is (2j−1). If the result of the check is affirmative, the process proceeds to step S315, where the contents of the column of the item (k−1) in the table 331 are set in the counter 240. Subsequently, in step S316, the horizontal vector flowing into this vertical vector is searched and registered. In step S317, the value of the vertical-vector counter 240 retracted in step S306 is reset, and the process returns to the original processing.

Thus, the processing for case 00 is terminated by terminating the processing for case "a" in step S264 shown in FIG. 69 and returning to the original processing.

In FIG. 60, a matrix 610 shows vectors when all of the four pixels are white pixels, and a matrix 611 shows vectors when only the pixel at position "a" is a black pixel. Similarly, matrices 612, 613 and 614 represent cases wherein only the pixel at position b is a black pixel, wherein only the pixel at position c is a black pixel, and wherein only the pixel at position e is a black pixel, respectively. An explanation of other cases will be omitted.

Figure 74:
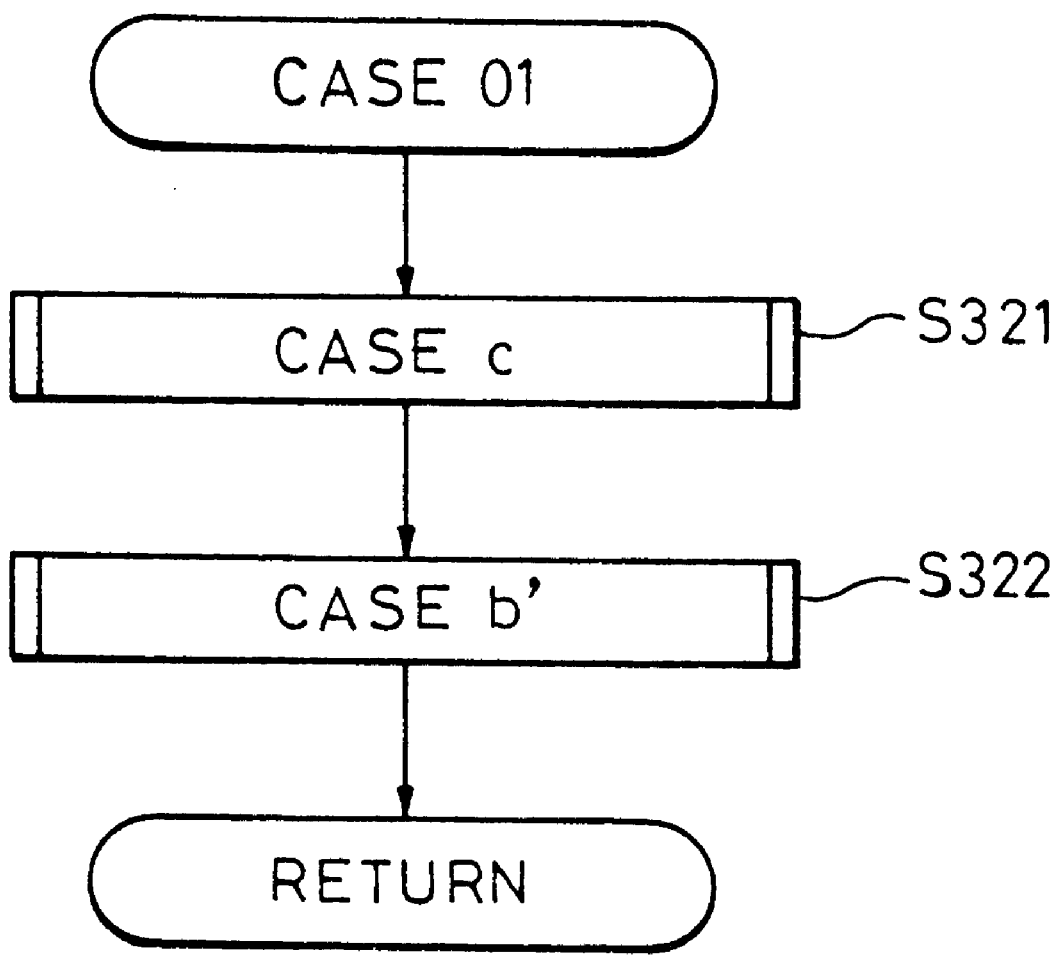

FIG. 74 is a flowchart showing processing for case 01.

Figure 75:
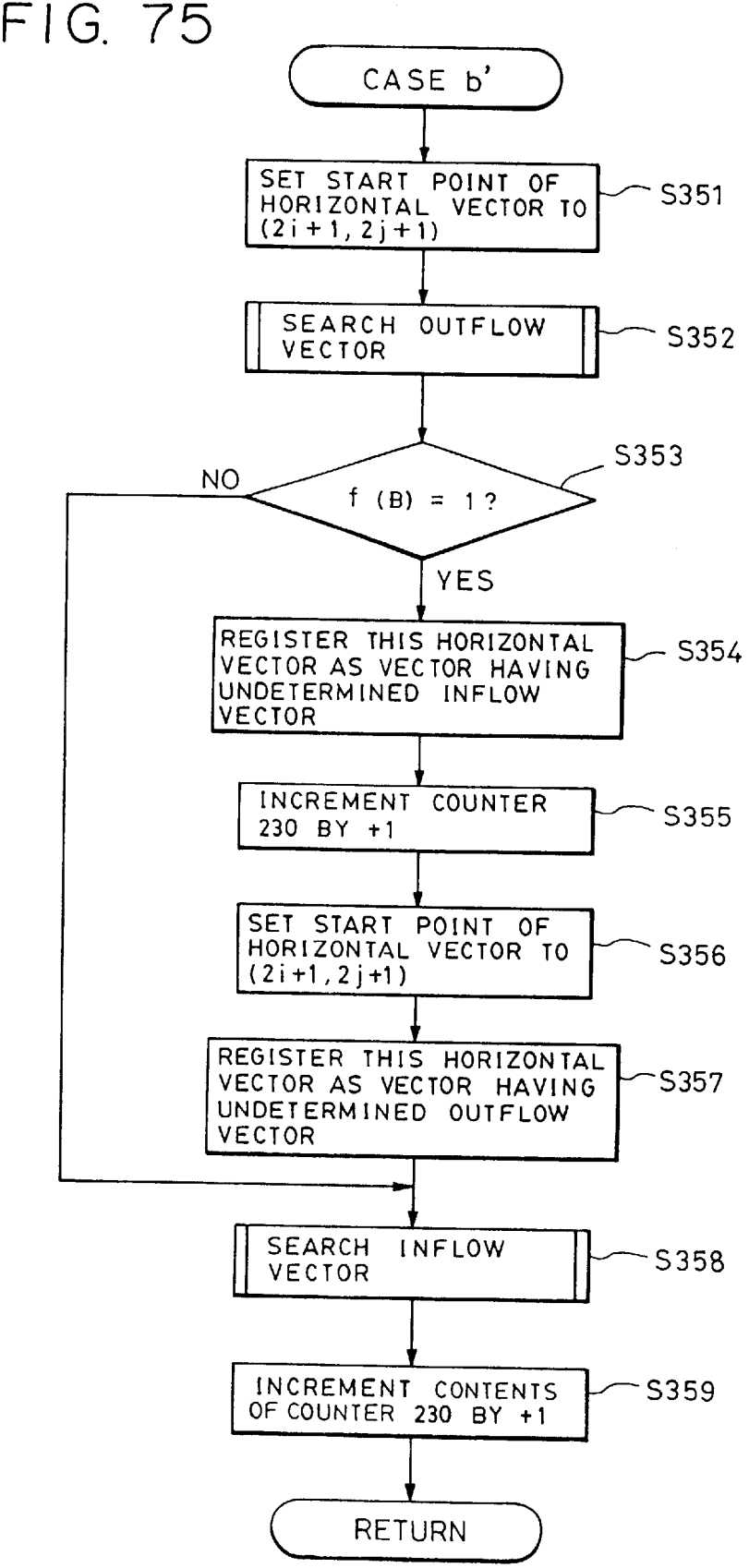

First, in step S321, processing for the neighborhood of the pixel at position ⓒ shown in FIG. 61 is performed. The contents of the processing is entirely the same as in the above-described processing for case c shown in FIG. 71. The process then proceeds to step S322, where processing for the neighborhood of the pixel at position ⓑ shown in FIG. 61 is performed. The contents of the processing are shown in the flowchart of FIG. 75.

In step S351, a point (2i+1, 2j+1) is registered as the start point of the horizontal vector 615 (FIG. 61). In step S352, the vertical vector where this horizontal vector 615 flows out to is searched, and is registered. The process then proceeds to step S353, where the CPU 519 determines whether or not the pixel at position B is a black pixel. If the result of the determination is negative, the process proceeds to step S358, where the vector flowing into the horizontal vector 615 registered in step S351 is searched, and is registered. In step S359, the value of the horizontal-vector counter 230 is incremented by one, and the process returns to the original routine.

If the result of the determination in step S353 is affirmative, the process proceeds to step S354, where the horizontal vector 615 registered in step S351 is registered in the table 311 as a vector having an undetermined inflow vector. In step S355, the value of the horizontal-vector counter 230 is incremented by one. The process then proceeds to step S356, where the point (2i+1, 2j+1) is registered in the table shown in FIG. 23 as the start point of the horizontal vector 616 different from the horizontal vector registered in step S351. The process then proceeds to step S357, where the horizontal vector 616 registered in step S356 is registered in the table 321 as a vector having an undetermined outflow vector. The process then proceeds to step S358, where the vertical vector flowing into the horizontal vector 616 registered in step S356 is searched, and is registered. In step S359, the value of the horizontal vector 230 is incremented by one, and the process returns to the original routine.

Thus, the processing in step S322 shown in FIG. 74 is terminated, and the process returns to the original routine. The processing for case 01 is thereby terminated. FIG. 61 shows how vectors are generated in accordance with the situation whether or not the pixels ⓑ and ⓒ are black pixels.

Figure 76:
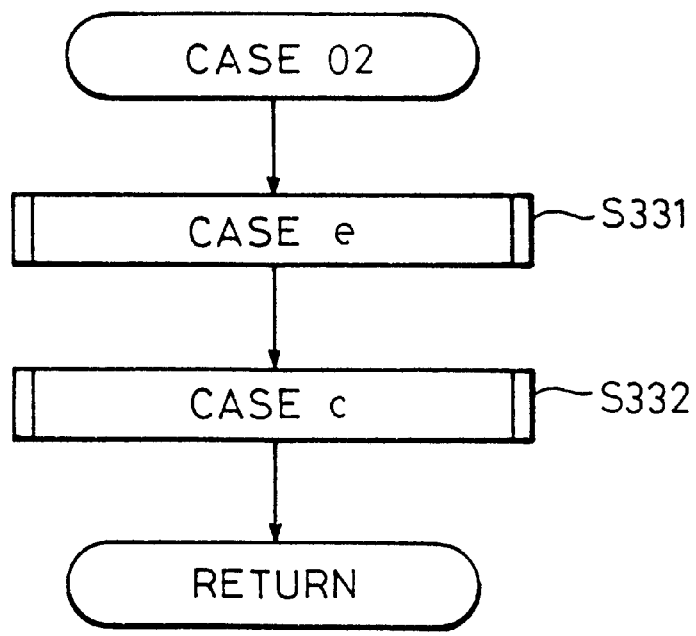

FIG. 76 is a flowchart showing processing for case 02.

In step S331, processing (case e) for the neighborhood of the pixel at position e shown in FIG. 62 is performed. The contents of the processing is entirely the same as the above-described processing shown in FIG. 70. Subsequently, in step S332, processing for the neighborhood of the pixel at position ⓒ shown in FIG. 62 is performed. The contents of the processing is entirely the same as in the above-described processing (case c) shown in FIG. 71. Thus, the processing for case 2 is terminated. FIG. 62 shows how vectors are generated in accordance with the situation whether or not pixels ⓒ and ⓔ are black pixels.

Figure 77:
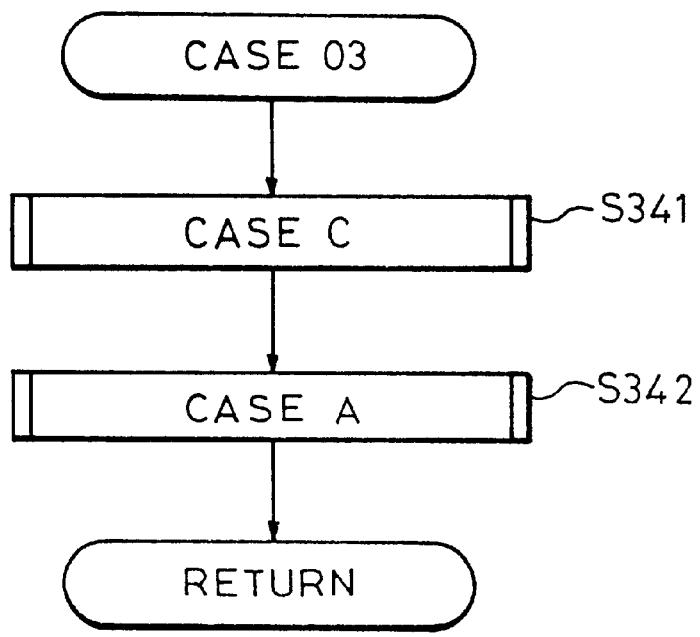

FIG. 77 is a flowchart showing processing for case 03.

In step S341, processing for the neighborhood of the pixel at position ⓔ shown in FIG. 63 is performed. The contents of the processing is entirely the same as the above-described processing shown in the flowchart of FIG. 71. The process then proceeds to step S342, where processing for the neighborhood of the pixel at position A shown in FIG. 63 is performed. The contents of the processing is entirely the same as in the above-described processing shown in FIG. 38. Thus, the processing for case 3 is performed. FIG. 63 shows how vectors are generated in accordance with the situation whether or not the pixel A and (c) are black pixels.

Figure 78:
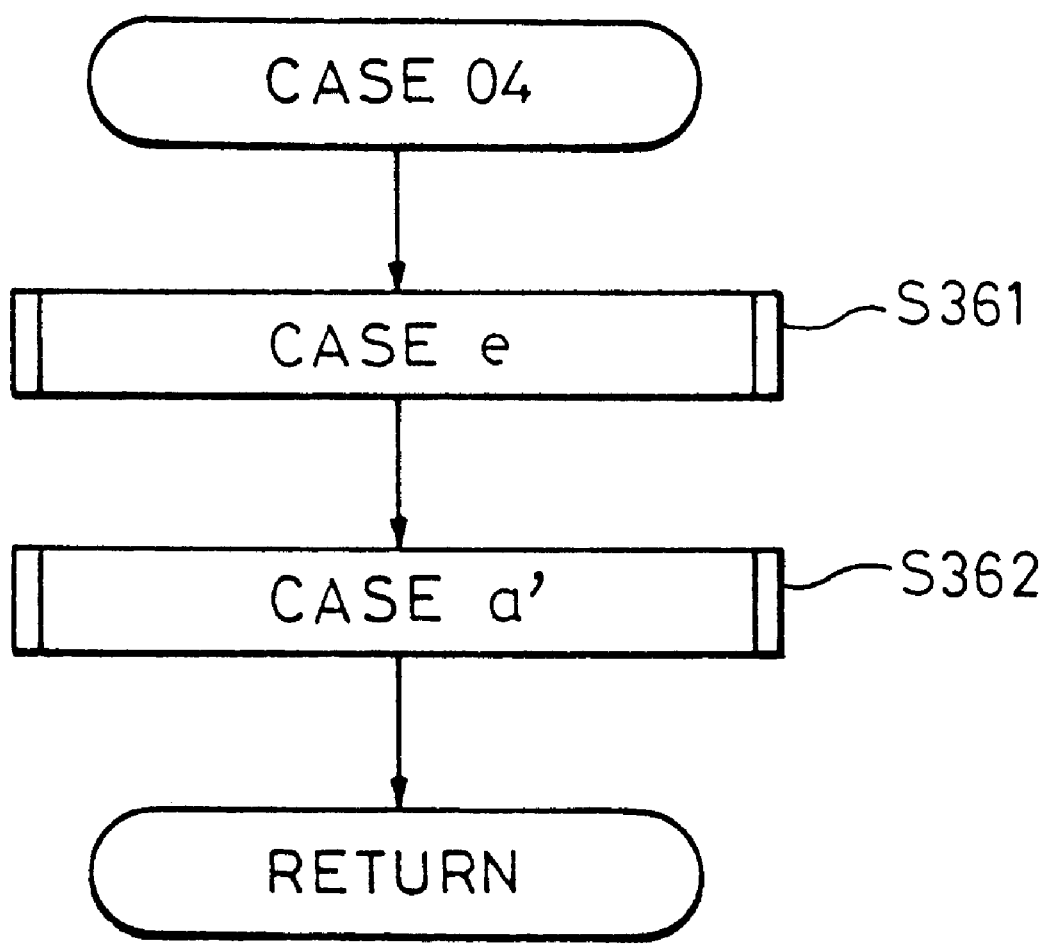

FIG. 78 is a flowchart showing processing for case 04.

In step S361, processing for the neighborhood of the pixel at position (e) shown in FIG. 64 is performed. The contents of the processing is entirely the same as the above-described processing shown in the flowchart of FIG. 70. In step S362, processing for the pixel at position (a) shown in FIG. 64 is performed. The contents of the processing are shown in the flowchart of FIG. 79.

Figure 79:
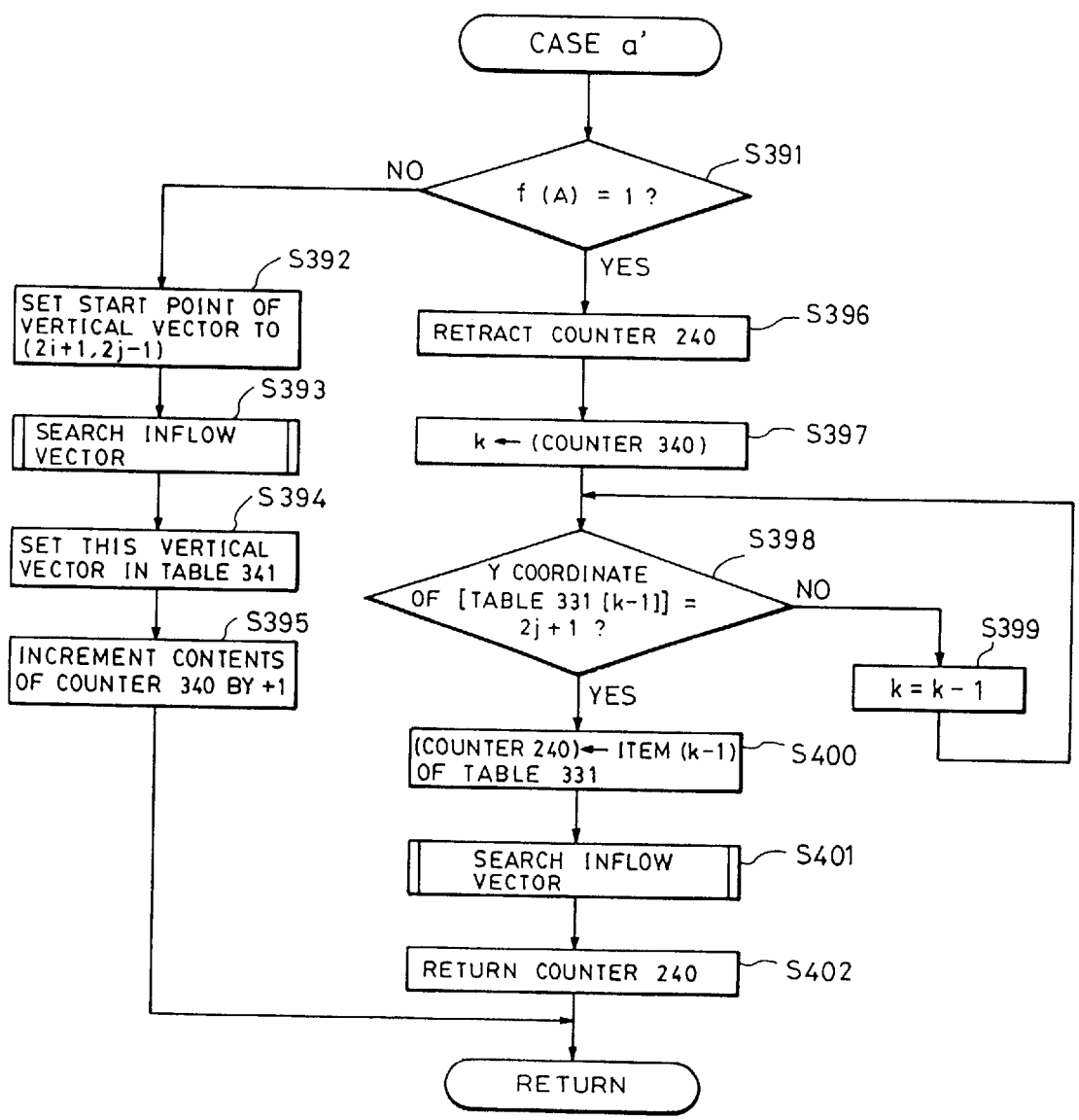

In step S391 shown in FIG. 79, the CPU 519 determines whether or not the pixel at position A is a black pixel. If the result of the determination is negative, the process proceeds to step S392, where a point (2i+1, 2j−1) is registered as the start point of the vertical vector 640 (FIG. 64). The process then proceeds to step S393, where the horizontal vector flowing into the vertical vector 640 registered in step S392 is searched, and is registered. The process then proceeds to step S394, where the vertical vector 640 registered in step S392 is registered in the table 341 as vector having an undetermined outflow horizontal vector, and the value of the counter 340 is updated. Subsequently, in step S395, the value of the vertical-vector counter 240 is incremented by one, and the process returns to the original routine.

If the result of the determination in step S391 is affirmative, since the start point of the vector between the point A and the target position was already extracted in processing when the pixel at position A was the target point, the value of the vertical-vector counter 240 is first retracted in step S396. Subsequently, in step S397–S400, the already-registered vertical vector between the point A and the target point having an undetermined inflow vector is searched. That is, in step S398, the CPU 519 checks whether or not the y coordinate of the horizontal vector indicated by the contents of the column of the item (k−1) in the table 331 is (2j+1). If the result of the check is affirmative, the contents of the column of the item (k−1) in the table 331 is set in the counter 240 in step S400. Subsequently, in step S401, the horizontal vector flowing into this vector is searched and registered in the entirely same procedure as in the above-described step S393. The process then proceeds to step S402, where the value of the vertical-vector counter 240 first retracted in step S396 is reset in the vertical-vector counter 240, and the process returns to the original routine. Thus, the processing in step S362 shown in FIG. 78 is terminated, the process returns to the original processing, and the processing for case 04 is terminated. FIG. 64 shows how vectors are generated in accordance with the situation whether the pixels (a) and (e) are black pixels.

Figure 80:
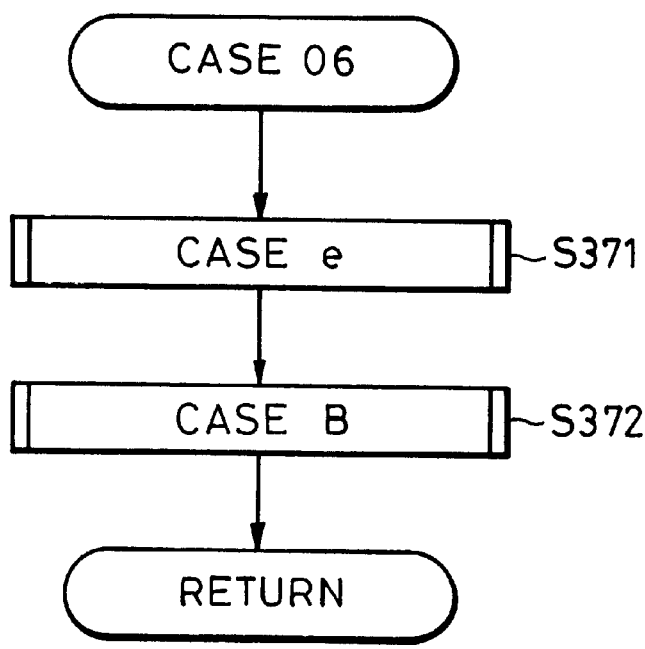

FIG. 80 shows processing for case 06. In step S371, processing for the pixel at position (e) shown in FIG. 65 is performed. The contents of the processing are entirely the same as the above-described processing (case e) shown in FIG. 70. In step S372, processing for the pixel at position B shown in FIG. 65 is performed. The contents of the processing are entirely the same as the above-described processing (case B) shown in FIG. 42. After thus terminating the processing in step S372, the process returns to the original processing, and the processing for case 06 is terminated. FIG. 65 shows how vectors are generated in accordance with the situation whether or not the pixels at positions B and e are black pixels.

Figure 81:
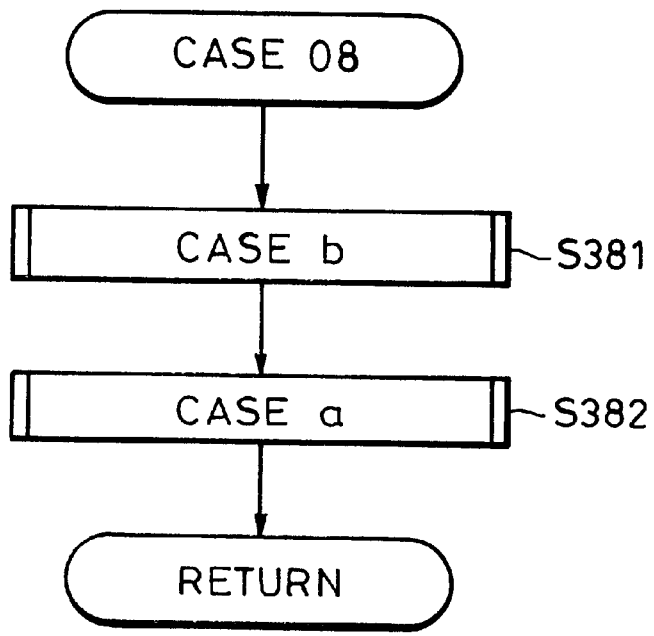

FIG. 81 is a flowchart showing processing for case 08.

In step S381, processing for the pixel at position (b) shown in FIG. 66 is performed. The contents of the processing are the same as the above-described processing (case b) shown in FIG. 72. In step S382, processing for the pixel at position (a) shown in FIG. 66 is performed. The contents of the processing are the same as in the above-described processing shown in FIG. 79. After thus terminating the processing (case a') in step S382, the process returns to the original processing, and the processing for case 08 is terminated. FIG. 66 shows how vectors are generated in accordance with the situation whether or not the pixels at positions (a) and (b) are black pixels.

Figure 82:
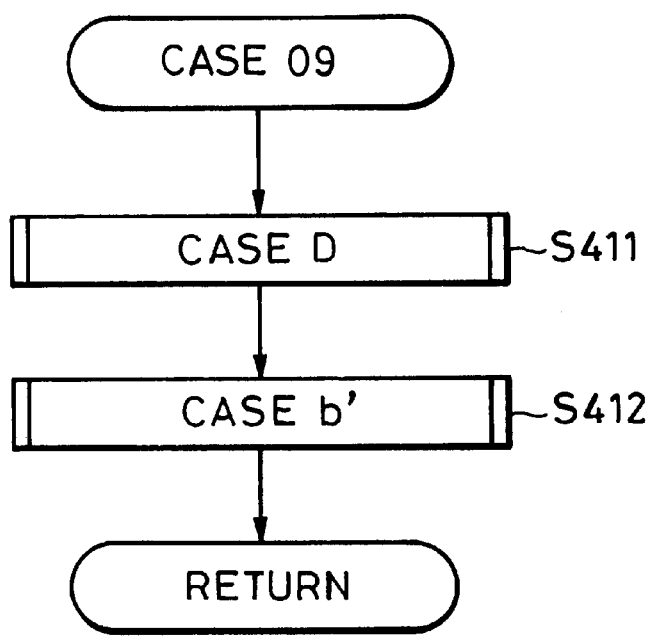

FIG. 82 is a flowchart showing processing for case 09.

First, in step S411, processing (case D) for the pixel at position D shown in FIG. 67 is performed. The contents of the processing are shown in the above-described flowchart of FIG. 48. Subsequently, in step S412, processing for the pixel at position (b) shown in FIG. 67 is performed. The contents of the processing are the same as the above-described processing shown in the flowchart of FIG. 75. After thus terminating the processing (case b') in step S412, the process returns to the original processing, and the processing for case 09 is terminated. FIG. 67 shows how vectors are generated in accordance with the situation whether or not the pixels at positions b and D are black pixels.

Figure 83:
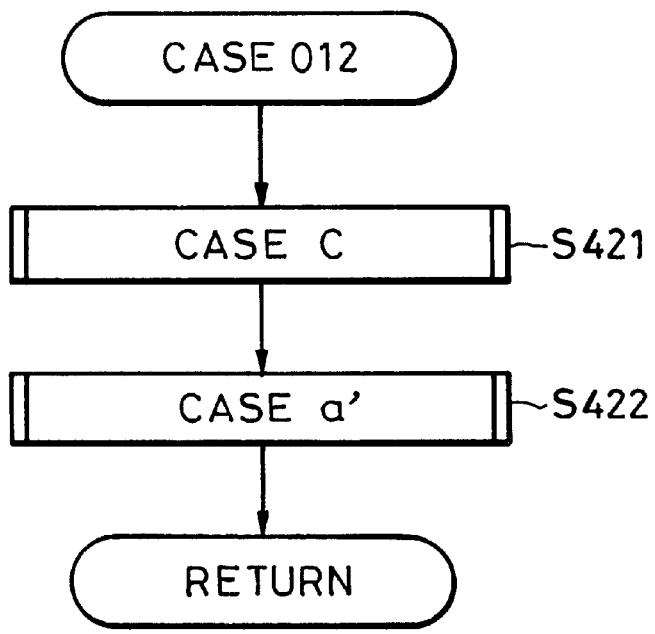

FIG. 83 is a flowchart showing processing for case 012. First, in step S421, processing (case C) for the pixel at position C shown in FIG. 68 is performed. The contents of the processing are the same as the above-described processing shown in the flowchart of FIG. 52. Subsequently, in step S422, processing for the pixel at position (a) shown in FIG. 68 is performed. The contents of the processing are the same as the above-described processing (case a') shown in the flowchart of FIG. 79. After thus terminating the processing in step S422, the process returns to the original processing, and the processing for case 012 is terminated. FIG. 68 shows how vectors are generated in accordance with the situation whether the pixels at positions (a) and (c) are black pixels.

According to the above-described procedures, the extraction of a contour line connected in eight directions can be executed by raster scanning.

Even if vertical vectors are extracted in place of all the above-described horizontal vectors, and vice versa, the same contour can be extracted in the condition that the direction of rotation of the extracted contour loop is reversed.

It can be easily understood that the CPU can determine and properly select whether a contour line is to be extracted in the form of a contour line connected in four directions or a contour line connected in eight directions according to an indication from the outside.

As explained above, according to the present embodiment, candidates for the start point and the end point of a vector on a contour vector strings are extracted and held in accordance with the state of eight pixels adjacent to a target point, and the connecting relationship between the extracted candidates and already-held candidates is determined. It is thereby possible to extract a contour included in an image by performing only one raster scanning. Furthermore, the present embodiment has the effects that the capacity of an image memory needed for extraction processing of contour lines can be greatly reduced, and processing time needed due to duplication of processing can be shortened.

Moreover, the present embodiment has the effect that by extracting a contour not along a center of a dot, but along a side a side of a dot, a contour line having a proper width can be extracted even for a line having a width of one dot.

As explained above, according to the present invention, contour vectors are extracted in accordance with the state of black points in a target pixel moving in accordance with raster scanning and pixels adjacent to the target pixel, and a contour line is formed according to the state of connection of the vectors. Hence, the present invention has the effect that all contour lines in an image can be extracted by only one raster scanning.

The present invention also has the effect that, since a memory for storing the entire image data is not needed, the capacity of the memory can be reduced.

Further Improved Embodiment

An explanation will now be provided of an embodiment wherein the foregoing embodiments are further improved. In the method of extracting a contour line in a region of adjacent pixels connected in 8 directions (hereinafter termed "8-connected-pixel region") disclosed in the foregoing embodiments, extraction of the contour line between pixels connected in an oblique direction with respect to a target pixel is rather complicated.

That is, in the foregoing embodiments, when the target pixel is a black pixel, the CPU 519 determines whether each of 8 pixels surrounding the target pixel is a white pixel or a black pixel, and determines the contents of processing for each pattern. When the contour line in the connected-pixel region in the vertical and horizontal directions of the target pixel is extracted, it is necessary to define a contour point only when the surrounding pixel is a white pixel. On the other hand, when the contour line in the connected-pixel region in an oblique direction is extracted, a contour point must be defined even when both the target pixel and the pixel in the oblique direction are black pixels. As a result, when the contour line in the connected-pixel region in an oblique direction is extracted, the position between the two pixels connected in the oblique direction is checked twice when each of the two pixels becomes the target pixel. FIG. 84 shows an example of such a case. In FIG. 84, A and B represent two pixels connected in an oblique direction, and C represents a position between the pixels where a contour point is present. Accordingly, it is necessary to remove redundancy in check, and provide consistency. In the foregoing embodiments, extraction procedure of a contour point in an obliquely-connected-pixel region is not set so as to be checked independently of the state of other surrounding pixels, that is, is set so that it is difficult to provide the rule of extracting respective portions as a module. The case shown in FIG. 84 will now be considered. As shown in FIG. 85, when the black pixel A is the target pixel, the start point of two vertical vectors $C_1$ and $C_2$ is set as a contour point. The vector $C_1$ is defined as a contour vector for which an outflow vector is determined and an inflow vector is undetermined. The vector $C_2$ is defined as a contour vector for which both an outflow vector and an inflow vector are undetermined. When the black pixel B is the target pixel, as shown in FIGS. 86 and 87, the contents of processing differ depending on whether the position of the pixel indicated by D is a white pixel (FIG. 86) or a black pixel (FIG. 87). In these cases, a new contour vector is not defined, but only updating of the connection state of the contour vector determined in FIG. 85 is performed. When the pixel position D comprises a white pixel, an inflow vector for the vector $C_1$ and a vector where the vector $C_2$ flows out to are determined. When the pixel position D comprises a black pixel, only an inflow vector for the vector $C_1$ is determined. In order to perform the above-described processing, programming becomes complicated, and the processing speed will be reduced. Furthermore, there is a possibility of increasing the scale of circuitry in providing hardware.

The present embodiment is made in consideration of the above-described problems. In the rule of the present embodiment when a contour point of an 8-connected pixel region in the foregoing embodiments is extracted, when a pixel region connected in an oblique direction is extracted, two contour points set between two black pixels connected in the oblique direction are individually defined when each of the two black pixels becomes the target pixel. The extraction of the contour point can thereby be operated independently of the state of other surrounding pixels, and the rule of extracting each portion can be easily provided as a module.

An explanation will now be provided of specific processing.

Cases 00 shown in FIG. 69, 01, 02, 03, 04, 06, 08, 09 and 012 of the foregoing second embodiment will be processed n the following manner. Respective processing will now be explained with reference to flowcharts shown in FIGS. 88–108.

Each of the above-described respective cases corresponds to each case which has the possibility of the presence of a pixel region connected in an oblique direction when a contour point in an 8-connected-pixel region is extracted in the second embodiment. The above-described cases cover all cases of connection in oblique directions.

A main object of the present embodiment is to more efficiently extract a contour point by improving the method of extracting a contour point with respect to 8-connected-pixel region explained in the foregoing embodiments (FIGS. 1–83). Hence, the present embodiment will be explained by describing only improved portions of the foregoing embodiments. With respect to techniques other than the technique of extracting a contour point relating to 8-connected-pixel region, the techniques used in the foregoing embodiments will be used without modification. Hence, explanation will be provided with reference to the drawings used in the foregoing embodiments, except newly added drawings.

Figure 88:
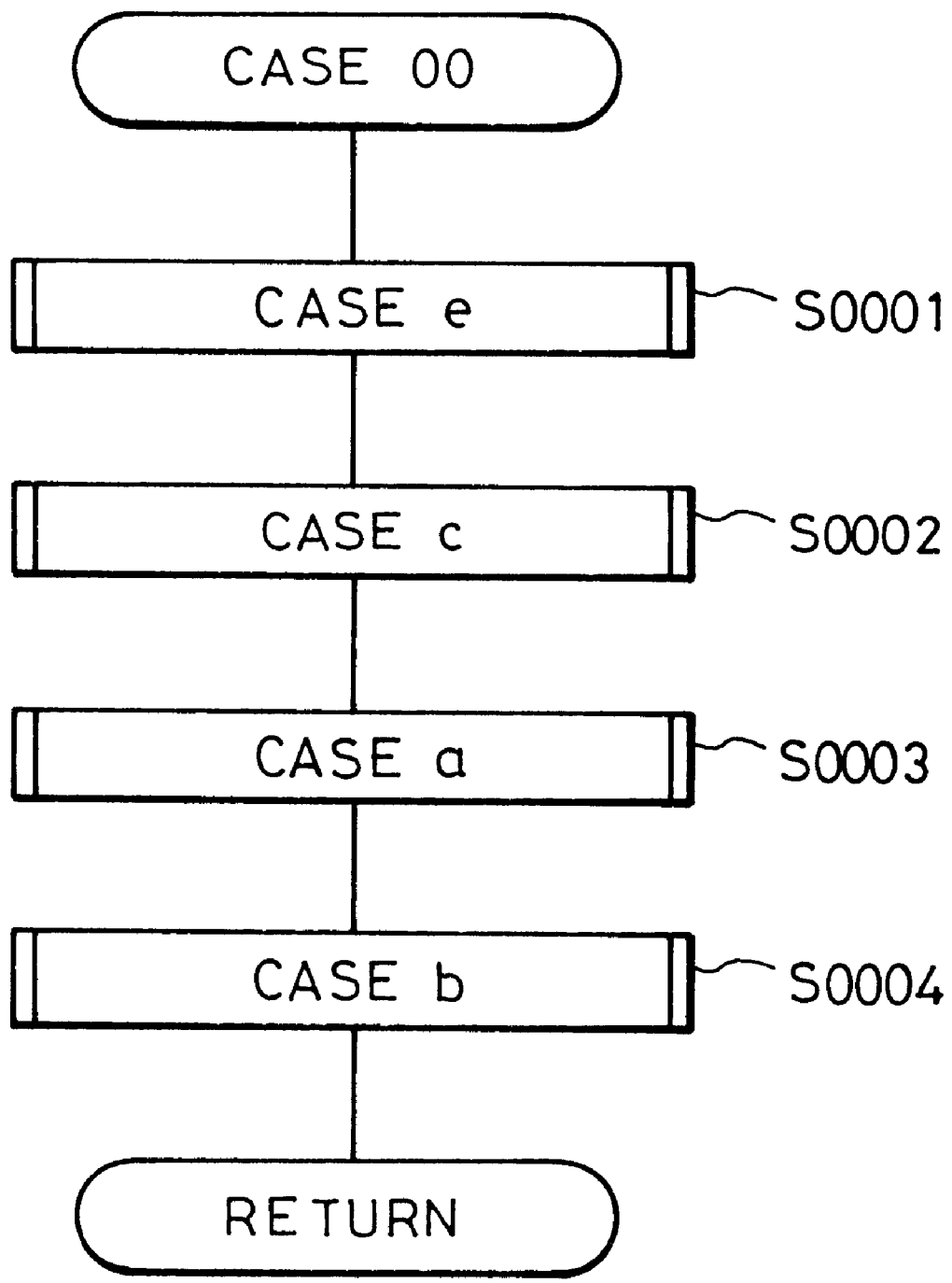
FIG. 88 is a flowchart showing the contents of improved processing for case 00 in the foregoing second embodiment.
Figure 89:
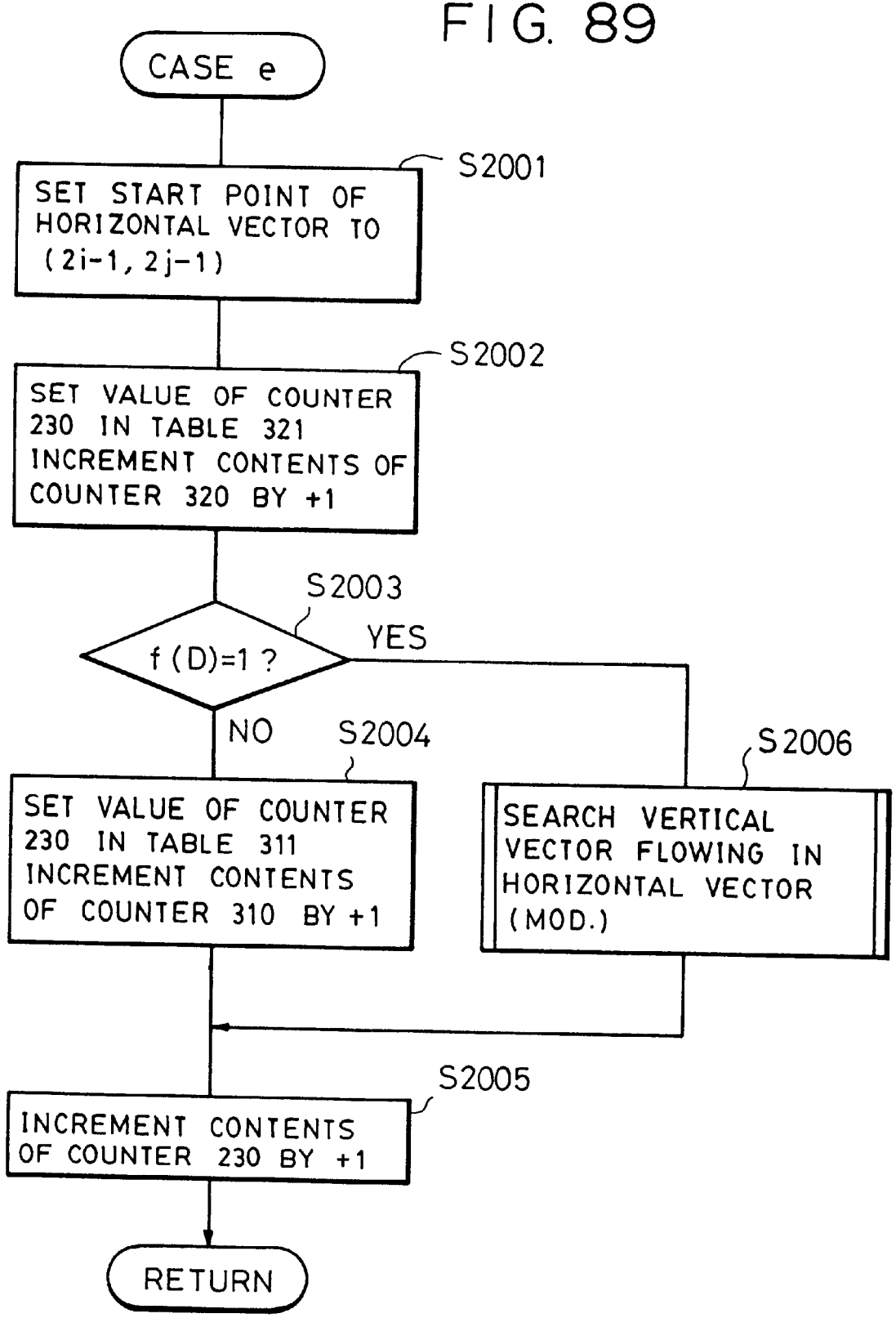
FIG. 89 is a flowchart showing processing for case e in the second embodiment.

FIG. 88 is a flowchart for processing case 00 of the second embodiment shown in FIG. 60. In step S0001, processing for the neighborhood of the pixel at position ⓔ in the pixel matrix 601 shown in FIG. 60 is performed. The contents of the processing are shown in the flowchart of FIG. 89. This position ⓔ corresponds to the position of the pixel D shown in FIG. 1.

In the flowchart of FIG. 89, in step S2001, a point (2i−1, 2j−1) is registered in a register table for horizontal vectors shown in FIG. 23 as the start point of a horizontal vector. In step S2002, the value of the counter 230 is registered in the table 321 shown in FIG. 32 assuming that a vector where this horizontal vector flows out to is undetermined, and the contents of the counter 320 are updated. In step S2003, the CPU 519 determines whether the position of the above-described pixel D comprises a black pixel (f(D)=1) or not (f(D)=0). If the result of the determination is affirmative, that is, f(D)=1, the process proceeds to step S2006. If the result of the determination is negative, that is, f(D)=0, the process proceeds to step S2004. In step S2004, the value of the counter 230 is registered in the table 311 shown in FIG. 31 assuming that an inflow vector for the above-described horizontal vector is undetermined, and the contents of the counter 310 are updated. In step S2005, the contents of the horizontal-vector counter 230 are incremented by one, and the process returns to the original processing. In step S2006, a vertical vector flowing into the horizontal vector defined in step S2001 is searched. The procedure of the search conforms to the method explained with reference to FIG. 30, except that the term (2i+1) in step S52 shown in FIG. 30 is replaced by a term (2i−1). After processing in step S2006 has been terminated, the process proceeds to step S2005. Thus, the processing for case e in step S0001 shown in FIG.

Figure 91:
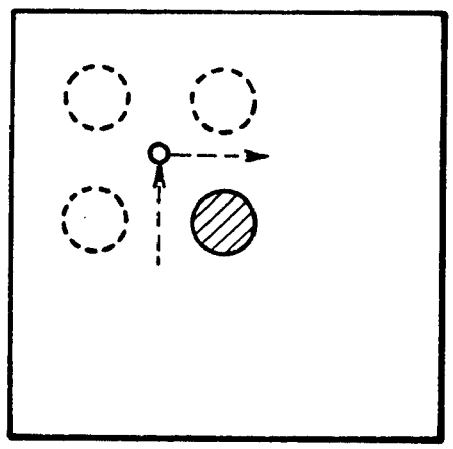

88 is terminated. In this processing, extraction of a horizontal vector present between the target pixel and the pixel position D is performed, as shown in FIGS. 90 and 91. In FIGS. 90 and 91, a mark ○ represents the start point of the horizontal vector, an arrow issuing from the mark ○ represents the direction (that is, the leftward or rightward direction) of the horizontal vector, and an arrow entering the mark ○ represents the direction (that is, the upward or downward direction) of a vertical vector flowing into the start point of the horizontal vector. A broken-line arrow indicates that the connection relationship is undetermined, and a solid-line arrow indicates that the connection relationship is determined at that time.

Figure 92:
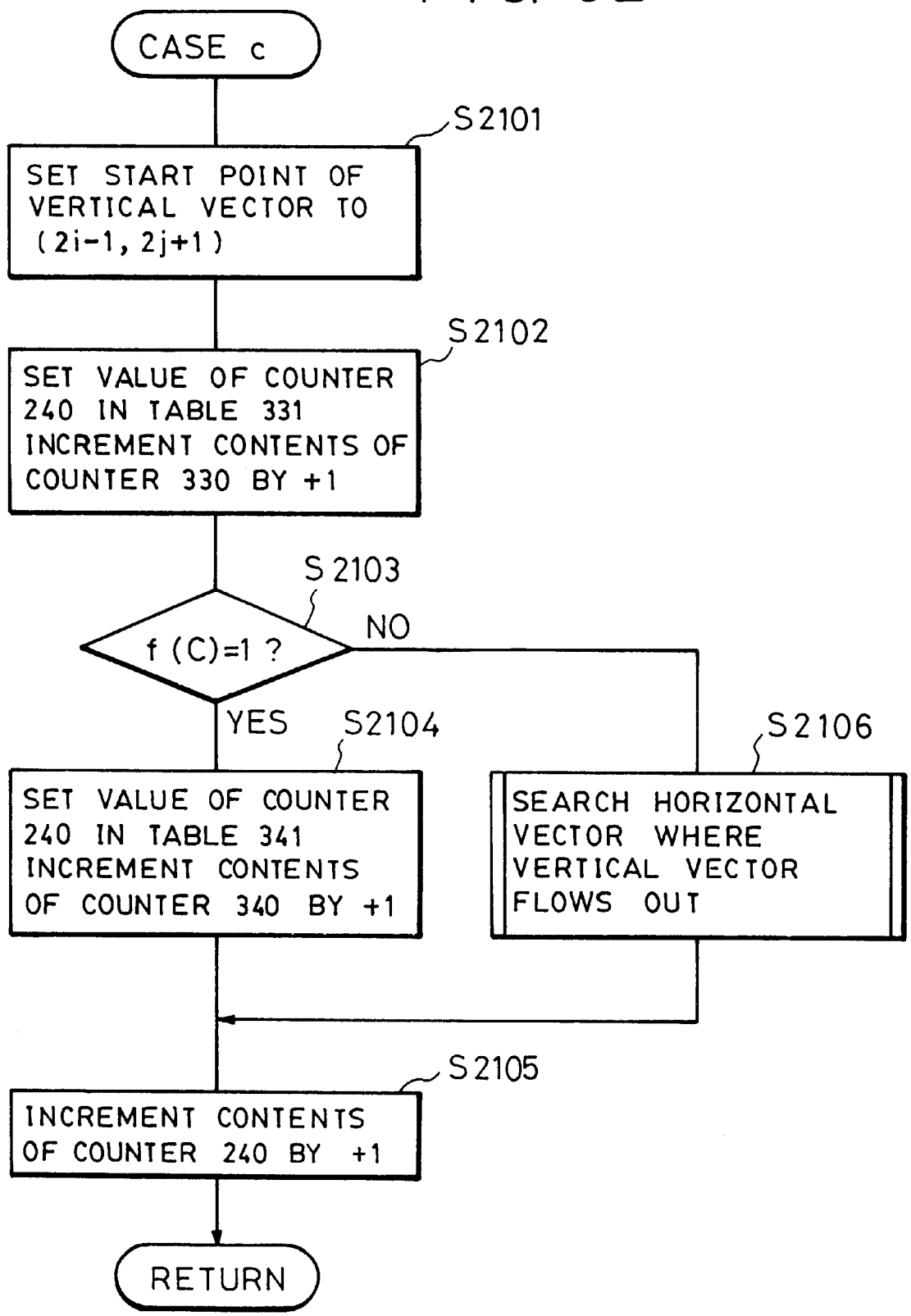
FIG. 92 is a flowchart showing processing for case c in the second embodiment.
Figure 93:
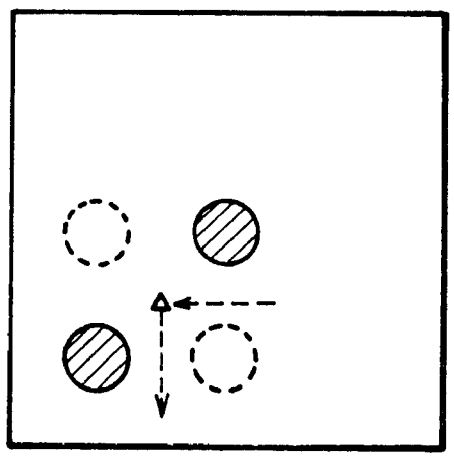
FIGS. 93 and 94 are diagrams showing the contents of processing for case c.
Figure 94:
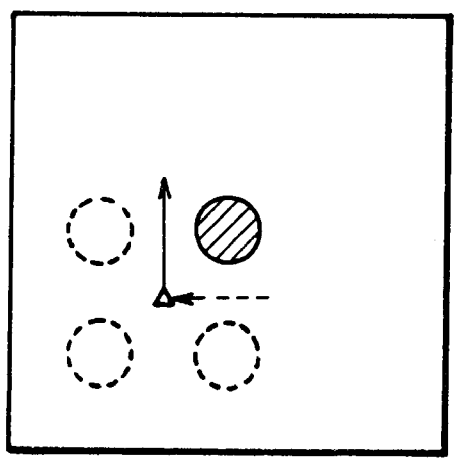

The process then proceeds to step S0002, where processing for the neighborhood of the pixel at position C shown in FIG. 1 is performed. The contents of the processing are shown in the flowchart of FIG. 92. In step S2101, a point (2i−1, 2j+1) is registered in the registration table for vertical vectors shown in FIG. 24 as the start point of a vertical vector. In step S2102, the value of the counter 240 is registered in the table 331 shown in FIG. 33 assuming that an inflow vector for this vertical vector is undetermined, and the contents of the counter 330 are updated. In step S2103, the CPU 519 determines whether the position of the above-described pixel C comprises a black pixel (f(C)=1) or not (f(C)=0). If the result of the determination is affirmative, that is, f(C)=1, the process proceeds to step S2104. If the result of the determination is negative, that is, f(C)=0, the process proceeds to step S2106. In step S2104, the value of the counter 240 is registered in the table 341 shown in FIG. 34 assuming that a vector where the above-described vertical vector flows out to is undetermined, and the contents of the counter 340 are updated. In step S2105, the contents of the vertical-vector counter 240 are incremented by one, and the process returns to the original processing. In step S2106, a horizontal vector where the vertical vector defined in step S2101 flows out to is searched. The procedure of the search conforms to the method explained with reference to FIG. 35. After the processing in step S2106 has been terminated, the process proceeds to step S2005. Thus, the processing for case c in step S0002 shown in FIG. 88 is terminated. In this processing, extraction of a vertical vector present between the target pixel and the pixel position C is performed, as shown in FIGS. 93 and 94. In FIGS. 93 and 94, a mark Δ represents the start point of the vertical vector, an arrow issuing from the mark Δ represents the direction (that is, the upward or downward direction) of the vertical vector, and an arrow entering the mark Δ represents the direction (that is, the leftward or rightward direction) of the horizontal vector flowing into the start point of the vertical vector. A broken-line arrow indicates that the connection relationship is undetermined, and a solid-line arrow indicates that the connection relationship is determined at that time.

Figure 95:
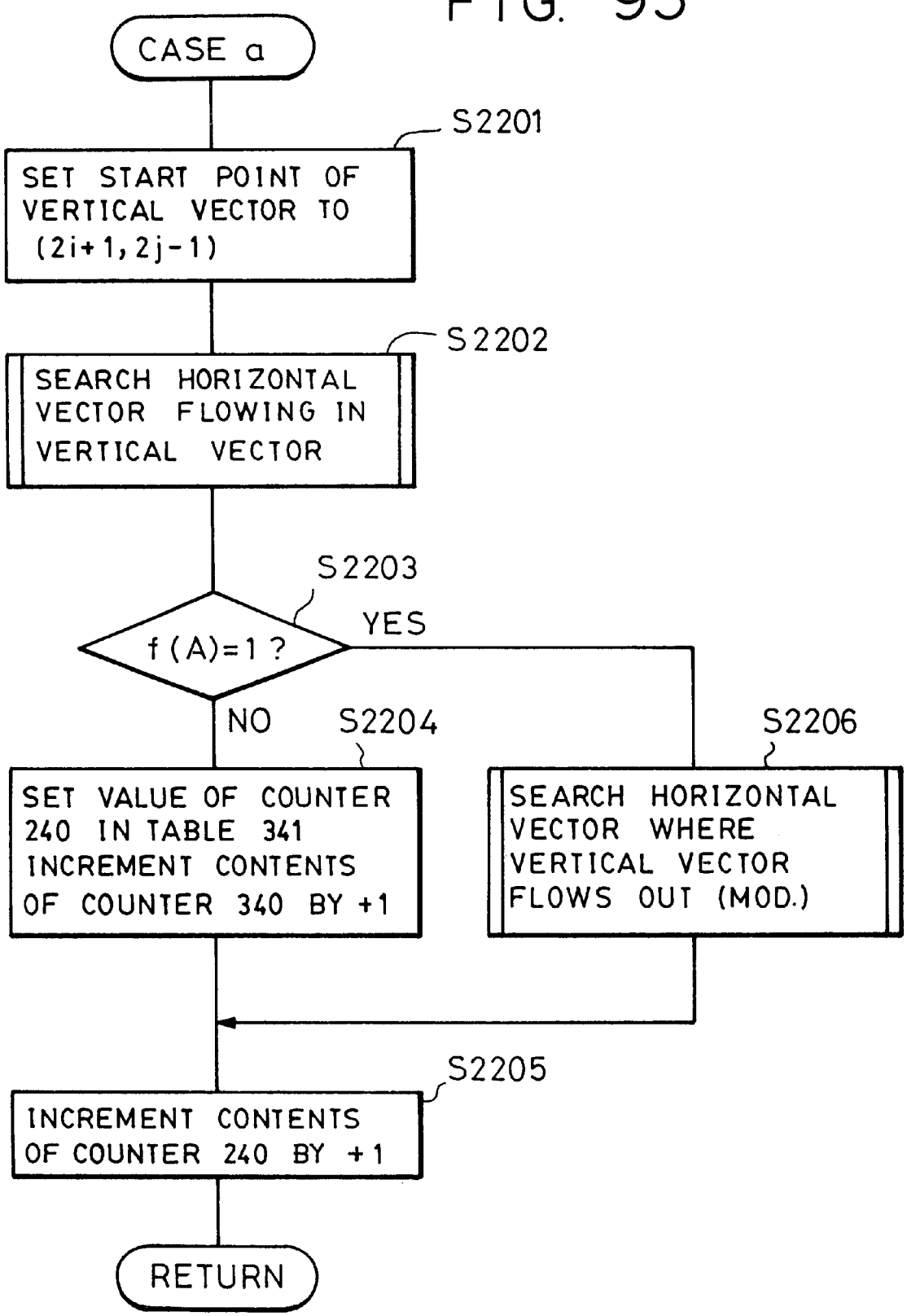
FIG. 95 is a flowchart showing processing for case "a" in the second embodiment.
Figure 96:
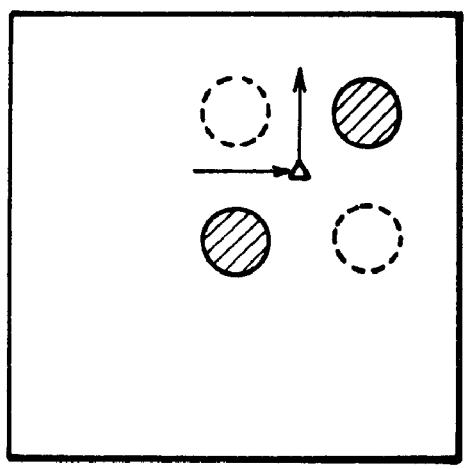
Figure 97:
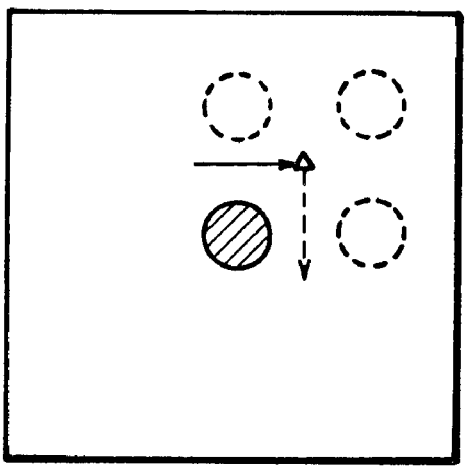

The process then proceeds to step S0003, where processing for the neighborhood of the pixel at position A shown in FIG. 1 is performed. The contents of the processing are shown in the flowchart of FIG. 95. In step S2201, a point (2i+1, 2j−1) is registered in the registration table for vertical vectors shown in FIG. 24 as the start point of a vertical vector. In step S2202, a horizontal vector flowing into the vertical vector defined in step S2201 is searched. The procedure of the search conforms to the method explained with reference to FIG. 45. In step S2203, the CPU 519 determines whether the position of the above-described pixel A comprises a black pixel (f(A)=1) or not (f(A)=0). If the result of the determination is affirmative, that is, f(A)=1, the process proceeds to step S2206. If the result of the determination is negative, that is, f(A)=0, the process proceeds to step S2204. In step S2204, the value of the counter 240 is registered in the table 341 shown in FIG. 34 assuming that a vector where the above-described vertical vector flows out to is undetermined, and the contents of the counter 340 are updated. In step S2205, the contents of the vertical-vector counter 240 are incremented by one, and the process returns to the original processing. In step S2206, a horizontal vector where the vertical vector depends from defined in step S2201 is searched. The procedure of the search conforms to the method explained with reference to FIG. 35, except that the term (2i−1) in step S62 shown in FIG. 35 is replaced by a term (2i+1). After processing in step S2206 has been terminated, the process proceeds to step S2205. Thus, the processing for case "a" in step S0003 shown in FIG. 88 is terminated. In this processing, extraction of a vertical vector present between the target pixel and the pixel position A is performed, as shown in FIGS. 96 and 97.

Figure 98:
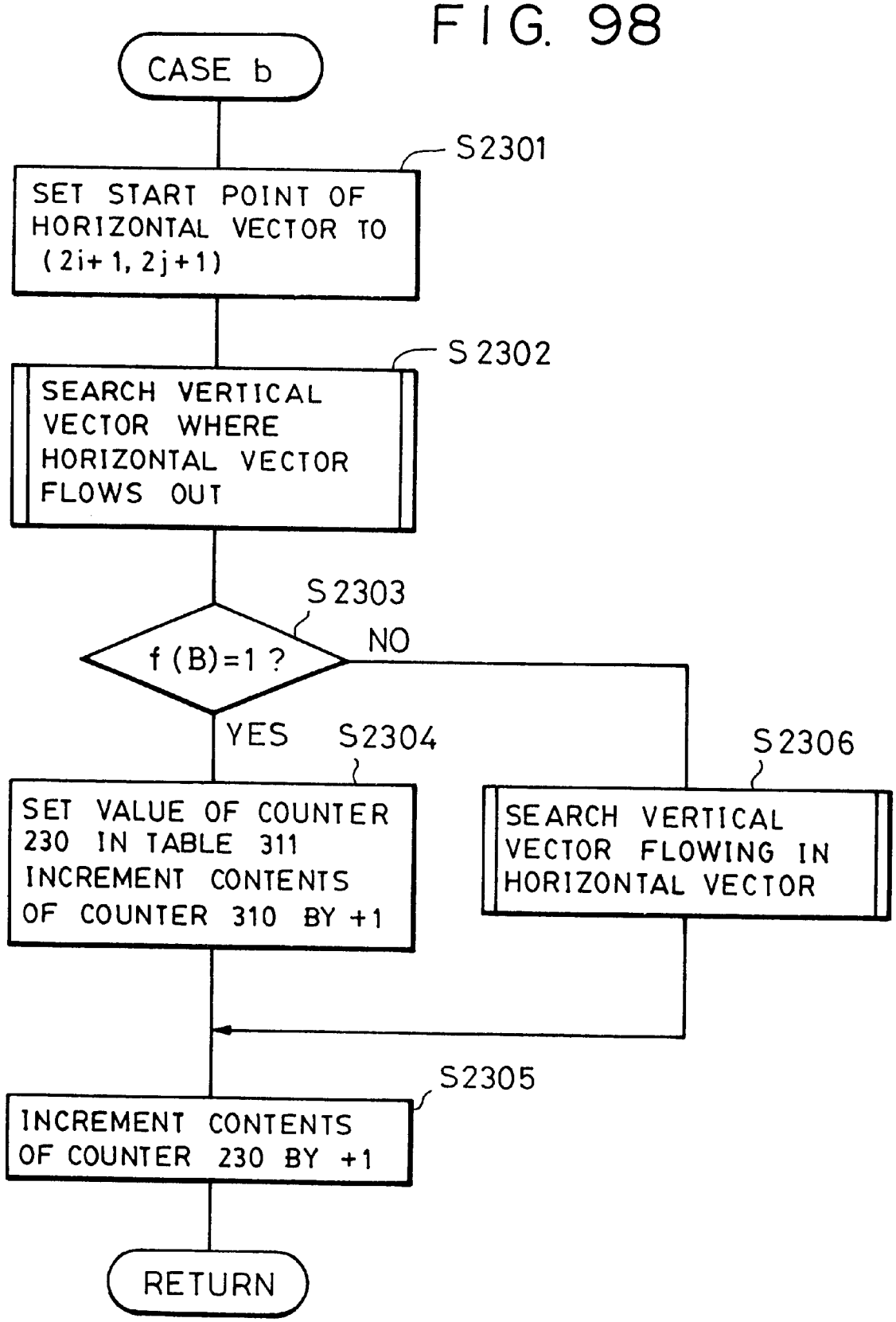
FIG. 98 is a flowchart showing processing for case b in the second embodiment.
Figure 99:
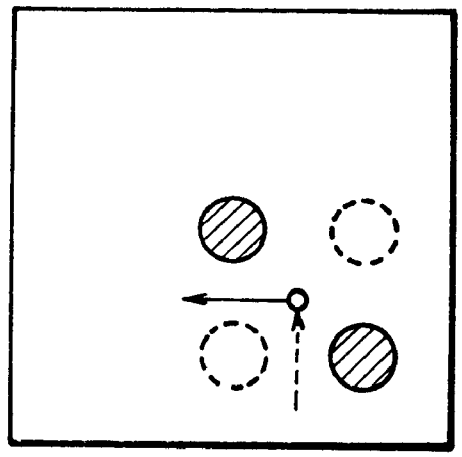
FIGS. 99 and 100 are diagrams showing the contents of the processing for case b.
Figure 100:
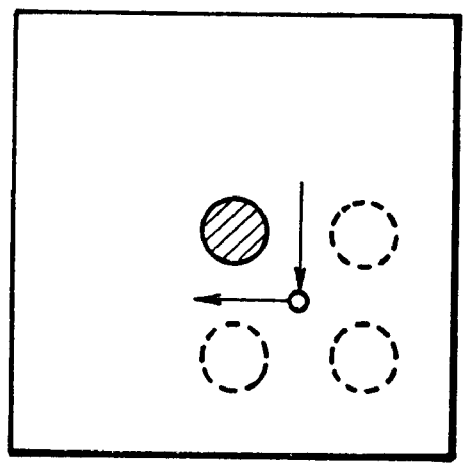

The process then proceeds to step S0004, where processing for the neighborhood of the pixel at position B shown in FIG. 1 is performed. The contents of the processing are shown in the flowchart of FIG. 98. In step S2301, a point (2i+1, 2j+1) is registered in the registration table for horizontal vectors shown in FIG. 23 as the start point of a horizontal vector. In step S2302, a vertical vector where the horizontal vector depends from defined in step S2301 is searched. The procedure of the search conforms to the method explained with reference to FIG. 46. In step S2303, the CPU 519 determines whether the position of the above-described pixel B comprises a black pixel (f(B)=1) or not (f(B)=0). If the result of the determination is affirmative, that is, f(B)=1, the process proceeds to step S2304. If the result of the determination is negative, that is, f(B)=0, the process proceeds to step S2306. In step S2304, the value of the counter 230 is registered in the table 311 shown in FIG. 31 assuming that an inflow vector for the above-described horizontal vector is undetermined, and the contents of the counter 310 are updated. In step S2305, the contents of the horizontal-vector counter 230 are incremented by one, and the process returns to the original processing. In step S2306, a vertical vector flowing into the horizontal vector defined in step S2301 is searched. The procedure of the search conforms to the method explained with reference to FIG. 30. After the processing in step S2306 has been terminated, the process proceeds to step S2305. Thus, the processing for case b in step S0004 shown in FIG. 88 is terminated. The processing for case 00 of the second embodiment shown in FIG. 60 is now terminated.

Figure 101:
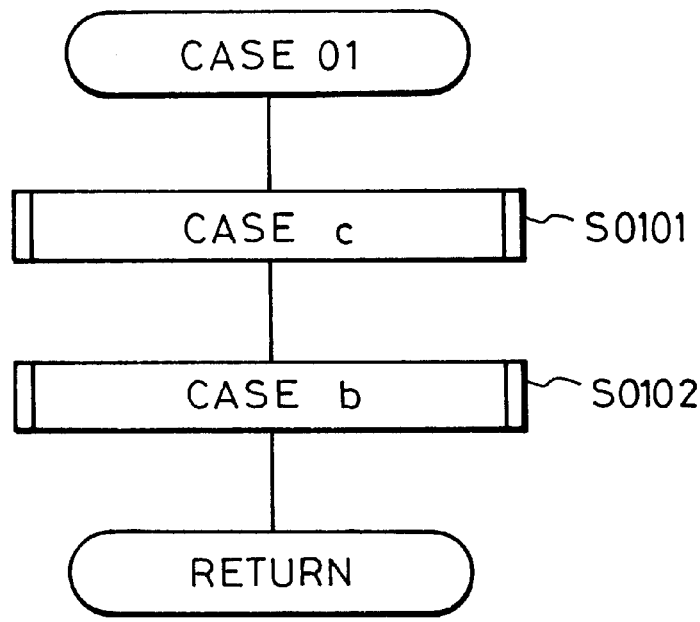
FIG. 101 is a flowchart showing the contents of improved processing for case 01 in the second embodiment.

FIG. 101 is a flowchart for processing case 01 of the second embodiment shown in FIG. 61.

First, in step S0101, processing for the neighborhood of position c shown in FIG. 61 is performed. The contents of the processing are entirely the same as for case c shown in FIG. 92. The process then proceeds to step S0102, where processing for the neighborhood of position ⓑ shown in FIG. 61 is performed. The contents of the processing are entirely the same as for case b shown in FIG. 88. Thus, the processing for case 01 shown in FIG. 61 is terminated.

Figure 102:
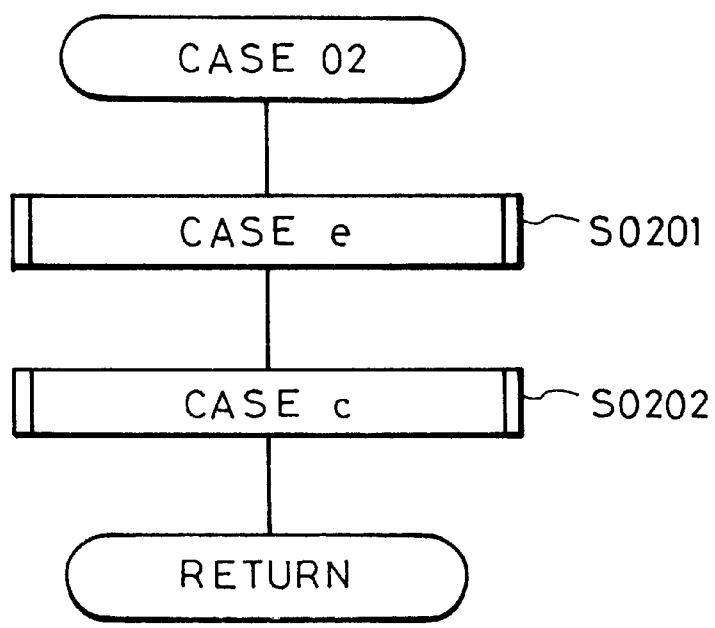
FIG. 102 is a flowchart showing the contents of improved processing for case 02 in the second embodiment.

FIG. 102 is a flowchart for processing case 02 of the second embodiment shown in FIG. 62.

First, in step S0201, processing for the neighborhood of position ⓔ shown in FIG. 62 is performed. The contents of the processing are entirely the same as for case e shown in FIG. 89. The process then proceeds to step S0202, where processing for the neighborhood of position ⓒ shown in FIG. 62 is performed. The contents of the processing are entirely the same as for case c shown in FIG. 92. Thus, the processing for case 02 shown in FIG. 62 is terminated.

Figure 103:
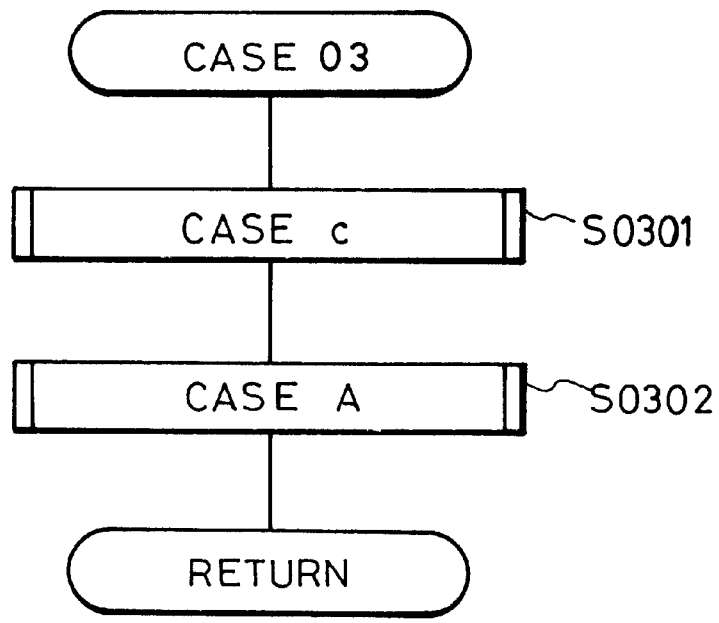
FIG. 103 is a flowchart showing the contents of improved processing for case 03 in the second embodiment.

FIG. 103 is a flowchart for processing case 03 of the second embodiment shown in FIG. 63.

First, in step S0301, processing for the neighborhood of position ⓒ shown in FIG. 63 is performed. The contents of the processing are entirely the same as for case c shown in FIG. 92. The process then proceeds to step S0302, where processing for the neighborhood of position Ⓐ shown in FIG. 63 is performed. The contents of the processing are entirely the same as for case A shown in FIG. 38. Thus, the processing for case 03 shown in FIG. 63 is terminated.

Figure 104:
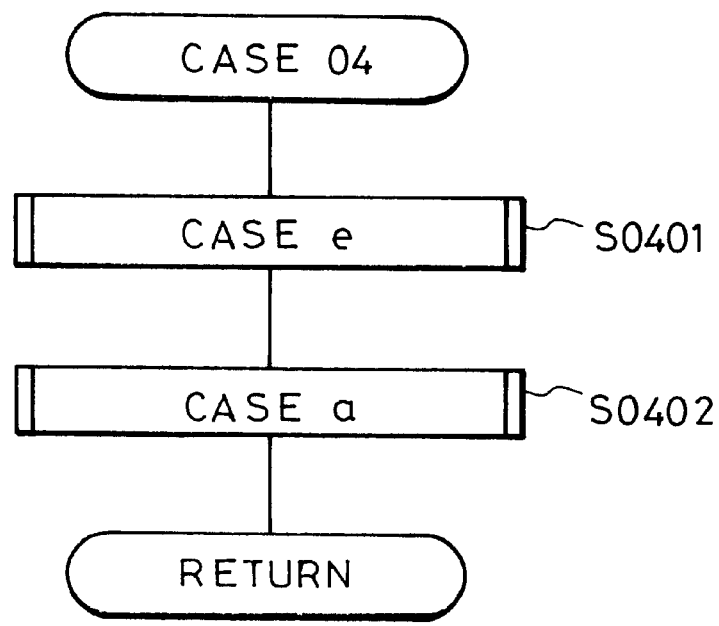
FIG. 104 is a flowchart showing the contents of improved processing for case 04 in the second embodiment.

FIG. 104 is a flowchart for processing case 04 of the second embodiment shown in FIG. 64.

First, in step S0401, processing for the neighborhood of position ⓔ shown in FIG. 64 is performed. The contents of the processing are entirely the same as for case e shown in FIG. 89. The process then proceeds to step S0402, where processing for the neighborhood of position ⓐ shown in FIG. 64 is performed. The contents of the processing are entirely the same as for case "a" shown in FIG. 95. Thus, the processing for case 04 shown in FIG. 64 is terminated.

Figure 105:
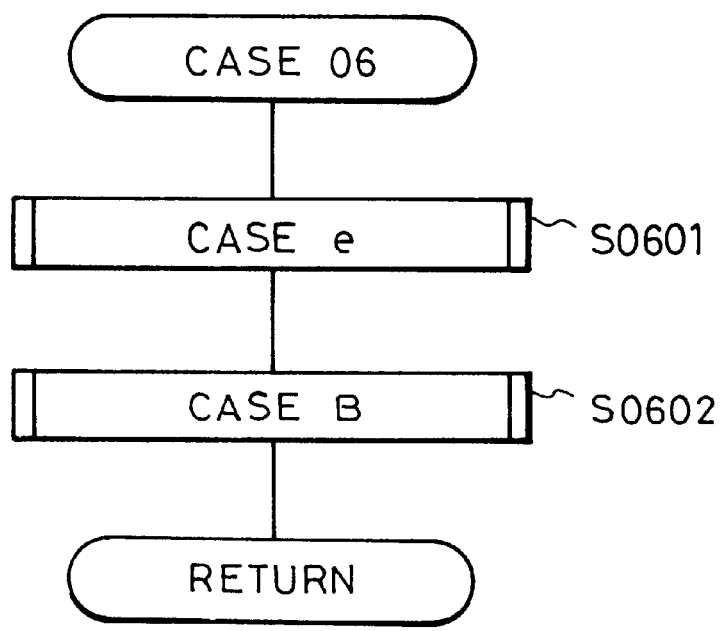
FIG. 105 is a flowchart showing the contents of improved processing for case 06 in the second embodiment.

FIG. 105 is a flowchart for processing case 06 of the second embodiment shown in FIG. 65.

First, in step S0601, processing for the neighborhood of position ⓔ shown in FIG. 65 is performed. The contents of the processing are entirely the same as for case e shown in FIG. 89. The process then proceeds to step S0602, where processing for the neighborhood of position Ⓑ shown in FIG. 65 is performed. The contents of the processing are entirely the same as for case B shown in FIG. 42. Thus, the processing for case 06 shown in FIG. 65 is terminated.

Figure 106:
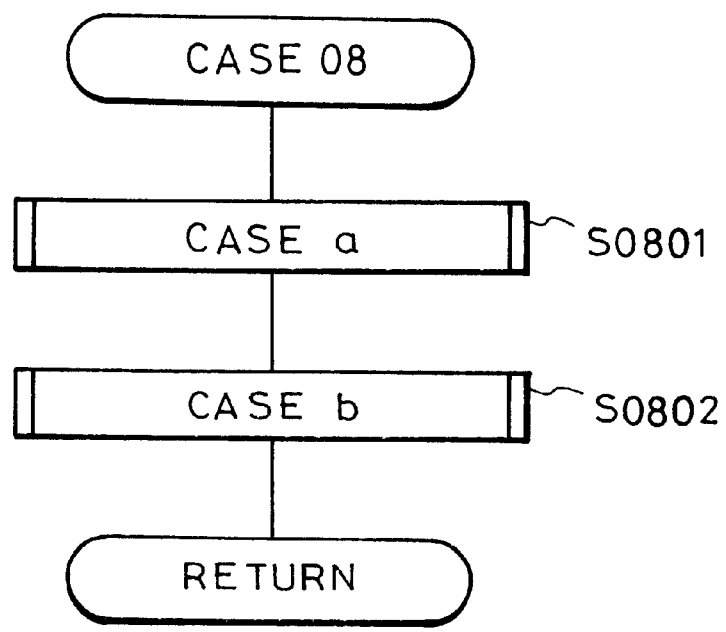
FIG. 106 is a flowchart showing the contents of improved processing for case 08 in the second embodiment.

FIG. 106 is a flowchart for processing case 08 of the second embodiment shown in FIG. 66.

First, in step S0801, processing for the neighborhood of position ⓐ shown in FIG. 66 is performed. The contents of the processing are entirely the same as for case "a" shown in FIG. 95. The process then proceeds to step S0802, where processing for the neighborhood of position ⓑ shown in FIG. 66 is performed. The contents of the processing are entirely the same as for case b shown in FIG. 98. Thus, the processing for case 08 shown in FIG. 66 is terminated.

Figure 107:
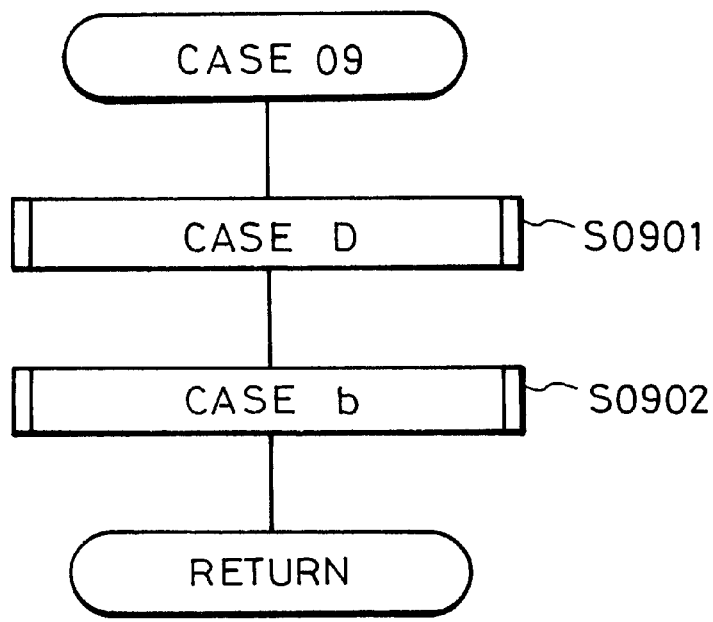
FIG. 107 is a flowchart showing the contents of improved processing for case 09 in the second embodiment.

FIG. 107 is a flowchart for processing case 09 of the second embodiment shown in FIG. 67.

First, in step S0901, processing for the neighborhood of position Ⓓ shown in FIG. 67 is performed. The contents of the processing are entirely the same as for case D shown in FIG. 48. The process then proceeds to step S0902, where processing for the neighborhood of position ⓑ shown in FIG. 67 is performed. The contents of the processing are entirely the same as for case b shown in FIG. 98. Thus, the processing for case 09 shown in FIG. 67 is terminated.

Figure 108:
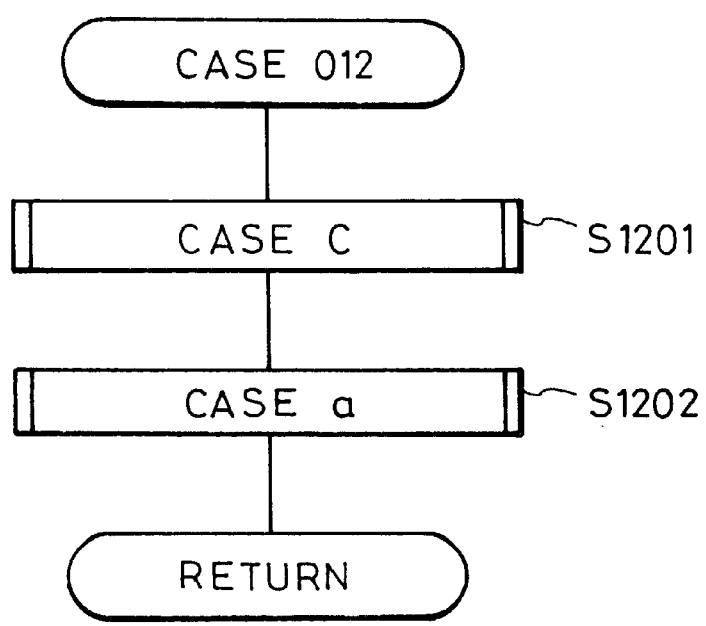
FIG. 108 is a flowchart showing the contents of improved processing for case 012 in the second embodiment.
Figure 109:
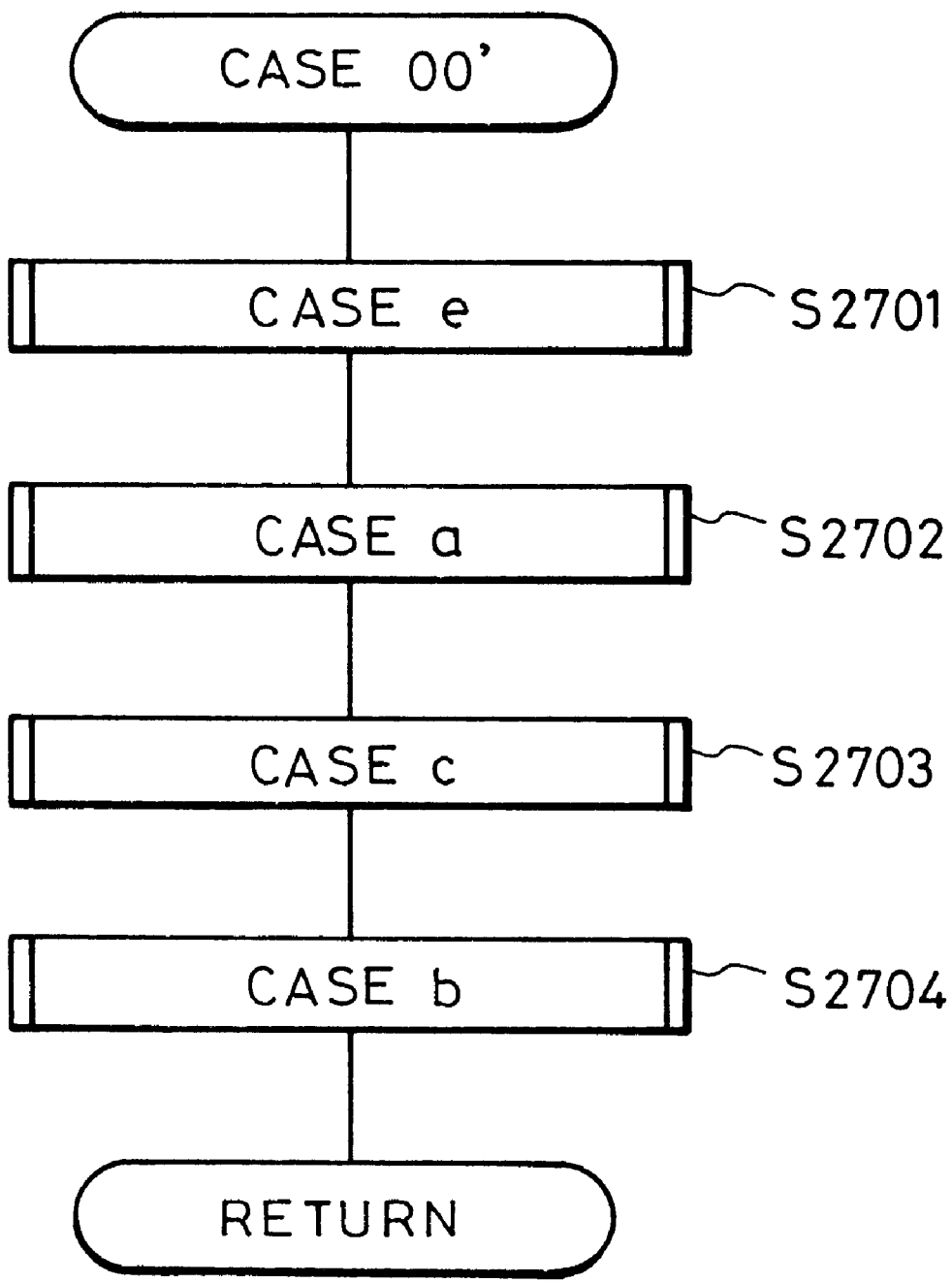
FIGS. 109–113 are flowcharts showing another embodiment for the cases 00, 03, 06, 09 and 012, respectively.
Figure 110:
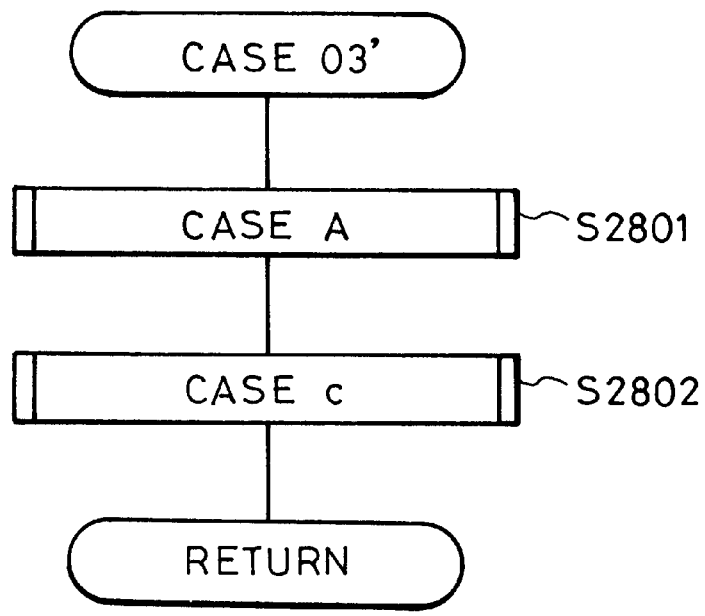
Figure 111:
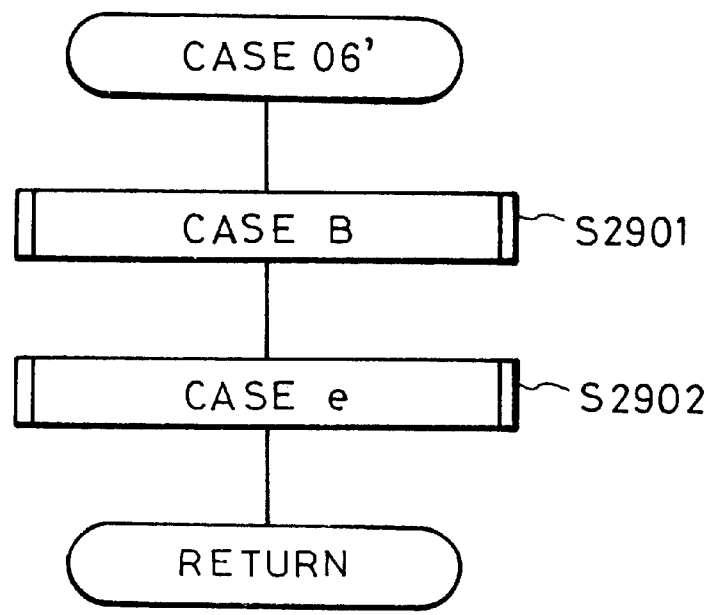
Figure 112:
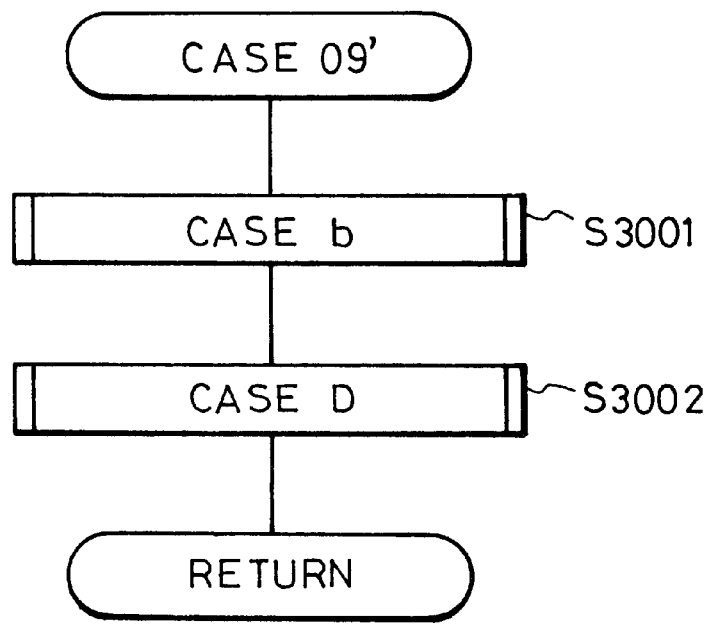
Figure 113:
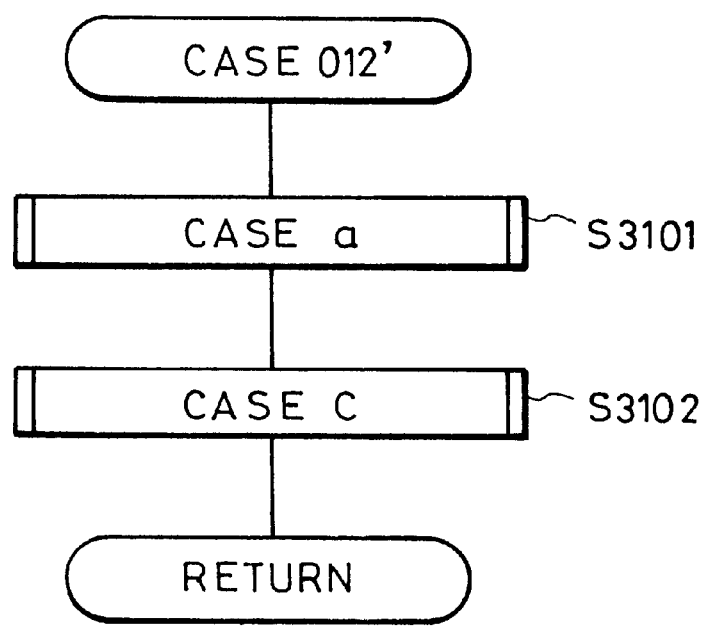

FIG. 108 is a flowchart for processing case 012 of the second embodiment shown in FIG. 68.

First, in step S1201, processing for the neighborhood of position ⓒ shown in FIG. 68 is performed. The contents of the processing are entirely the same as for case c shown in FIG. 52. The process then proceeds to step S1202, where processing for the neighborhood of position ⓐ shown in FIG. 68 is performed. The contents of the processing are entirely the same as for case "a" shown in FIG. 95. Thus, the processing for case 012 shown in FIG. 68 is terminated.

An explanation has been provided how the above-described cases 00, 01, 02, 03, 04, 06, 08, 09 and 012 are improved. Processing for other cases in the present embodiment may be performed in the same manner as in the foregoing embodiments (FIGS. 1–83). FIG. 1 shows how an image is scanned, and the relationship between a target pixel and pixels adjacent to the target pixel. The entire operation relating to FIG. 1 has been described in the foregoing embodiments.

Cases 00, 03, 06, 09 and 012 may also be configured as cases 00', 03', 06', 09' and 012' shown in FIGS. 109–113.

That is, it will be easily understood that the above-described respective cases will be satisfactorily processed provided that the following two conditions are satisfied.

(1) Case e must be processed before cases "a" and c.
(2) Case b must be processed after cases "a" and c.

As explained above, in the rule when a contour point of an 8-connected-pixel region is extracted, a method is adopted wherein each of two contour points set between two black pixels connected in an oblique direction is individually defined every time each of the two black pixels becomes a target pixel. It becomes thereby possible to perform the extraction of the contour point independently of the state of other surrounding pixels, and to provide a means for extracting each portion as a module. Accordingly, the present embodiment has the effect that the scale of the circuit configuration in providing hardware can be reduced. Also when implementing software, the present embodiment has the effect of increasing the processing speed, since program can be configured in a simple manner.

What is claimed is:

1. A contour extraction apparatus comprising:
input means for inputting an image;
extraction means for raster-scanning a pixel matrix of the image data input by said input means and extracting a contour vector located at a boundary between a black pixel in the pixel matrix, wherein the contour vector is defined by a loop of connected vectors,
wherein the extraction means registers the coordinates of the extracted contour vector in a first table and registers in a second table that a vector flowing into or out of the contour vector is undetermined when the state of the pixels represents a start portion in the main scanning or the sub-scanning, and
wherein the extraction means registers the coordinates of the extracted contour vector in the first table, and registers in the first table a vector flowing into or out of the contour vector by searching through the second table when the state of the pixels represents an end portion in the main scanning or the sub-scanning.

2. An apparatus according to claim 1, wherein said pixel matrix contains three pixels by three pixels.

3. An apparatus according to claim 1, wherein horizontal vectors and vertical vectors connect with each other one after the other in said contour vector.

4. An apparatus according to claim 1, further comprising:
first storing means for storing a coordinate of a start portion of each horizontal vector extracted by said extraction means, information for specifying a vector which inflows to each horizontal vector, and information for specifying a vector which outflows from the each horizontal vector; and
second storing means for storing a coordinate of a start portion of each vertical vector extracted by said extraction means, information for specifying a vector which inflows to each vertical vector, and information for specifying a vector which outflows from the each vertical vector,
wherein said extraction means extracts the contour vector using said first and second storing means.

5. An apparatus according to claim 1, further comprising:
third storing means for storing information for specifying an undetermined vertical vector inflowing to a horizontal vector;
fourth storing means for storing information for specifying an undetermined vertical vector outflowing from a horizontal vector;

fifth storing means for storing information for specifying an undetermined horizontal vector inflowing to a vertical vector; and sixth storing means for storing information for specifying an undetermined horizontal vector outflowing from a vertical vector, wherein said extraction means extracts the contour vector using said third, fourth, fifth and sixth storing means.

6. An apparatus according to claim 1, further comprising:

first storing means for storing a coordinate of a start portion of each horizontal vector extracted by said extraction means, information for specifying a vector which inflows to each horizontal vector, and information for specifying a vector which outflows from the each horizontal vector;

second storing means for storing a coordinate of a start portion of each vertical vector extracted by said extraction means, information for specifying a vector which inflows to each vertical vector, and information for specifying a vector which outflows from the each vertical vector;

third storing means for storing information for specifying an undetermined vertical vector inflowing to a horizontal vector;

fourth storing means for storing information for specifying an undetermined vertical vector outflowing to a horizontal vector;

fifth storing means for storing information for specifying an undetermined horizontal vector inflowing to a vertical vector; and sixth storing means for storing information for specifying an undetermined horizontal vector outflowing to a vertical vector, wherein said extraction means extracts the contour vector using said first, second, third, fourth, fifth and sixth storing means.

7. An apparatus according to claim 1, further comprising an alignment means for aligning the contour vector by said extraction means without raster-scanning the input image data again.

8. A contour extraction method for raster-scanning an input image in a pixel matrix, and in accordance with a state of plural pixels in the pixel matrix, extracting a contour vector located at a boundary between a black pixel, wherein the contour vector is defined by a loop of connected vectors, wherein the coordinate of the extracted contour vector is registered in a first table and, when a vector flowing into or out of the contour vector is undetermined in the case that the state of the pixels represents a start portion in the main scanning or the sub-scanning, the vector is registered in a second table, and wherein the coordinate of the extracted contour vector is registered in the first table, and, when a vector flowing into or out of the contour vector by searching through the second table in the case that the state of the pixels represents an end portion in the main scanning or the sub-scanning, the vector is registered in the fist table.

9. A method according to claim 8, wherein said pixel matrix contains a matrix of three pixels by three pixels.

10. A method according to claim 8, wherein a horizontal vector and a vertical vector connect with each other one after the other in said contour vector.

11. A method according to claim 8, wherein the contour vector is extracting by using:

first storing means for storing a coordinate of a start portion of each horizontal vector extracted by said extraction means, information for specifying a vector which inflows to each horizontal vector, and information for specifying a vector which outflows from the each horizontal vector; and second storing means for storing a coordinate of a start portion of each vertical vector extracted by said extraction means, information for specifying a vector which inflows to each vertical vector, and information for specifying a vector which outflows from the each vertical vector.

12. A method according to claim 8, wherein the contour vector is extracted by using:

a third storing means for storing information for specifying an undetermined vertical vector inflowing to a horizontal vector;

a fourth storing means for storing information for specifying an undetermined vertical vector outflowing to a horizontal vector;

a fifth storing means for storing information for specifying an undetermined horizontal vector inflowing to a vertical vector; and a sixth storing means for storing information for specifying an undetermined horizontal vector outflowing to a vertical vector.

13. A method according to claim 8, wherein the contour is extracted by using:

first storing means for storing a coordinate of a start portion of each horizontal vector extracted by said extraction means, information for specifying a vector which inflows to each horizontal vector, and information for specifying a vector which outflows from the each horizontal vector;

second storing means for storing a coordinate of a start portion of each vertical vector extracted by said extraction means, information for specifying a vector which inflows to each vertical vector, and information for specifying a vector which outflows from the each vertical vector;

a third storing means for storing information for specifying an undetermined vertical vector inflowing to a horizontal vector;

a fourth storing means for storing information for specifying an undetermined vertical vector outflowing to a horizontal vector;

a fifth storing means for storing information for specifying an undetermined horizontal vector inflowing to a vertical vector;

a sixth storing means for storing information for specifying an undetermined horizontal vector outflowing to a vertical vector.

14. A computer-readable medium which stores computer-executable code to direct a computer to perform process steps, the computer-executable code for 1) registering the coordinates of the extracted contour vector in a first table and registering in a second table that a vector flowing into or out of the contour vector is undetermined when the state of the pixels represents a start portion in the main scanning or the sub-scanning, and 2) registering the coordinates of the extracted contour vector in the first table, and registering in the first table a vector flowing into or out of the contour vector by searching through the second table when the state of the pixels represents an end portion in the main scanning or the sub-scanning.

15. A contour extracting apparatus for raster-scanning an input image in a pixel matrix, and, in accordance with a state of plural pixels in the pixel matrix, extracting a contour vector located at a boundary between a black pixel, wherein the contour vector is defined by a loop of connected vectors, comprising:

a program memory for storing code for 1) registering the coordinates of the extracted contour vector in a first table and registering in a second table that a vector flowing into or out of the contour vector is undetermined when the state of the pixels represents a start portion in the main scanning or the sub-scanning, and 2) registering the coordinates of the extracted contour vector in the first table, and registering in the first table a vector flowing into or out of the contour vector by searching through the second table when the state of the pixels represents an end portion in the main scanning or the sub-scanning; and a processor for executing the process steps stored in said program memory.

\* \* \* \* \*